(12) United States Patent
Tour et al.

(10) Patent No.: US 10,181,370 B2
(45) Date of Patent: Jan. 15, 2019

(54) WELLBORE FLUIDS INCORPORATING MAGNETIC CARBON NANORIBBONS AND MAGNETIC FUNCTIONALIZED CARBON NANORIBBONS AND METHODS OF USING THE SAME

(71) Applicants: William Marsh Rice University, Houston, TX (US); M-I L.L.C., Houston, TX (US)

(72) Inventors: James M. Tour, Houston, TX (US); Bostjan Genorio, Houston, TX (US); Wei Lu, Houston, TX (US); Katherine Price Hoelscher, Houston, TX (US); James Friedheim, Houston, TX (US); Arvind D. Patel, Sugar Land, TX (US)

(73) Assignees: William Marsh Rice University, Houston, TX (US); M-I L.L.C., Houston, TX (US)

( * ) Notice: Subject to any disclaimer, the term of this patent is extended or adjusted under 35 U.S.C. 154(b) by 1064 days.

(21) Appl. No.: 14/374,836

(22) PCT Filed: Jan. 28, 2013

(86) PCT No.: PCT/US2013/023468
§ 371 (c)(1),
(2) Date: Jul. 25, 2014

(87) PCT Pub. No.: WO2013/113009
PCT Pub. Date: Aug. 1, 2013

(65) Prior Publication Data
US 2014/0367091 A1  Dec. 18, 2014

Related U.S. Application Data

(60) Provisional application No. 61/640,785, filed on May 1, 2012, provisional application No. 61/591,355, filed on Jan. 27, 2012.

(51) Int. Cl.
  *C09K 8/32* (2006.01)
  *H01F 1/01* (2006.01)
  (Continued)

(52) U.S. Cl.
  CPC ............... *H01F 1/01* (2013.01); *B82Y 30/00* (2013.01); *B82Y 40/00* (2013.01); *C01B 32/168* (2017.08);
  (Continued)

(58) Field of Classification Search
  CPC .... B82Y 30/00; B82Y 40/00; C09K 2208/10; C09K 8/032; C09K 8/32; C09K 8/36;
  (Continued)

(56) References Cited

U.S. PATENT DOCUMENTS 6,239,183 B1  5/2001 Farmer et al.
6,308,788 B1  10/2001 Patel et al.
(Continued)

FOREIGN PATENT DOCUMENTS

CN  101941842 A  1/2011
CN  102015958 A  4/2011
(Continued)

OTHER PUBLICATIONS

International Search Report issued in PCT/US2013/023468 dated Jun. 21, 2013 3 pages.
(Continued)

*Primary Examiner* — Alicia Bland
(74) *Attorney, Agent, or Firm* — Osha Liang LLP

(57) ABSTRACT

A wellbore fluid may include an oleaginous continuous phase, one or more magnetic carbon nanoribbons, and at least one weighting agent. A method of performing wellbore operations may include circulating a wellbore fluid comprising a magnetic carbon nanoribbon composition and a base fluid through a wellbore. A method for electrical
(Continued)

logging of a subterranean well may include placing into the subterranean well a logging medium, wherein the logging medium comprises a non-aqueous fluid and one or more magnetic carbon nanoribbons, wherein the one or more magnetic carbon nanoribbons are present in a concentration so as to permit the electrical logging of the subterranean well; and acquiring an electrical log of the subterranean well.

31 Claims, 56 Drawing Sheets

(51) Int. Cl.
  C09K 8/03      (2006.01)
  C09K 8/36      (2006.01)
  E21B 21/00     (2006.01)
  B82Y 30/00     (2011.01)
  B82Y 40/00     (2011.01)
  E21B 47/12     (2012.01)
  C01B 32/168    (2017.01)
  C01B 32/194    (2017.01)

(52) U.S. Cl.
  CPC ............ *C01B 32/194* (2017.08); *C09K 8/032* (2013.01); *C09K 8/32* (2013.01); *C09K 8/36* (2013.01); *E21B 21/00* (2013.01); *E21B 47/12* (2013.01); *C09K 2208/10* (2013.01)

(58) Field of Classification Search
  CPC ... H01F 1/01; C01B 31/0253; C01B 31/0484; C01B 32/168; C01B 32/194; E21B 21/00; E21B 47/12
  See application file for complete search history.

(56) References Cited

U.S. PATENT DOCUMENTS

| | | |
|---|---|---|
| 6,506,710 B1 | 1/2003 | Hoey et al. |
| 6,586,372 B1 | 7/2003 | Bradbury et al. |
| 7,060,661 B2 | 6/2006 | Dobson, Sr. et al. |
| 7,176,165 B2 | 2/2007 | Massam et al. |
| 7,303,018 B2 | 12/2007 | Cawiezel et al. |
| 7,510,009 B2 | 3/2009 | Cawiezel et al. |
| 9,449,743 B2 | 9/2016 | Tour et al. |
| 2002/0123431 A1 | 9/2002 | Jimenez et al. |
| 2004/0127366 A1 | 7/2004 | Bradbury et al. |
| 2005/0101493 A1 | 5/2005 | Bradbury et al. |
| 2006/0188651 A1 | 8/2006 | Bradbury et al. |
| 2008/0064613 A1 | 3/2008 | Massam |
| 2009/0192052 A1 | 7/2009 | Zhang |
| 2010/0009874 A1 | 1/2010 | Ballard et al. |
| 2010/0105834 A1 | 4/2010 | Tour et al. |
| 2010/0193186 A1 | 8/2010 | Smith |
| 2011/0003907 A1 | 1/2011 | Choi et al. |
| 2011/0045841 A1 | 2/2011 | Kuhlke et al. |
| 2011/0059871 A1 | 3/2011 | Tour et al. |
| 2011/0111988 A1 | 5/2011 | Ionescu Vasii et al. |
| 2011/0144386 A1 | 6/2011 | Tour et al. |
| 2011/0166047 A1 | 7/2011 | Patel et al. |
| 2011/0186293 A1* | 8/2011 | Gurmen ................. C09K 8/536 166/276 |
| 2011/0233452 A1 | 9/2011 | Kim et al. |
| 2011/0254553 A1* | 10/2011 | van Zanten ............. C09K 8/32 324/366 |
| 2012/0015852 A1 | 1/2012 | Quintero et al. |

FOREIGN PATENT DOCUMENTS

| | | | |
|---|---|---|---|
| JP | 2011190151 A | 9/2011 | |
| KR | 10-2010-0065359 A | 6/2010 | |
| WO | 2009158117 A2 | 12/2009 | |
| WO | 2010014786 A1 | 2/2010 | |
| WO | WO-2010147860 A1 * | 12/2010 | ............ B82Y 30/00 |
| WO | 2011/016889 A2 | 2/2011 | |
| WO | 2013/040356 A1 | 3/2013 | |

OTHER PUBLICATIONS

Written Opinion of the International Searching Authority issued in PCT/US2013/023468 dated Jun. 21, 2013 (8 pages).
Kosynkin, Dmitry V., et al., "Highly Conductive Graphene Nanoribbons by Longitudinal Splitting of Carbon Nanotubes Using Potassium Vapor"; American Chemical Society NANO, vol. 5, No. 2, Feb. 22, 2011; published online Jan. 4, 2011, www.acsnano.org, 10.1021/nn102326c; pp. 968-974.
Rao, S. S., et al., "Ferromagnetism in Graphene Nanoribbons: Split versus Oxidative Unzipped Ribbons"; American Chemical Society, NANO Letters, 2012, vol. 12; dx.doi.org/10.1021/nl203512c; pp. 1210-1217.
Higginbotham, Amanda L., et al., "Lower-Defect Graphene Oxide Nanoribbons from Multiwalled Carbon Nanotubes"; American Chemical Society, NANO, vol. 4, No. 4, 2010; published online Mar. 4, 2010, www.acsnano.org, 10.1021/nn100118m; pp. 2059-2069.
Marcano, Daniela C., et al., "Improved Synthesis of Graphene Oxide"; American Chemical Society, NANO, vol. 4, No. 8; published online Jul. 22, 2010, www.acsnano.org, 10.1021/nn1006368; pp. 4806-4814.
Mordkovich, V. Z., et al., "Intercalation into carbon nanotubes"; Carbon, 1996, vol. 34, Issue 10; pp. 1301-1303.
Han, Melinda Y., et al., "Energy Band-Gap Engineering of Graphene Nanoribbons"; The American Physical Society, Physical Review Letters, 98, 206805, week ending May 18, 2007; 0031-9007/07/98(20)/206805(4); pp. 206805-1-206805-4.
Chen, Zhihong, et al., "Graphene Nano-Ribbon ELectronics"; Physica E 40 (2007); pp. 228-232 (6 pages).
Schneipp, Hannes C., et al., "Functionalized Single Graphene Sheets Derived from Spllitting Graphite Oxide"; J. Phys. Chem. 14:01:35, Mar. 16, 2006; pp. 8535-8539 (13 pages).
Rollings, E., et al., "Synthesis and characterization of atomically-thin graphite films on a silicon carbide substrate"; J. Phys. Chem., Solids 67 (2006); pp. 2172-2177 (5 pages).
Li, Xiaolin, et al., "Chemically Derived, Ultrasmooth Graphene Nanoribbon Semiconductors"; Science 319 (2008); DOI: 10.1126/science.1150878, ISSN 0036-8075; pp. 1229-1232 (5 pages).
Yang, Xiaoyin, et al., "Two-Dimensional Graphene Nanoribbons"; Journal of the American Chemical Society, 130, 2008; pp. 4216-4217 (3 pages).
Campos-Delgado, Jessica, et al., "Bulk Production of a New Form of sp Carbon: Crystalline Graphene Nanoribbons"; American Chemical Society, NANO Letters, vol. 8, No. 9, 2008; DOI: 101021/nl801316d; publication date (Web): Aug. 14, 2008; pp. 2773-2778 (7 pages).
EPO Communication (Office Action) with Extended European Search Report dated Aug. 5, 2015, issued by the European Patent Office in corresponding European Application No. 13782176.5 (12 pages).
First Office Action dated Oct. 10, 2016, issued by the State Intellectual Property Office of the Peoples Republic of China in corresponding Chinese Patent Application No. 201380013960.5, with English translation (23 pages).
Office Action dated Jan. 19, 2017, issued by the Mexican Patent Office in corresponding Mexican Patent Application No. MX/a/2014/009001 (4 pages).
Office Action dated Feb. 7, 2017, issued by the Mexican Patent Office in corresponding Mexican Patent Application No. MXa/2014/009107, with English translation (9 pages).
Second Office Action dated Jan. 22, 2017, issued by the State Intellectual Property Office of the Peoples Republic of China in corresponding Chinese Patent Application No. 201380016938.6, with English translation (12 pages).

(56) References Cited

OTHER PUBLICATIONS

Official Action dated Aug. 10, 2017, issued by The State Intellectual Property Office (SIPO) of The Peoples Republic of China in related Chinese Patent Application No. CN-201380016938.6, with partial English translation Trragest 5 pages.
EPO Communication pursuant to Article 94(3) EPC (Office Action) dated Aug. 9, 2017, issued by the European Patent Office in European Patent Application No. EP-13741170.8 (10 pages).
Examiners Report issued in corresponding Canadian Application No. 2,862,899, dated Aug. 5, 2015 (3 pages).
First Office Action dated May 30, 2016, by The State Intellectual Property Office of The Peoples Republic of China in related Chinese Patent Application No. CN-2013800169386, with English translation (14 pages).
Search Report issued in corresponding European Application No. 13741170.8, dated Jul. 23, 2015 (9 pages).
V. Chandra et al.; "Water-Dispersible Magnetite-Reduced Graphene Oxide Composites for Arsenic Removal"; ACS Nano, vol. 4, No. 7, pp. 3979-3986; Jul. 27, 2010 (8 pages).
Office Action issued in Mexican Application No. MX/a/2014/009001; dated Feb. 2, 2018, with English letter reporting the same (5 pages).
EPO Communication pursuant to Article 94(3) EPC [Office Action] dated Sep. 4, 2018, issued by the European Patent Office in corresponding European Patent Application No. 13 741 170.8 (4 pages).
EPO Communication pursuant to Article 94(3) EPC [Office Action] dated May 4, 2018, issued by the European Patent Office in corresponding European Patent Application No. 13 741 1708 (5 pages).

\* cited by examiner

A

B

A

B $$\sigma(Scm^{-1}) = \frac{ln2 \times I(mA)}{\pi \times U(mV) \times \text{pellet thickness (cm)}} \quad \text{Eq. 2}$$

A

B

A

B

A

B

A

B

A

B

A

B

A

B

C

A

B

C

A

B

C

A

B

A

B

A

B

A

B

WELLBORE FLUIDS INCORPORATING MAGNETIC CARBON NANORIBBONS AND MAGNETIC FUNCTIONALIZED CARBON NANORIBBONS AND METHODS OF USING THE SAME

CROSS-REFERENCE TO RELATED APPLICATIONS

This application claims priority to U.S. Provisional Patent Application No. 61/591,355, filed on Jan. 27, 2012, and U.S. Provisional Patent Application No. 61/640,785, filed May 1, 2012. The entirety of each of the above-identified provisional applications is incorporated herein by reference.

BACKGROUND

Current geological logging techniques have numerous limitations, especially when a reservoir is filled with a viscous fluid, such as an oil-based drilling fluid. Such fluids provide impediments to resistance and conductivity. As a result, the data obtained from such fluids are generally low in resolution and difficult to interpret. Thus, more effective methods and compositions are needed to interpret and analyze data obtained from various fluids, such as oil-based fluids.

BRIEF SUMMARY

In one aspect, one or more embodiments relate to a method of performing wellbore operations that includes circulating a wellbore fluid comprising a magnetic carbon nanoribbon composition and a base fluid through a wellbore.

In another aspect, one or more embodiments relate to A method for electrical logging of a subterranean well that includes placing into the subterranean well a logging medium, wherein the logging medium comprises a non-aqueous fluid and one or more magnetic carbon nanoribbons, wherein the one or more magnetic carbon nanoribbons are present in a concentration so as to permit the electrical logging of the subterranean well; and acquiring an electrical log of the subterranean well.

In yet another aspect, one or more embodiments relate to a wellbore fluid that includes an oleaginous continuous phase; one or more magnetic carbon nanoribbons; and at least one weighting agent.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE FIGURES

FIG. 1A shows the intercalation of potassium (and likely some sodium) between the walls of multi-walled carbon nanotubes (MWNTs). FIG. 1B shows the splitting process of MWNTs and formation of active carboanionic edges (M=K$^+$ or Na$^+$). FIG. 1C shows in-situ functionalization and intercalation of GNRs with alkyl groups. FIG. 1D shows the deintercalation of functionalized GNRs.

FIG. 2A is an SEM of pristine Mitsui MWNTs and a 0.1 mg/mL suspension in chloroform. FIG. 2B is an SEM of pristine Nanotech Labs, Inc. (NTL) MWNT and a 0.1 mg/mL suspension in chloroform. FIG. 2C is an SEM of a Mitsui-originated HD-GNRs and a 0.1 mg/mL stable dispersion in chloroform. FIG. 2D is an SEM of NTL-originated HD-GNRs and a 0.1 mg/mL stable dispersion in chloroform.

FIG. 3A is an SEM of the device, which is made from a stack of hexadecylated-GNRs (HD-GNRs) and Pt electrodes. FIG. 3B shows a change in electrical properties after different thermal treatment compared to as-prepared HD-GNRs.

FIG. 4A is a TGA-MS of HD-GNRs. FIG. 4B is a TGA-MS of octylated GNRs (O-GNRs). FIG. 4C is a TGA-MS of butylated GNRs (B-GNRs).

FIG. 5A is a comparison of as-prepared intercalated HD-GNRs and thermally treated HD-GNRs, where deintercalation is observed. FIG. 5B is a comparison of functionalized HD-GNRs, O-GNRs, B-GNRs, GNRs and MWNTs. Peaks at 21.8°, 25.3°, 35.9°, 42.4°, 44.4°, 51.8°, 56.8°, and 58.4° 2θ angle correspond to low concentrations of KI impurity, which could, not be removed.

FIG. 10A is an SEM image of Mitsui-originated functionalized HD-GNRs. FIG. 10B is an optical microscope image of NTL-originated functionalized HD-GNRs.

FIG. 12A is the AFM image showing thickness of a single HD-GNR used in device for conductivity measurements. AFM images were obtained with a Digital Instruments Nanoscope Ma, operating in tapping mode, using Si tips n-doped with 1-10 Ωcm phosphorus (Veeco, MPP-11100-140). FIG. 12B is the corresponding profile plot.

FIG. 15A provides calculation of the hypothetical degree of edge functionalization with hexadecyl (HD) groups. FIG. 15B shows an SEM image of the HD-GNRs that was used to estimate the length and width of the HD-GNRs. The presumption was made that the edge carbons were functionalized.

FIG. 18A shows a GC plot of trapped (at 0° C.) condensate from HD-GNRs heated at 150° C. in high vacuum for 1 h. The concentration of the condensate contents was as follows: 45.1% dotriacontane, 35.1% hexadecane, 13.4% 1-iodohexadecane, and 6.4% hexadecene. Other minor components were disregarded. FIG. 18B shows a GC plot of a control reaction. The concentration of products was as follows: 59.6% dotriacontane, 20.8% hexadecene, and 19.6% hexadecane. The excess of 1-iodohexadecane (the major component) and other minor components were disregarded in calculating the percentages. FIG. 18C shows a GC plot of hexadecane standard. FIG. 18D shows a GC plot of 1-iodohexadecane standard.

FIG. 32A shows the GNRs that were randomly dispersed in solution and then dried outside of a magnetic field. FIG. 32B shows the GNRs that were aligned and dried inside of a magnetic field.

FIG. 33A shows the GNRs in the absence of a magnetic field. FIG. 33B shows the GNRs in the presence of a magnetic field.

FIG. 34A shows the GNRs in the absence of a magnetic field. FIG. 34B shows the GNRs in the presence of a magnetic field.

FIG. 35A shows the GNRs in the absence of a magnetic field. FIG. 35B shows the GNRs in the presence of a magnetic field.

FIG. 36A shows Fe-TD-GNRs synthesized in accordance with route 3 shown in FIG. 23C. FIG. 36B shows Fe-TD-GNRs synthesized in accordance with route 4 shown in FIG. 23D.

FIG. 40A shows a TEM image of an overview of a large area showing the conversion of MWNTs to PF-GNRs through liquid-phase intercalation of Mitsui MWNTs followed by addition of styrene. FIG. 40B shows a TEM image of the edge structure of 6-layer GNRs (the arrow points to the edge).

FIG. 42A shows a 3D TG-MS spectra of the gas phase in the thermal degradation of PF-GNRs and MWNTs. Different colors represent gas products with different m/z in which m is the mass of the gas products and z is the charge. The black and blue curves correspond to the TGA profile of PF-GNRs and starting MWNTs, respectively. FIG. 42B shows Raman spectra of PF-GNRs and MWNTs. FIG. 42C shows XPS survey spectrum of PF-GNRs. The inset is high-resolution XPS C1s spectrum of PF-GNRs, indicating PF-GNRs are nearly free of oxidation.

FIG. 43A is a photograph of the polymerization of styrene initiated by potassium-vapor-treated MWNTs. FIG. 43B is a representative SEM image of split MWNTs. The majority of MWNTs were split and ribbon-like structure could be identified in the image (see FIG. 44 for SEM images of Mitsui MWNTs treated with potassium vapor followed by addition of isoprene). FIG. 43C is a 3D plot of the TG-MS results of PF-GNRs and MWNTs. Different colors represent gas products with different m/z. The black and blue curves correspond to the TGA profile of PF-GNRs and MWNTs, respectively.

FIG. 44A is an SEM image of Mitsui MWNTs treated with potassium vapor followed by addition of isoprene. Most MWNTs are split but they are not fully exfoliated to form GNRs. The ribbon-like structure and split MWNTs bridged by polymer domains can be observed. Highlighted here (dashed circle) is a partially exfoliated tube associated with GNRs. FIG. 44B is a TEM image of an isolated PF-GNR sitting atop of fallacy carbon grid. FIG. 44C is a TEM image of the edge structure of multi-stack PF-GNRs.

FIG. 45A is an SEM image of NTL MWNTs treated with potassium naphthalenide in THF followed by addition of styrene. The majority of NTL MWNTs are split but they are not completely flattened to form ribbon-like structures (see FIG. 48 for SEM images of pristine NTL MWNTs). FIG. 45B is an SEM image of Baytubes treated with potassium naphthalenide in THF followed by addition of styrene. Some of the MWNTs are split due to intercalation followed by polymerization but many others retain their tube-like structure (see FIG. 49 for SEM image of pristine Baytubes).

FIG. 46A provides XRD patterns of Mitsui MWNTs, NTL MWNTs and Baytubes. The $d_{002}$ was calculated according to Bragg's equation $\lambda=2d \sin \theta$, where $\lambda$ is 1.54 Å for Cu K$\alpha$. FIG. 46B provides Raman spectra of Mitsui MWNTs, NTL MWNTs and Baytubes. Baytubes have the highest $I_D/I_G$, indicating the most defective graphitic structure. Also present is the combination of G+D band induced by disorder structure, which is not observed in Mitsui MWNTs or NTL MWNTs.

FIG. 47A is an SEM image of MWNTs treated with sodium naphthalenide followed by styrene. FIG. 47B is an SEM image of MWNTs treated with lithium naphthalenide followed by styrene. Most MWNTs remained intact in these two examples.

FIG. 51A is a representative SEM image of the formed PEO-GNRs. FIG. 51B is a TGA of the formed PEO-GNRs.

DETAILED DESCRIPTION

Figure 1:
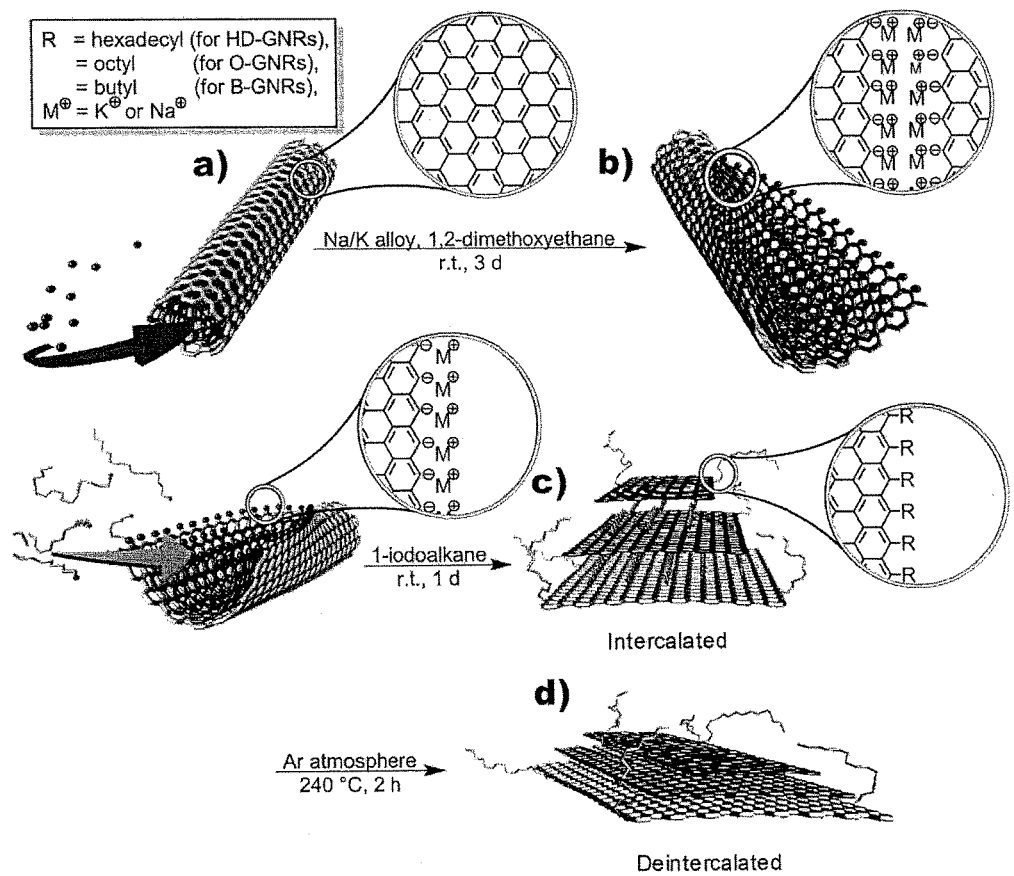
FIG. 1 provides reaction schemes for the in-situ intercalation replacement and selective functionalization of graphene nanoribbons (GNRs).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

In some embodiments, the present disclosure pertains to methods of making magnetic carbon nanoribbons. In some embodiments, such methods generally include: (1) forming carbon nanoribbons by splitting carbon nanomaterials; and (2) associating carbon nanoribbons with magnetic materials, precursors of magnetic materials, or combinations thereof. Further embodiments of the present disclosure also include a step of reducing magnetic material precursors to form magnetic materials. In additional embodiments, the methods of the present disclosure may also include a step of hydrolyzing the magnetic materials or magnetic material precursors. In various embodiments, the associating occurs before, during or after the splitting of the carbon nanomaterials.

In some embodiments, the methods of the present disclosure may also include a step of functionalizing the carbon nanoribbons with one or more functionalizing agents, such as alkyl groups, haloalkanes, iodoalkanes, hexadecyl groups, octyl groups, butyl groups, oxides, epoxides, alcohols, halides, aldehydes, ketones, esters, enones, nitriles, silyl chlorides, monomers, vinyl monomers, $CO_2$, $CS_2$, and combinations thereof.

In some embodiments, the functionalizing may occur in situ during the splitting of the carbon nanomaterials. In some embodiments, the functionalizing may form edge-functionalized carbon nanoribbons. In some embodiments where the functionalizing agent is a monomer, the functionalizing may form polymer-functionalized carbon nanoribbons. In some embodiments, the polymer-functionalized carbon nanoribbons may be edge-functionalized.

In some embodiments, the carbon nanomaterials are selected from the group consisting of single-walled carbon nanotubes, multi-walled carbon nanotubes, double-walled carbon nanotubes, triple-walled carbon nanotubes, few-walled carbon nanotubes, ultra-short carbon nanotubes, graphene ribbons, graphene nanoribbons, graphite, and combinations thereof. In more specific embodiments, the carbon nanomaterials comprise multi-walled carbon nanotubes.

In some embodiments, the magnetic material precursors comprise ferromagnetic precursors or ferrimagnetic precursors. In more specific embodiments, the magnetic material precursors comprise $FeCl_3$. Cobalt, iron, iron oxide, magnetite, ferrite, iron ferrite, nickel ferrite, magnesium ferrite, copper ferrite, manganese bismuth, manganese antimony, manganese ferrite, chromium dioxide, and nickel, are also illustrative ferromagnetic/ferromagnetic precursors that may be used in one or more embodiments.

In some embodiments, the magnetic materials are selected from the groups consisting of metal salts, metals, metallic alloys, metal oxides, and combinations thereof. In further embodiments, the magnetic materials are selected from the group consisting of lithium, sodium, potassium, cesium, rubidium, calcium, iron, cobalt, nickel, copper, manganese, gadolinium, yttrium, chromium, dysprosium, europium, alloys thereof, and combinations thereof.

Additional embodiments of the present disclosure pertain to magnetic carbon nanoribbon compositions that may have been formed by the methods of the present disclosure. Such compositions generally include functionalized carbon nanoribbons and magnetic materials associated with the carbon nanoribbons. The magnetic carbon nanoribbons of the present disclosure may also have various arrangements. In some embodiments, the magnetic carbon nanoribbons are arranged as single sheets. In some embodiments, the magnetic carbon nanoribbons are arranged as stacks. In some embodiments, the magnetic carbon nanoribbons comprise graphene nanoribbons. In some embodiments, the magnetic carbon nanoribbons comprise graphite nanoribbons.

Currently, there are two major electrical log techniques: the wireline logging or openhole logging (WL) technique; and the logging-while-drilling (LWD) technique. Both techniques provide data for the oil and gas exploration industry to determine the properties of various reservoirs. Both of the techniques are sensitive for the water-based drilling fluids, primarily due to the low resistance and high conductivity of such fluids. Due to many disadvantages of water-based fluids, drilling technologies have been focusing on oil-based fluids with more optimal properties in shale inhibition, borehole stability, lubricity, thermal stability, tolerance of contamination, and ease of maintenance.

While oil-based fluids provide advantageous properties, oil-based fluids are also highly resistive and nonconductive. As a result, the data obtained from oil-based fluids are generally low in resolution and difficult to interpret.

One or more embodiments of the present disclosure relate to the use of magnetic carbon nanoribbons in oil-based fluids to increase the conductivity of the fluids so that they can be used for WL and LWD techniques. The present disclosure also provides methods of making such magnetic carbon nanoribbons.

In some embodiments, the present disclosure pertains to methods of making magnetic carbon nanoribbons. In some embodiments, such methods generally include: (1) forming carbon nanoribbons by splitting carbon nanomaterials; and (2) associating carbon nanoribbons with magnetic materials, precursors of magnetic materials, or combinations thereof. In various embodiments, the associating occurs before, during or after the splitting of the carbon nanomaterials. In further embodiments, the methods of the present disclosure also include a step of functionalizing the carbon nanoribbons with one or more functionalizing agents.

In some embodiments, the methods of the present disclosure also include a step of reducing magnetic material precursors to form magnetic materials. In additional embodiments, the methods of the present disclosure may also include a step of hydrolyzing the magnetic materials or magnetic material precursors.

Additional embodiments of the present disclosure pertain to magnetic carbon nanoribbon compositions that may be formed by the methods of the present disclosure. Such compositions generally include carbon nanoribbons and magnetic materials associated with the carbon nanoribbons.

FIG. 1 provides an illustrative and non-limiting scheme of a method of forming magnetic graphene nanoribbons. As illustrated in FIG. 1, functionalized magnetic graphene nanoribbons can be formed by a two step approach. In the first step, multi-walled carbon nanotubes (MWNTs) are intercalated with magnetic materials (i.e., potassium metals). In the second step, the MWNTs are split. Meanwhile, the edges of the newly formed graphene nanoribbons are functionalized in situ.

More precisely, the first step in this embodiment could be divided into a sequence of treatments. MWNTs are heated together with ferromagnetic or ferrimagnetic precursors in the same reaction vessel but separate compartments. Once the heat treatment is over, intercalated ferromagnetic or ferrimagnetic precursors are hydrolyzed and reduced to form ferromagnetic or ferrimagnetic nanoparticles.

The second step in this embodiments can also be divided into a sequence of treatments. In the first treatment, the MWNTs are split in order to activate the edges. In the second step, the activated graphene nanoribbons are quenched with desired electrophiles.

As set forth in more detail below, the methods and compositions of the present disclosure have numerous variations. More specific and non-limiting embodiments of the present disclosure will now be described in more detail.

Carbon Nanomaterials

Various carbon nanomaterials may be used to make the magnetic carbon nanoribbon compositions of the present disclosure. In some embodiments, the carbon nanomaterials may include at least one of single-walled carbon nanotubes (SWNTs), multi-walled carbon nanotubes (MWNTs), double-walled carbon nanotubes (DWNTs), triple-walled carbon nanotubes (TWNTs), few-walled carbon nanotubes (FWNTs), ultra-short carbon nanotubes, graphite, and combinations thereof. In more specific embodiments, the carbon nanomaterials may include multi-walled carbon nanotubes. In further embodiments, the carbon nanomaterials may include diamond, amorphous carbon, buckminister fullerenes, glassy carbon, carbon nanofoams, lonsdaleite, linear acetylenic carbon, chaoite, and combinations thereof.

Magnetic Materials

The carbon nanoribbon compositions of the present disclosure may also be associated with various magnetic materials. In some embodiments, the magnetic materials may include at least one of metal salts, metals, alkali metals, metal carboxylates, metallic alloys, metal oxides, and combinations thereof. In further embodiments, the magnetic materials may be at least one of lithium, sodium, potassium, cesium, rubidium, calcium, iron, cobalt, nickel, copper, manganese, gadolinium, yttrium, chromium, dysprosium, europium, alloys thereof, and combinations thereof. In more specific embodiments, the magnetic materials may include ferromagnetic materials, ferrimagnetic materials, and combinations thereof. In further embodiments, the magnetic materials may include, without limitation, $Fe_2O_3$, $FeOFe_2O_3$, $NiOFe_2O_3$, $CuOFe_2O_3$, $MgOFe_2O_3$, MnBi, Ni, MnSb, $MnOFe_2O_3$, $Y_3Fe_5O_{12}$, $CrO_2$, MnAs, Gd, Dy, EuO and combinations thereof.

In some embodiments, the magnetic materials may be derived from precursors of magnetic materials. Non-limiting examples of magnetic material precursors include ferromagnetic precursors, ferrimagnetic precursors and combinations thereof. In some embodiments, the magnetic material precursors may include metal halides, metal carboxylates, metal oxides, or combinations thereof. In more specific embodiments, the magnetic material precursor may include $FeCl_3$. As set forth in more detail below, such magnetic material precursors may be converted to magnetic materials by various methods, such as reduction.

Association of Carbon Nanoribbons with Magnetic Materials or Precursors

Various methods may also be used to associate carbon nanoribbons with magnetic materials or their precursors. In some embodiments, the association occurs before the splitting of carbon nanomaterials into carbon nanoribbons. In some embodiments, the association occurs after the splitting of the carbon nanomaterials into carbon nanoribbons. In some embodiments, the association occurs during the splitting of the carbon nanomaterials into carbon nanoribbons.

In further embodiments, the association occurs at two or more of the aforementioned times. For instance, in some embodiments, the association occurs before, during and after the splitting of the carbon nanomaterials into carbon nanoribbons.

Furthermore, carbon nanoribbons may be associated with magnetic materials or their precursors while the magnetic materials or their precursors are in various states. For instance, in some embodiments, the association may occur while the magnetic materials or their precursors are in a gaseous phase. In some embodiments, the association may occur while the magnetic materials or their precursors are in a liquid phase. In some embodiments, the association may occur while the magnetic materials or their precursors are in a liquid phase or a gaseous phase.

In some embodiments, the association may include heating the carbon nanomaterials or carbon nanoribbons in the presence of the magnetic materials (or their precursors). In more specific embodiments, the heating may occur at temperatures that range from about 50° C. to about 1000° C. In some embodiments, the heating may occur at temperatures that range from about 100° C. to about 800° C. In some embodiments, the heating may occur at temperatures that range from about 100° C. to about 400° C. In some embodiments, the heating may occur anywhere from about 1 hour to about 48 hours. In more specific embodiments, the heating may occur at a temperature of about 350° C. for about 24 hours.

Various heating conditions may also be used. In some embodiments, the heating may occur in an inert atmosphere. In some embodiments, the inert atmosphere includes a vacuum. In some embodiments, the inert atmosphere may include a steady stream of one or more inert gases, such as $N_2$, Ar, and combinations thereof. In some embodiments, the heating may occur in an environment containing $H_2$. In some embodiments, $H_2$ can be diluted with an inert gas, such as $N_2$ or Ar. In some embodiments, the heating can occur in the presence of a chemical oxidant, a reductant, or both.

In some embodiments, the heating of carbon nanoribbons or carbon nanomaterials and magnetic materials (or their precursors) may occur in separate compartments. For instance, in some embodiments, carbon nanomaterials and magnetic materials (or their precursors) may be placed in separate compartments of a reaction vessel. Thereafter, the reaction vessel may be heated under vacuum in an inert atmosphere.

In more specific embodiments, MWNTs may be heated together with ferromagnetic or ferrimagnetic precursors (such as $FeCl_3$, a metal halide, a metal carboxylate, or a metal oxide) in the same reaction vessel but separate compartments. The reaction vessel may then be placed under high vacuum and heated at 350° C. for 24 hours.

The magnetic materials (or their precursors) may become associated with the carbon nanoribbons in various manners. In some embodiments, the magnetic materials or their precursors may become, intercalated with the carbon nanoribbons. In some embodiments, the magnetic materials or their precursors may become associated with carbon nanoribbons by covalent bonds, non-covalent bonds, chemisorption, physisorption, dipole interactions, van der Waals forces, and combinations thereof.

Conversion of Magnetic Material Precursors to Magnetic Materials

In some embodiments, where magnetic material precursors are associated with carbon nanoribbons, the methods of the present disclosure may also include a step of converting the magnetic material precursors to magnetic materials. In some embodiments, the converting involves reducing the magnetic material precursors. In some embodiments, the reduction of the magnetic material precursors may include exposure of the magnetic material precursors to a reducing agent. Illustrative reducing agents include, but not limited to sodium borohydride ($NaBH_4$), or hydrogen ($H_2$), hydrazine, lithium aluminum hydride ($LiAlH_4$), zinc, and combinations thereof. In some embodiments, the reducing agent may include $H_2$ or diluted $H_2$.

In some embodiments, magnetic material precursors may be reduced (e.g. by a reducing agent such as $H_2$ or diluted $H_2$) in an inert atmosphere. In some embodiments, the inert atmosphere may be under a vacuum. In some embodiments, the inert atmosphere may be under a stream of one or more inert gases (e.g., Ar, $N_2$, etc.).

In some embodiments, magnetic material precursors may be reduced (e.g. by a reducing agent) at elevated temperatures. In some embodiments, elevated temperatures may range from about 100° C. to about 1600° C. In some embodiments, elevated temperatures may range from about 600° C. to about 1000° C.

In more specific embodiments, the reduction step may be used to convert associated ferromagnetic or ferrimagnetic precursors to ferromagnetic or ferrimagnetic nanoparticles. In further embodiments, such reduction steps may occur in a flask at 120° C. by treatment with a water steam and subsequent treatment in an $Ar/H_2$ atmosphere at about 100° C. In some embodiments, magnetic material precursors may be reduced by $H_2$ or diluted $H_2$.

Hydrolysis of Magnetic Materials or Precursors

In additional embodiments, the methods of the present disclosure also include a step of hydrolyzing the magnetic materials or their precursors. In some embodiments, the hydrolysis may occur by exposure of the magnetic materials to water vapor. In some embodiments, the hydrolysis may occur at temperatures that range from about 25° C. to about 1600° C. In some embodiments, the hydrolysis may occur at temperatures that range from about 25° C. to about 150° C.

Splitting of Carbon Nanomaterials

Various methods may also be used to split (or "unzip") carbon nanomaterials to form carbon nanoribbons. In some embodiments, carbon nanomaterials may be split by exposure to potassium, sodium, lithium, alloys thereof, metals thereof, salts thereof, and combinations thereof. For instance, in some embodiments, the splitting may occur by exposure of the carbon nanomaterials to a mixture of sodium and potassium alloys, a mixture of potassium and naphthalene solutions, and combinations thereof. Additional variations of such embodiments are described in U.S. Provisional Application No. 61/534,553 entitled "One Pot Synthesis of Functionalized Graphene Oxide and Polymer/Graphene Oxide Nanocomposites." Also see PCT/US2012/055414, entitled "Solvent-Based Methods For Production Of Graphene Nanoribbons." Also see Higginbotham et al., "Low-Defect Graphene Oxide Oxides from Multiwalled Carbon Nanotubes," ACS Nano 2010, 4, 2059-2069. Also see Applicants' co-pending U.S. patent application Ser. No. 12/544,057 entitled "Methods for Preparation of Graphene Oxides From Carbon Nanotubes and Compositions, Thin Composites and Devices Derived Therefrom." Also see Kosynkin et al., "Highly Conductive Graphene Oxides by Longitudinal Splitting of Carbon Nanotubes Using Potassium Vapor," ACS Nano 2011, 5, 968-974. Also see WO 2010/14786A1.

The splitting of the carbon materials may occur under various conditions. In some embodiments, the splitting may occur in the presence of solvents. Suitable solvents include, without limitation, anhydrous and degassed aprotic solvents, such as 1,2-dimethoxyethane or tetrahydrofuran. In some embodiments, the splitting may occur in the absence of any solvents. In some embodiments, the splitting may occur at room temperature or at elevated temperatures (e.g., temperatures that range from about 25° C. to about 1600° C.).

Furthermore, the splitting reaction may take place anywhere from several hours to several days. For instance, in some embodiments, the splitting reaction may take place anywhere from about 12 hours to about 3 days. In more specific embodiments, MWNTs may be split by exposure to potassium/naphthalene mixtures or sodium/potassium alloys at room temperature for hours or 3 days.

As set forth in more detail below, the split carbon nanomaterials of the present disclosure may be subsequently functionalized with one or more suitable functionalizing agents under various conditions.

Functionalization

Various methods may also be used to functionalize magnetic carbon nanoribbons with one or more functionalizing agents. In various embodiments, the functionalization occurs before, during or after the splitting of carbon nanomaterials into carbon nanoribbons. In some embodiments, the functionalization occurs in situ while carbon nanomaterials are being split into carbon nanoribbons. In some embodiments, the functionalization occurs in a separate step after the carbon nanomaterials are split into carbon nanoribbons. In some embodiments, the functionalization occurs both during and after the splitting of the carbon nanomaterials into carbon nanoribbons. In further embodiments, the functionalization occurs before, during and after the splitting of carbon nanomaterials into carbon nanoribbons.

Various regions of the carbon nanoribbons may be functionalized. For instance, in some embodiments, the functionalization may include the functionalization of one or more edges of the carbon nanoribbons (i.e., edge functionalization). In some embodiments, the functionalization may include the functionalization of one or more walls of the carbon nanoribbons (i.e., wall functionalization). In further embodiments, the functionalization may include both wall and edge functionalization.

In more specific embodiments, the functionalization occurs after the splitting of the carbon nanomaterials. In some embodiments, the splitting may lead to the activation of various regions of the carbon nanomaterials, such as the edges. For instance, splitting by potassium or sodium may lead to the formation of carbanions on the edges of the formed carbon nanoribbons. Thereafter, the activated regions in the carbon nanoribbons may be quenched with a desired electrophilic functionalization agent, such as an electrophilic alkyl group (e.g., 1-iodotetradecane, 1-iodoalkane, etc.). This in turn leads to the edge functionalization of the formed carbon nanoribbons. Other regions of the carbon nanoribbons may also be functionalized by this mechanism.

Additional variations of methods of functionalizing carbon nanoribbons are described in U.S. Provisional Application No. 61/534,553 entitled "One Pot Synthesis of Functionalized Graphene Oxide and Polymer/Graphene Oxide Nanocomposites." Also see PCT/US2012/055414, entitled "Solvent-Based Methods For Production Of Graphene Nanoribbons." Also see Higginbotham et al., "Low-Defect Graphene Oxide Oxides from Multiwalled Carbon Nanotubes," ACS Nano 2010, 4, 2059-2069. Also see Applicants' co-pending U.S. patent application Ser. No. 12/544,057 entitled "Methods for Preparation of Graphene Oxides From Carbon Nanotubes and Compositions, Thin Composites and Devices Derived Therefrom." Also see Kosynkin et al., "Highly Conductive Graphene Oxides by Longitudinal Splitting of Carbon Nanotubes Using Potassium Vapor," ACS Nano 2011, 5, 968-974. Also see US 2011/0059871 A1.

Various functionalizing agents may also be used to functionalize the carbon nanoribbons of the present disclosure. In some embodiments, the functionalizing agents include, without limitation, at least one of alkyl groups, haloalkanes, iodoalkanes, hexadecyl groups, octyl groups, butyl groups, oxides, epoxides, alcohols, halides, aldehydes, ketones, esters, enones, nitriles, silyl chlorides, monomers, vinyl monomers, $CO_2$, $CS_2$, and combinations thereof. In more specific embodiments, the functionalizing agents include, without limitation, iodoalkanes, such as 1-iodohexadecane, 1-iodooctane, 1-iodotetradecane, 1-iodoalkane, and 1-iodobutane. In further embodiments, the functionalizing agents include, without limitation, haloalkanes. In further embodiments, the functionalizing agents include, without limitation, alkanes, alkenes, dimers of alkanes, hexadecyl groups, octyl groups, butyl groups, and the like.

In additional embodiments, functionalizing agents may include one or more monomers. In some embodiments, the monomers may include at least one of vinyl monomers, amines, alkenes, alkanes, carbohydrates, epoxides, and combinations thereof. In some embodiments, the monomers may include vinyl monomers. In some embodiments, the monomers may include epoxides, such as ethylene oxides. In some embodiments, the monomers may polymerize during functionalization to form polymer-functionalized carbon nanoribbons. In some embodiments, the polymer-functionalized carbon nanoribbons may be edge-functionalized.

The functionalization step may occur under various conditions. In some embodiments, the functionalization occurs under aqueous conditions. In some embodiments, the functionalization occurs under gaseous conditions. In some embodiments, the functionalization occurs under non-aqueous conditions. In some embodiments, functionalization may occur in the presence of protic solvents, such as methanol. In some embodiments, the functionalization may occur in the absence of any solvents.

Reaction Conditions

More generally, each of the aforementioned steps of the present disclosure may occur under various reaction conditions. In some embodiments, one or more of the steps of the present disclosure are carried out in the absence of any solvents. In additional embodiments, one or more the steps of the present disclosure are carried out in the presence of solvents. In some embodiments, the solvent may include, without limitation, ethereal solvents, diethyl ether, tetrahydrofuran, 1,4-dioxane, glyme, 1,2-dimethoxyethane, diglyme, tetraglyme, methanol, and combinations thereof.

Magnetic Carbon Nanoribbon Compositions

Additional embodiments of the present disclosure pertain to magnetic carbon nanoribbon compositions. Such compositions generally include carbon nanoribbons and magnetic materials associated with the carbon nanoribbons. In some embodiments, the magnetic carbon nanoribbons are made by the methods of the present disclosure.

The compositions of the present disclosure may have various magnetic carbon nanoribbons. In some embodiments, the magnetic carbon nanoribbons include graphene nanoribbons (GNRs). Examples of suitable GNRs include, without limitation, functionalized graphene nanoribbons, pristine graphene nanoribbons, doped graphene nanoribbons, functionalized graphene oxide nanoribbons, pristine graphene oxide nanoribbons, doped graphene oxide nanoribbons, reduced graphene oxide nanoribbons (also referred to as chemically converted graphene), stacked graphene nanoribbons, and combinations thereof.

In more specific embodiments, the magnetic carbon nanoribbons of the present disclosure are functionalized with one or more functional groups (as previously described). In some embodiments, the magnetic carbon nanoribbons are functionalized on one or more edges (i.e., edge-functionalized carbon nanoribbons). Non-limiting examples of functionalized magnetic graphene nanoribbons include, without limitation, hexadecylated-GNRs (HD-GNRs), octylated-GNRs (O-GNRs), butylated-GNRs (B-GNRs), and combinations thereof.

In some embodiments, the functionalized carbon nanoribbons include polymer-functionalized carbon nanoribbons. In some embodiments, the polymer-functionalized carbon nanoribbons are edge-functionalized. In some embodiments, the polymer-functionalized carbon nanorribons are functionalized with vinyl polymers. In some embodiments, the vinyl polymers may include at least one of polyethylene, polystyrene, polyvinyl chloride, polyvinyl acetate, polyvinyl alcohol, polyacrylonitrile, and combinations thereof.

In some embodiments, the polymer-functionalized carbon nanoribbons may be functionalized with poly(ethylene oxides) (also known as poly(ethylene glycols)). In more specific embodiments, the polymer-functionalized carbon nanoribbons may include polyethylene oxide-functionalized graphene nanoribbons (PEO-GNRs).

The magnetic carbon nanoribbon compositions of the present disclosure may have various ranges of conductivity. In some embodiments, the magnetic carbon nanoribbons have a conductivity ranging from about 1 S/cm to about 1,000,000 S/cm. In more specific embodiments, the magnetic carbon nanoribbons have a conductivity ranging from about 600 S/cm to about 4300 S/cm. In more specific embodiments, the magnetic carbon nanoribbons have a conductivity that ranges from about 3000 S/cm to about 4300 S/cm. In further embodiments, the magnetic carbon nanoribbons have a conductivity of about 3500 S/cm or 4260 S/cm. Without being bound by theory, Applicants envision that the bulk conductivity of the magnetic carbon nanoribbon compositions of the present disclosure is retained due to intact basal graphitic planes and content of the conductive metals.

The magnetic carbon nanoribbons of the present disclosure may also have various aspect ratios. For instance, in some embodiments, the magnetic carbon nanoribbons of the present disclosure have an aspect ratio in length-to-width greater than or equal to 2, greater than 10, or greater than 100. In some embodiments, the magnetic carbon nanoribbons have an aspect ratio greater than 1000. In further embodiments, the magnetic carbon nanoribbons of the present disclosure have an aspect ratio in length-to-width greater than or equal to 2.

The magnetic carbon nanoribbons of the present disclosure may also have various arrangements. In some embodiments, the magnetic carbon nanoribbons are arranged as single sheets. In other embodiments, the magnetic carbon nanoribbons are arranged as stacks. In some embodiments, the magnetic carbon nanoribbons are arranged as stacks of about 2 to 100 sheets. In some embodiments, the magnetic carbon nanoribbons include graphene nanoribbons that are arranged as individual sheets. In some embodiments, the magnetic carbon nanoribbons include graphene nanoribbons that are arranged as stacks of about 2 to about 10 sheets. In some embodiments, the magnetic carbon nanoribbons include graphite nanoribbons (i.e., 10 or more stacked sheets of graphene nanoribbons).

The magnetic carbon nanoribbons of the present disclosure may also have various sizes. In some embodiments, the magnetic carbon nanoribbons may have lengths or diameters that range from about a few nanometers to a few hundred microns to several centimeters. In more specific embodiments, the magnetic carbon nanoribbons may have lengths or diameters that range from about 1 nanometers to about 3 centimeters. In further embodiments, magnetic carbon nanoribbons may be about 100-250 nm in width and 3 µm in length.

In further embodiments, the magnetic carbon nanoribbons may be magnetic carbon nanoribbons derived from exfoliated graphite, graphene nanoflakes, or split carbon nanotubes (such as multi-walled carbon nanotubes, as described previously). In more specific embodiments of the present disclosure, the magnetic graphene nanoribbons are derived from the direct oxidation of graphite. In some embodiments, the oxidation of graphite could be through chemical methods, electrochemical methods or combinations of chemical methods and electrochemical methods that may occur simultaneously or sequentially in either order. In some embodiments, magnetic carbon nanoribbons are derived by the chemical oxidation of graphite. Examples of methods of oxidizing graphite are disclosed in Applicants' prior work. See, e.g., Marcano, et al., "Improved Synthesis of Graphene Oxide" *ACS Nano* 2010, 4, 4806-4814. Also see U.S. Provisional Patent Application Nos. 61/180,505 and 61/185,640. Also see WO 2011/016889.

In various embodiments, the magnetic carbon nanoribbons may also be doped with various additives. In some embodiments, the additives may be one or more heteroatoms of B, N, O, Al, Au, P, Si or S. In more specific embodiments, the doped additives may include, without limitation, melamine, carboranes, aminoboranes, phosphines, aluminum hydroxides, silanes, polysilanes, polysiloxanes, sulfides, thiols, dihalogen and combinations thereof. In more specific embodiments, the magnetic carbon nanoribbons may be $Cl_2$, $Br_2$, $I_2$, ICl, silver nitrate, $HNO_3$ doped and/or $AuCl_3$ doped.

As set forth in more detail in the Examples below, the magnetic carbon nanoribbon compositions of the present disclosure may exhibit desirable properties, such as optimal bulk conductivity, adequate dispersability, and magnetic anisotropy. The latter property enables the compositions to form highly ordered and aligned structures in various media in the presence of a magnetic field. For instance, in some embodiments, the magnetic carbon nanoribbons of the present disclosure align in the direction of a magnetic filed. In more specific embodiments, the magnetic carbon nanoribbons of the present disclosure align in organic solvents in the presence of external magnetic fields.

Without being bound by theory, Applicants envision that optimal dispersability of the magnetic carbon nanoribbons is achieved in one or more embodiments because of edge functional groups. Likewise, it is envisioned that magnetic anisotropy is achieved due to physisorbed-associated ferromagnetic or ferrimagnetic particles.

Applications

As set forth previously, the present disclosure provides highly conductive magnetic carbon nanoribbons that can disperse in various solvents and align in the presence of external magnetic fields. The latter properties should result in conduction percolation of magnetic carbon nanoribbons at lower concentrations.

In turn, the aforementioned properties provide various applications for the magnetic carbon nanoribbons of the present disclosure. For instance, in some embodiments, the magnetic carbon nanoribbons of the present disclosure may be used as additives in oil based wellbore fluids and other fluids in which highly ordered conductive coatings or materials are desired. In some embodiments, the magnetic carbon nanoribbons of the present disclosure may be used as reinforcement fillers for organic and inorganic composite materials, additives for improving barrier properties of polymer matrices, conductive fluids, conductive films, semiconductive films, conductive displays, touch-screen displays, de-icing circuits, aircraft composites, radar covers, batteries, electroactive materials, supercapacitors, and other devices. In further embodiments, magnetic carbon nanoribbons of the present disclosure may be used as precursors or components of cathode materials, Li-ion batters, Li-poly batteries, solar cells, transparent electrodes, ultracapacitors, transparent touch screens, and other similar devices.

In more specific embodiments, magnetic carbon nanoribbons of the present disclosure may be used as components of drilling fluids, completion fluids, and logging fluids. In further embodiments, magnetic carbon nanoribbons of the present disclosure may be used as components of oil-based drilling fluids, water-based drilling fluids, emulsion-based drilling fluids, invert-emulsion-based drilling fluids, conductive drilling fluids, magnetic drilling fluids, and combinations of such fluids.

In some aspects, embodiments disclosed herein relate to electrically conductive wellbore fluids. More specifically, embodiments disclosed herein relate to wellbore fluids containing one or more carbon nanomaterials. In some embodiments, wellbore fluids disclosed herein may be an oil-based wellbore fluid, in which the continuous phase of the fluid is an oleaginous fluid.

In other aspects, embodiments disclosed herein relate to methods for creating or improving conductivity in wellbore fluids. Certain embodiments disclosed herein also relate to methods for electrical logging of a subterranean well including placing into the subterranean well a logging medium, where the logging medium comprises a non-aqueous fluid and one or more magnetic carbon nanoribbons, where the magnetic nanoribbons are present in a concentration so as to permit the electrical logging of the subterranean well. More specifically, embodiments disclosed herein relate to wellbore fluids containing additives, and methods for obtaining such wellbore fluids, whereby the additives increase the conductivity of the fluid, thereby allowing for electrical logging of the subterranean well.

The oil-based wellbore fluids of the present disclosure may include fluids that are substantially comprised of an oleaginous liquid, as well as emulsions of oleaginous and non-oleaginous fluids. In particular, various embodiments of the present disclosure may provide for an invert emulsion wellbore fluid. "Invert emulsion," as used herein, is an emulsion in which a non-oleaginous fluid is the discontinuous phase and an oleaginous fluid is the continuous phase.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

"Non-oleaginous liquid," as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these.

In the process of rotary drilling a well, a wellbore fluid or mud is circulated down the rotating drill pipe, through the bit, and up the annular space between the pipe and the formation or steel casing, to the surface. The wellbore fluid performs different functions. It removes cuttings from the bottom of the hole to the surface, suspends cuttings and weighting material when the circulation is interrupted, controls subsurface pressure, isolates the fluids from the formation by providing sufficient hydrostatic pressure to prevent the ingress of formation fluids into the wellbore, cools and lubricates the drill string and bit, maximizes penetration rate etc. An important objective in drilling a well is also to secure the maximum amount of information about the type of formations being penetrated and the type of fluids or gases in the formation. This information is obtained by analyzing the cuttings and by electrical logging technology and by the use of various downhole logging techniques, including electrical measurements.

Wellbore fluids may be classified according to the primary component of the continuous phase, which are predominantly one of aqueous (water-based) wellbore fluids and non-aqueous (oleaginous or oil-based) wellbore fluids. Although oil-based wellbore fluids are more expensive than water-based muds, they are more often used for drilling operations because of their operational advantage and superior technical performance when compared with water-based muds.

In spite of the general preference for oil-based wellbore fluids, these wellbore fluids have a technical disadvantage for electrical well-logging because of their very low electrical conductivity. Various logging and imaging operations are performed during the drilling operation, for example while drilling in the reservoir region of an oil/gas well in order to determine the type of formation and the material therein. Such information may be used to optimally locate the pay zone, i.e., where the reservoir is perforated in order to allow the inflow of hydrocarbons to the wellbore.

Some logging tools work on the basis of a resistivity contrast between the fluid in the wellbore (wellbore fluid) and that already in the formation. These are known as resistivity logging tools. Briefly, alternating current flows through the formation between two electrodes. Thus, the fluids in the path of the electric current are the formation fluids and the fluid that has penetrated the formation by way of filtration. The filtercake and filtrate result from filtration of the mud over a permeable medium (such as formation rock) under differential pressure.

Another example where fluid conductivity plays a part in the drilling operation is in directional drilling where signals produced at the drill assembly have to be transmitted through an electrically conductive medium to the control unit and/or mud telemetry unit further back on the drill string. In some instances, such resistivity measurements may be useful in geosteering and directional drilling control.

The use of resistivity logging tools is often limited to cases where a water-based wellbore fluid is used for the drilling operations because the low conductivity of the base-oil in the case of oil/synthetic-base wellbore fluids precludes the use of resistivity tools in such fluids. The case is similarly true for invert emulsion wellbore fluids. Invert emulsion wellbore fluids are water-in-oil emulsions in which oil is the continuous or external phase, and water is the internal phase. Thus, when invert emulsion fluids are used, any electrical path through the fluid is insulated due to the non-conductive nature of the external oil phase. In other words, even though the brine dispersed in the oil phase is electrically conductive, the discontinuous nature of the droplets prevents the flow of electricity. Indeed, the inability of these emulsions to conduct electricity (until a very high potential difference is applied) is used as a standard test of emulsion stability. The non-conductive nature of invert emulsion wellbore fluids severely limits the amount and clarity of resistivity information that may be gathered from a wellbore using wireline logging.

Thus, embodiments of methods disclosed herein include methods of logging a subterranean well and wellbore fluids useful in such methods. In some embodiments, the methods may include placing into the subterranean well wellbore fluids, including non-aqueous fluids such as invert emulsions. The wellbore fluids may include one or more graphene-based carbon nanomaterials of the present disclosure present in a concentration so as to permit or improve the electrical logging of the well by the increased electrical conductance of the wellbore fluid. In some embodiments, the one or more carbon nanomaterials may be added to the wellbore fluids after the wellbore fluids have been placed into the subterranean well. Other embodiments include the drilling of a subterranean well with an oleaginous-based wellbore fluid described herein. In such embodiments, the oleaginous-based wellbore fluids of the present disclosure may be formulated so as to enable one to take electrical log measurements of the subterranean well, despite the naturally low conductivity of the fluid.

In some embodiments, during logging and while using wellbore fluids and carbon nanomaterials as described herein, wireline logs may be used to take measurements of relative resistivity of the formation. The measurements of relative resistivity of the formation may be used to determine geological composition of the downhole formation. Also, such resistivity measurements may be useful to determine the location of the drill bit to enhance geosteering capabilities and directional drilling control. In some embodiments, the wellbore fluids and magnetic carbon nanoribbons disclosed herein may be used with drilling systems having a measurement-while-drilling ("MWD") system. For example, drilling and formation data and parameters may be determined from various downhole measuring devices and may be transformed downhole into selected parameters of interest and then transferred by telemetry to the surface.

In other embodiments, the measurements may be stored downhole for subsequent retrieval, or they may be both transferred via telemetry to the surface and/or stored downhole. In some embodiments, measurements may be depth-correlated, using depth measurements made downhole for improving accuracy of the measurements and the parameters of interest. In additional embodiments, the measurements and/or parameters may be correlated with stored reference data for providing additional information pertaining to the drilling operations and the formation characteristics. Thus, the logging measurements may be used to determine the drill bit location relative to the desired drilling path and to adjust the drilling activity downhole. Thus, these electrical logs and other wireline log techniques may determine the nature of the geology and the reservoir properties of the petroleum bearing formations penetrated by the well, as well as other properties of the drilling process (e.g., the location of the drill bit).

Thus, embodiments of the present disclosure may incorporate one or more magnetic carbon nanoribbons in such an amount that the wellbore fluid is electrically conductive and useful any application where conductive wellbore fluids have previously been employed, including, for example, wellbore logging and geosteering applications. The magnetic carbon nanoribbons described herein may be added to any wellbore fluid, or a custom wellbore fluid formulation may be prepared.

It is specifically within the scope of the present disclosure that wellbore including magnetic carbon nanoribbons may be used in any type of wellbore operation in which the fluid is circulated through a wellbore (or at least pumped into a well), including, for example, drilling operations, completion operations, etc. Thus, for example, in embodiments, the fluid is circulated through the wellbore as the well is drilled. In embodiments, the fluid may be circulated through the wellbore before or during one or more completion operations (in which completion equipment is installed in a well). Further, as mentioned above, in one or more embodiments, the fluid may be circulated into the well, before or during logging of the well (including logging while drilling).

Further, in one or more embodiments, depending on the type of materials associated with the carbon nanoribbons, and whether the materials is ferromagnetic or paramagnetic, etc., a magnetic field may be induced within the wellbore so that, for example, paramagnetic carbon nanoribbons may align to increase nanoribbon-to-nanoribbon contact (and increase conductivity of the fluid). As defined herein, alignment means any change in orientation of any magnetic carbon nanoribbons within the fluid. In one or more embodiments, alignment may include alignment of at least 5 percent of the magnetic carbon nanoribbons, or at least 10, 15, or 20 percent in one or more other embodiments.

In one or more embodiments the magnetic carbon nanoribbons may have a d/g ratio having a lower limit equal to or greater than, 0.1, 0.2, 0.3, and 0.4 to an upper limit of 0.3, 0.4, 0.5, 0.6, 0.8, 0.9, and 1, where the d/g ratio of the carbon nanomaterials may range from any lower limit to any upper limit.

Dispersion of magnetic carbon nanribbons may be accomplished by a number of methods including, for example, stirring, sonicating, or combinations thereof. In various embodiments, the methods include suspending the carbon nanoribbons in a surfactant to facilitate the dispersing step, such as a surfactant already being used in the wellbore fluid. In various embodiments, dispersion is also accomplished by functionalizing the carbon nanoribbons with various functionalizing agents. In some embodiments, the functionalizing agents include, without limitation, at least one of alkyl groups, haloalkanes, iodoalkanes, hexadecyl groups, octyl groups, butyl groups, oxides, epoxides, alcohols, halides, aldehydes, ketones, esters, enones, nitriles, silyl chlorides, vinyl monomers, $CO_2$, $CS_2$, and combinations thereof. In more specific embodiments, the functionalizing agents include, without limitation, iodoalkanes, such as 1-iodohexadecane, 1-iodooctane, 1-iodotetradecane, 1-iodoalkane, and 1-iodobutane. In further embodiments, the functionalizing agents include, without limitation, haloalkanes. In further embodiments, the functionalizing agents include, without limitation, alkanes, alkenes, dimers of alkanes, hexadecyl groups, octyl groups, butyl groups, and the like.

In some embodiments, magnetic carbon nanoribbons may be incorporated into wellbore fluids at a percent by weight (wt %) of 5 wt % or less. In yet another embodiment, carbon nanomaterials may be incorporated into wellbore fluids up to about 12% without introducing excessive viscosity that may render the wellbore fluid unsuitable for pumping through a drill string.

Dispersants effective for increasing the stability of the carbon nanoribbons in aqueous fluids or the aqueous phases of an emulsion included polyethylene glycol p-(1,1,3,3-tetramethylbutyl)-phenyl ether, sodium dodecyl benzene sulfonate, sodium dodecyl sulfate, dodecyl trimethyl ammonium bromide, cetyl trimethyl ammonium bromide, sodium alkyl sulfosuccinate, polystyrene sulfonate, sodium n-lauroylsarcosinate, polyvinyl pyrrolidone, poloxamers such as Pluronic™, polyethylene oxide/polybutylene oxide triblock copolymers, polysorbate detergents such as polyoxyethylene sorbitan monolaurate, polyoxyethylene sorbitan monooleate, and the like.

Effective dispersants of carbon nanoribbons within oil-based or oleaginous fluids include polyisobutene succinimide, polythiophene and copolymers of thiophene and 3-hexylthiophene, as described in U.S. Pat. Pub. No. 2011/0003907, which are incorporated herein by reference. In other embodiments, alkylated polyvinyl pyrrolidone polymer dispersants may be used such as the Ganex® series of dispersants available from Ashland (Wayne, N.J.).

In some embodiments, one or more dispersants may be added to the wellbore fluid at a concentration in the range of 0.05 wt % to 1 wt %. In other embodiments, dispersants may be added to the wellbore fluid at a concentration in the range of 0.1 wt % to 0.8 wt %. In yet more embodiments, the dispersant concentration added to the wellbore may fall within the range of 0.3 wt % to 0.7 wt %.

Wellbore fluids described herein may be oil-based wellbore fluids or invert emulsions in one or more embodiments. Suitable oil-based or oleaginous fluids may be a natural or synthetic oil and in some embodiments, in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

In other embodiments, the wellbore fluid may be an invert emulsion having a continuous oleaginous phase and a discontinuous aqueous (or non-oleaginous liquid) phase, among other substances and additives. Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The amount of oleaginous liquid in the invert emulsion fluid may vary depending upon the particular oleaginous fluid used, the particular non-oleaginous fluid used, and the particular application in which the invert emulsion fluid is to be employed. However, in some embodiments, the amount of oleaginous liquid may be sufficient to form a stable emulsion when used as the continuous phase. In some embodiments, the amount of oleaginous liquid may be at least about 30, or at least about 40, or at least about 50 percent by volume of the total fluid. The amount of non-oleaginous liquid in the invert emulsion fluid may vary depending upon the particular non-oleaginous fluid used and the particular application in which the invert emulsion fluid is to be employed. In some embodiments, the amount of non-oleaginous liquid may be at least about 1, or at least about 3, or at least about 5 percent by volume of the total fluid. In some embodiments, the amount may not be so great that it cannot be dispersed in the oleaginous phase. Therefore, in certain embodiments, the amount of non-oleaginous liquid may be less than about 90, or less than about 80, or less than about 70 percent by volume of the total fluid.

The invert emulsion fluid may also possess a stable internal non-oleaginous phase within the external oleaginous phase. Specifically, upon application of an electric field to an invert emulsion fluid, the emulsified non-oleaginous phase, which possesses charge, will migrate to one of the electrodes used to generate the electric field. The incorporation of emulsifiers in the invert emulsion fluid stabilizes the emulsion and results in a slowing of the migration rate and/or increased voltage for breakage of the emulsion. Thus, an electrical stability (ES) test, specified by the American Petroleum Institute at API Recommended Practice 13B-2, Third Edition (February 1998), is often used to determine the stability of the emulsion. ES is determined by applying a voltage-ramped, sinusoidal electrical signal across a probe (consisting of a pair of parallel flat-plate electrodes) immersed in the mud. The resulting current remains low until a threshold voltage is reached, whereupon the current rises very rapidly. This threshold voltage is referred to as the ES ("the API ES") of the mud and is defined as the voltage in peak volts-measured when the current reaches 61 µA. The test is performed by inserting the ES probe into a cup of 120° F. [48.9° C.] mud applying an increasing voltage (from 0 to 2000 volts) across an electrode gap in the probe. The higher the ES voltage measured for the fluid, the stronger or harder to break would be the emulsion created with the fluid, and the more stable the emulsion is. When evaluating emulsified fluids of present disclosure for emulsion stability, the ES test should be conducted after the emulsion has been formed, but before any nano materials have been added to the fluid. This is because interference from the conductive nano materials will impact the ES value.

The wellbore fluids of the present disclosure may further contain additives so long as the additives do not interfere with the properties of the compositions described herein. For example, emulsifiers, wetting agents, organophilic clays, viscosifiers, weighting agents, bridging agents, fluid loss control agents, and corrosion inhibitors may be added to the compositions disclosed herein so as to impart additional functional properties.

Wetting agents and emulsifiers that may be suitable for use include, but are not limited to, crude tall oil, oxidized crude tall oil, surfactants, organic phosphate esters, modified imidazolines and amidoamines, alkyl aromatic sulfates and sulfonates, and the like, and combinations or derivatives of these. VERSAWET™ and VERSACOAT™, NOVAMUL™, FAZEMUL™, FAZEWET™, MEGAMUL™, SUREMUL™, ONEMUL™, and MUL-XT™ are non-limiting examples of commercially available emulsifiers manufactured and distributed by M-I, L.L.C. that may be used in the fluids and methods of this disclosure. Other suitable surfactants that are commercially available include SIL-WET™ series of emulsifiers such as L-77, L-7001, L7605 and L-7622, which are distributed by Union Carbide Chemical Company Inc. In one or more embodiments of the present disclosure, the emulsifier may be selected from amidoamine surfactants such as those described in U.S. Pat. Nos. 6,239,183; 6,506,710; 7,060,661; 7,303,018; and 7,510,009.

In other embodiments, the emulsifier may be carboxylic acid-based emulsifier such as, for example, an emulsifier selected from dicarboxylic fatty acids, dimer acids, or dimers of fatty acids. Dicarboxylic fatty acids have the general formula HOOC—R—COOH, wherein R is an alkyl or alkenyl group containing from 10 to 50 carbon atoms, and in particular embodiments from 20 to 40 carbon atoms. In other embodiments, emulsifiers may be selected from the dimerization products of unsaturated dicarboxylic fatty acids, for example, such as products prepared by dimerization of unsaturated fatty acids containing from 8 to about 18 carbon atoms, including 9-dodecenoic(cis), 9-tetradecenoic (cis), 9-octadecenoic(cis), octadecatetranoic acids and the like.

Organophilic clays, normally amine treated clays, may be useful as viscosifiers in the fluid compositions disclosed herein. Other viscosifiers and gellants, such as oil soluble polymers, polyamide resins, polycarboxylic acids and soaps may also be used. Attapulgite clay and sepiolite clay may also be used as viscosifiers. The amount of viscosifier used in the compositions may vary depending on downhole conditions, as understood by those skilled in the art. However, normally about 0.1% to 6% by weight range may be sufficient for most applications. VG-69™ and VG-PLUS™ are organoclay available from MI SWACO (Houston, Tex.), and VERSA-HRP™ is a polyamide resin material available from MI SWACO (Houston, Tex.) that may be used in the fluids and methods of this disclosure.

Fluid loss control agents may act by coating the walls of the well. Suitable fluid loss control agents may include, but are not limited to, modified lignites, asphaltic compounds, gilsonite, organophilic humates or tannins prepared by reacting humic acid or tannic acid with amides or polyalkylene polyamines, amine-treated tannins such as ONE-TROL™, and latex polymers. In embodiments, the fluid loss control agent may be selected from one or more of VERSATROL™, VERSATROL™, VERSALIG™, ECOTROL™ RD, ONE-TROL™, EMI 789, and NOVATECH™ F, which are all commercially available from MI SWACO (Houston, Tex.).

Corrosion inhibitors may also be added to the drilling fluids disclosed herein to control the corrosion of the drilling equipment. Depending upon the type of corrosion encountered, the corrosion inhibitor may be organic or inorganic or some combination thereof. Non-limiting examples of corrosion inhibitors include phosphates, silicates, borates, zinc compounds, organic amines, benzoic acid, and benzoic acid derivatives, phosphate esters, heterocyclic nitrogen and sulfur compounds, organic acids, and the like. Non-limiting examples of commercially available corrosion inhibitors include sodium benzoate and benzotriazole.

Weighting agents or density materials suitable for use in wellbore fluid formulations in accordance with the present disclosure include, but are not limited to, hematite, magnetite, iron oxides, illmenite, barite, siderite, celestite, dolomite, calcite, manganese oxides, halites and the like. In other embodiments, the micronized weighting agents may be coated with a dispersant.

For example, fluids used in some embodiments disclosed herein may include dispersant coated micronized weighting agents. The coated weighting agents may be formed by either a dry coating process or a wet coating process. Weighting agents suitable for use in other embodiments disclosed herein may include those disclosed in U.S. Patent Application Publication Nos. 2004/0127366, 2005/0101493, 2006/0188651, U.S. Pat. Nos. 6,586,372 and 7,176,165, and U.S. Provisional Application Ser. No. 60/825,156, each of which is hereby incorporated by reference.

In embodiments, the weighting agent may be coated, for example, with dispersants such as oleic acid and polybasic fatty acids, alkylbenzene sulphonic acids, alkane sulphonic acids, linear alpha-olefin sulphonic acids, phospholipids such as lecithin, including salts thereof and including mixtures thereof. Synthetic polymers may also be used, such as HYPERMER™ OM-1 (Imperial Chemical Industries, PLC, London, United Kingdom) or polyacrylate esters, for example. Such polyacrylate esters may include polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

The quantity of the coated or uncoated weighting agent added, if any, may depend upon the desired density of the final composition. Weighting agents may be added to result in a density of up to about 22 pounds per gallon (ppg). In other embodiments, the weighting agent may be added to achieve a density of up to 20 ppg or up to 19.5 ppg.

The solid weighting agents may be of any particle size (and particle size distribution), but some embodiments may include weighting agents having a smaller particle size range than API grade weighing agents, which may generally be referred to as micronized weighing agents. Such weighting agents may generally be in the micron (or smaller) range, including submicron particles in the nanosized range.

In some embodiments, the average particle size (d50) of the weighting agents may range from a lower limit of greater than 5 nm, 10 nm, 30 nm, 50 nm, 100 nm, 200 nm, 500 nm, 700 nm, 0.5 micron, 1 micron, 1.2 microns, 1.5 microns, 3 microns, 5 microns, or 7.5 microns to an upper limit of less than 500 nm, 700 microns, 1 micron, 3 microns, 5 microns, 10 microns, 15 microns, 20 microns, where the particles may range from any lower limit to any upper limit. In other embodiments, the d90 (the size at which 90% of the particles are smaller) of the weighting agents may range from a lower limit of greater than 20 nm, 50 nm, 100 nm, 200 nm, 500 nm, 700 nm, 1 micron, 1.2 microns, 1.5 microns, 2 microns, 3 microns, 5 microns, 10 microns, or 15 microns to an upper limit of less than 30 microns, 25 microns, 20 microns, 15 microns, 10 microns, 8 microns, 5 microns, 2.5 microns, 1.5 microns, 1 micron, 700 nm, 500 nm, where the particles may range from any lower limit to any upper limit. The above described particle ranges may be achieved by grinding down the materials to the desired particle size or by precipitation of the material from a bottoms up assembly approach. Precipitation of such materials is described in U.S. Patent Application Publication No. 2010/009874, which is assigned to the present assignee and herein incorporated by reference. One of ordinary skill in the art would recognize that, depending on the sizing technique, the weighting agent may have a particle size distribution other than a mono-modal distribution. That is, the weighting agent may have a particle size distribution that, in various embodiments, may be monomodal, which may or may not be Gaussian, bimodal, or polymodal.

In additional embodiments, magnetic carbon nanoribbons of the present disclosure may be used in various processes, such as carbon fiber spinning, formation of conductive polymer composites, and low-loss, high-permittivity composites.

Additional Embodiments

Reference will now be made to more specific embodiments of the present disclosure and experimental results that provide support for such embodiments. However, Applicants note that the disclosure below is for illustrative purposes and is not intended to limit the scope of the claimed subject matter in any way.

The Examples below pertain to the in-situ intercalation replacement and selective functionalization of graphene nanoribbon stacks. In particular, the Examples below present a cost-effective and potentially industrially scalable, in-situ functionalization procedure for preparation of soluble graphene nanoribbon (GNRs) from commercially available carbon nanotubes. The physical characteristics of the functionalized product were determined using scanning electron microscopy (SEM), evolved gas analysis, X-ray diffraction, solid-state $^{13}C$ NMR, Raman spectroscopy, and GC-MS analytical techniques. A relatively high preservation of electrical properties in the bulk material was observed. Moreover, replacement of intercalated potassium with haloalkanes was obtained. While carbon nanotubes can be covalently functionalized, the conversion of the $sp^2$-hybridized carbon atoms to $sp^3$-hybridized atoms dramatically lowers their conductivity. But edge functionalized GNRs permit their heavy functionalization while leaving the basal planes intact.

Graphene is a stable 2D material that holds great promise due to its having extraordinary electrical, mechanical, and thermal properties. Thus, it is a potential building block for electronic devices. The abundance of carbon and its low toxicity are additional driving forces for the scientific community to search for applications of graphene in energy-related devices such as ultracapacitors, Li-ion batteries, solar cells and for catalysis. However, two issues need to be solved to realize the use of graphene and its derivatives in those future applications: a) bulk preparation of high quality graphene-based nanomaterials and b) functionalization and incorporation of these materials into devices.

Since 2004, many different methods have been developed to yield graphene nanomaterials. These methods can be divided into bottom-up and top-down strategies. Bottom-up strategies include chemical vapor deposition (CVD) growth and organic synthesis. Both methods can deliver high quality and relatively low defect materials but they are hard to scale-up and process. On the other hand, there is scalable top-down approach where graphite or carbon nanotubes (CNTs) are used as a starting material. The most common preparation method of bulk-quantity graphene is by exfoliation of oxidized graphite with subsequent reduction or high temperature annealing to produce more highly conjugated materials. The disadvantage of this method is the irreversible damage to the graphene basal plane and its consequently lower conductivity. High quality monolayer to few-layer graphene has been obtained in bulk quantities using different intercalation and thermal expansion techniques. When tuning the physical properties and minimizing defects, one may also consider the shape of the material that is inherently governed by the graphite precursor for top-down approaches. It was reported that the width and edges of the graphene play important roles in defining the material's electronic properties.

CNTs are known precursors for production of bulk quantities of well-defined graphene nanoribbons (GNRs). To date, several unzipping methods with reasonable yields have been reported. Due to their high aspect ratio, GNRs are good candidates for applications in energy related devices, catalysis, transparent touch screens, carbon fiber spinning, formation of conductive polymer composites, and low-loss-high-permittivity composites. When dealing with applications, the material should be available in bulk quantities and should be easily processible, since most of the applications require preparation of well-dispersed solutions or suspensions. Pristine graphene materials are very difficult to disperse. Thus, functionalization is a preference.

Layered carbon materials such as graphite or multi-walled carbon nanotubes (MWNTs) are stable because of their fully π-conjugated aromatic systems. Traditional organic synthetic approaches are thus limited to certain reactions. Polycyclic aromatic hydrocarbons (PAHs), close chemical relatives to graphene-based materials, are susceptible to electrophilic substitutions, nucleophilic and free radical reactions, addition reactions, reductions, oxidations and rearrangements. All of these reactions could be used for functionalization of graphene. However, the current graphene literature reports are limited mostly to oxidation, hydrogenation and reduction functionalization methods. These methods generally produce a product with the desired physical properties such as solubility and dispersability. The degree of functionalization in these cases is relatively high, mostly because the basal planes are functionalized. However, functionalization of the basal plane inevitably leads to a suppressed conductivity as the π-conjugation is disturbed. Selective edge functionalization might be a solution to this problem. However, edge functionalization would likely have an impact on physical properties in materials with high edge-to-basal plane carbon ratios such as in GNRs.

In the present Examples below, Applicants further investigate the hypothesis that potassium or sodium/potassium intercalation between the walls of commercial MWNTs would longitudinally split the walls and furnish active carboanionic edges of the ribbons. The increased reactivity of the edges compared to the basal plane would therefore functionalize the edges of GNRs with desired electrophiles. Selective functionalization would introduce improved solubility without sacrificing conductivity. Applicants also investigated the replacement of intercalated metal with haloalkanes that then serve as intercalating agents in the resulting functionalized GNRs.

Example 1. Splitting and In-Situ Functionalization of MWNTs

The reaction scheme for the selective edge in-situ functionalization is depicted in FIG. 1. In the first step, commercially available MWNTs from Nanotech Labs, Inc. (NTL) or Mitsui & Co. (Mitsui) were treated with Na/K alloy in 1,2-dimethoxyethane (DME) for several days. Since K (but not Na) can be easily intercalated into graphene galleries and it has been shown that K can be successfully intercalated into graphite flakes using the above conditions, Applicants also expected K to intercalate between the walls of the MWNTs. Without being bound by theory, Applicants' previous work has shown that the intercalation of the K is accompanied by partial longitudinal cracking of the walls as they tend to swell. Under the conditions used, the edge atoms generated should be in the reduced to the carbanionic form and thus very reactive and susceptible to electrophilic attack. This reductive unzipping can be visualized as the reaction mixture changes color from a dark black or brown color to a finely dispersed green or red suspension.

The next step is the in-situ functionalization. Iodoalkanes (1-iodohexadecane, 1-iodooctane, and 1-iodobutane) are added to the reaction mixtures, presumably reacting with the active sites on the edges of the GNRs. As the reaction proceeds, the green or red color disappears. To produce proton functionalized GNRs (H-GNRs), Applicants quenched the reaction mixture with methanol (described in detail in Example 9). To attain the intercalated compounds with a formula as close as possible to $KC_8$ or stage 1, an excess of Na/K was used. Accordingly, an excess of the iodoalkanes was added. This leads to side reactions, not just in the reaction solution, but also between the walls of the MWNTs. The side products include alkanes, alkenes, and dimers of alkanes.

Example 2. Visualization of the Formed GNRs

Figure 2:
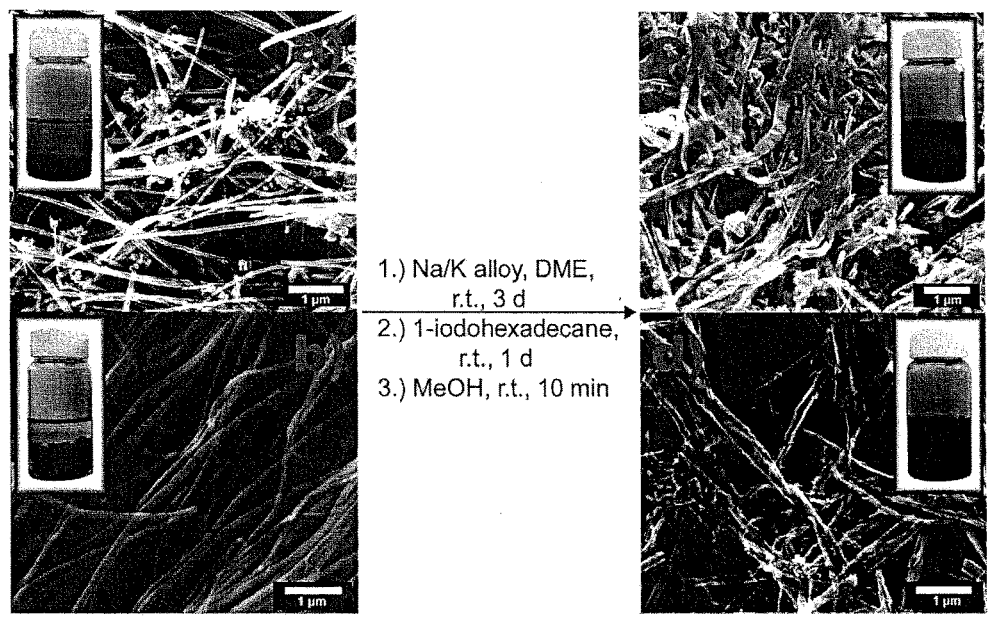
FIG. 2 shows scanning electron micrographs (SEM) of various GNR solubility tests. The SEM images show the splitting and functionalizing of commercially available MWNTs and the photographic difference in solubility between functionalized GNRs and pristine MWNTs.

Scanning electron micrograph (SEM) images in FIG. 2 clearly indicate that MWNTs split to GNRs in high yields. To quench any active species that were remaining, Applicants treated the reaction mixture with methanol. The crude materials, hexadecylated-GNRs (HD-GNRs), octylated-GNRs (O-GNRs) and butylated-GNRs (B-GNRs), were collected by filtration using 0.2 μm PTFE-membranes. The filter cakes were then washed with organic solvents and water. The filter cakes then underwent Soxhlet extraction to remove the majority of the physisorbed impurities. Before analysis, all of the products were dried in vacuum (~$10^{-2}$ Torr) at 60° C. for 24 h. To the best of Applicants' knowledge, a similarly efficient in-situ one-pot method of converting MWNTs to functionalized GNR stacks has not been reported.

Example 3. Bulk Properties of the Formed GNRs

The solubility of pristine graphitic materials may have limitation. For bulk purposes, dispersing of the material is of great importance. For solubility studies, Applicants focused on HD-GNRs. HD-GNRs exhibit an improvement in solubility and dispersability in chloroform after a short sonication using simple ultrasonic cleaner. In FIG. 2, where starting MWNTs were compared to HD-GNRs, the difference is apparent. HD-GNRs show stable dispersions in chloroform for weeks, while MWNTs cannot be dispersed using the same conditions.

Figure 9:
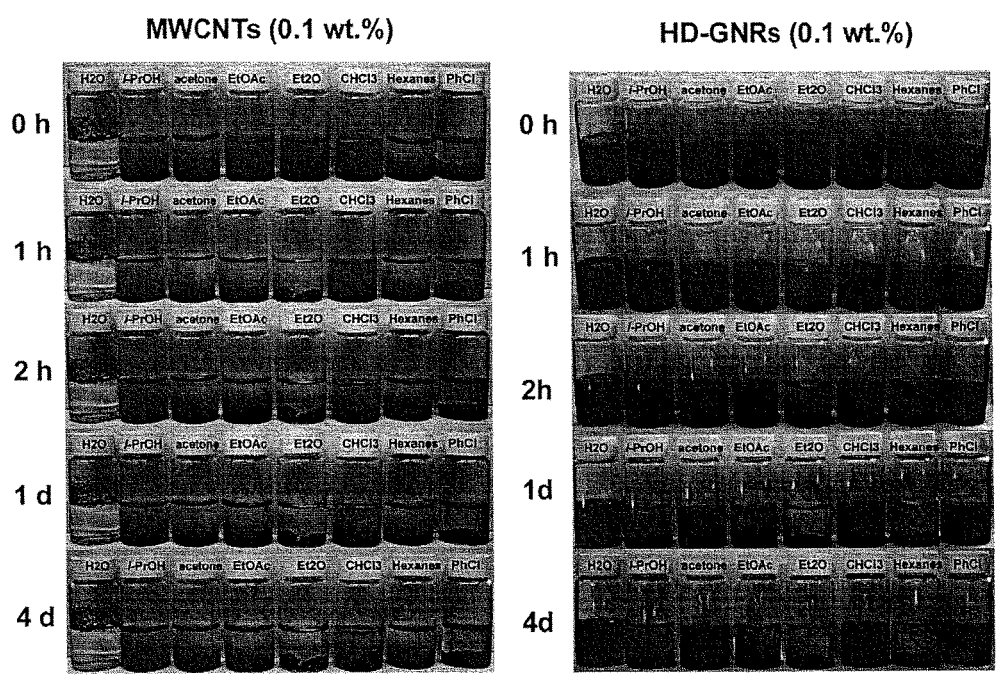
FIG. 9 is a comparison of solubilities of 0.1 wt % starting material MWNTs (left) and 0.1 wt % functionalized HD-GNRs (right). Commercial MWNTs are non-dispersible in organic solvents after short sonication using ultrasonic cleaner. HD-GNRs are well dispersible in organic solvents after short sonication.

Applicants have also performed solubility tests for HD-GNRs and MWNTs at 0.1 mg/mL concentrations in different solvents. See FIG. 9. HD-GNRs are well dispersible in common organic solvents, such as 2-propanol, acetone, ethyl acetate, diethyl ether, chloroform, hexane, and chlorobenzene. After 1 hour, HD-GNRs settle out in hexanes and diethyl ether, while remaining dispersed in the other solvents. Four days of shelf aging resulted in sedimentation of all of the suspensions except when in chloroform and chlorobenzene, which stayed well-dispersed for weeks. A low magnification SEM image and optical microscope image of drop cast HD-GNRs on a $SiO_2$/Si substrate show well-dispersed materials. See FIG. 10. However, the starting material MWNTs showed sedimentation in all solvents tested in less than 1 hour. Thus, HD-GNRs are good candidates for applications where organic dispersability is desired.

Example 4. Conductivity of the Formed GNRs

Figure 3:
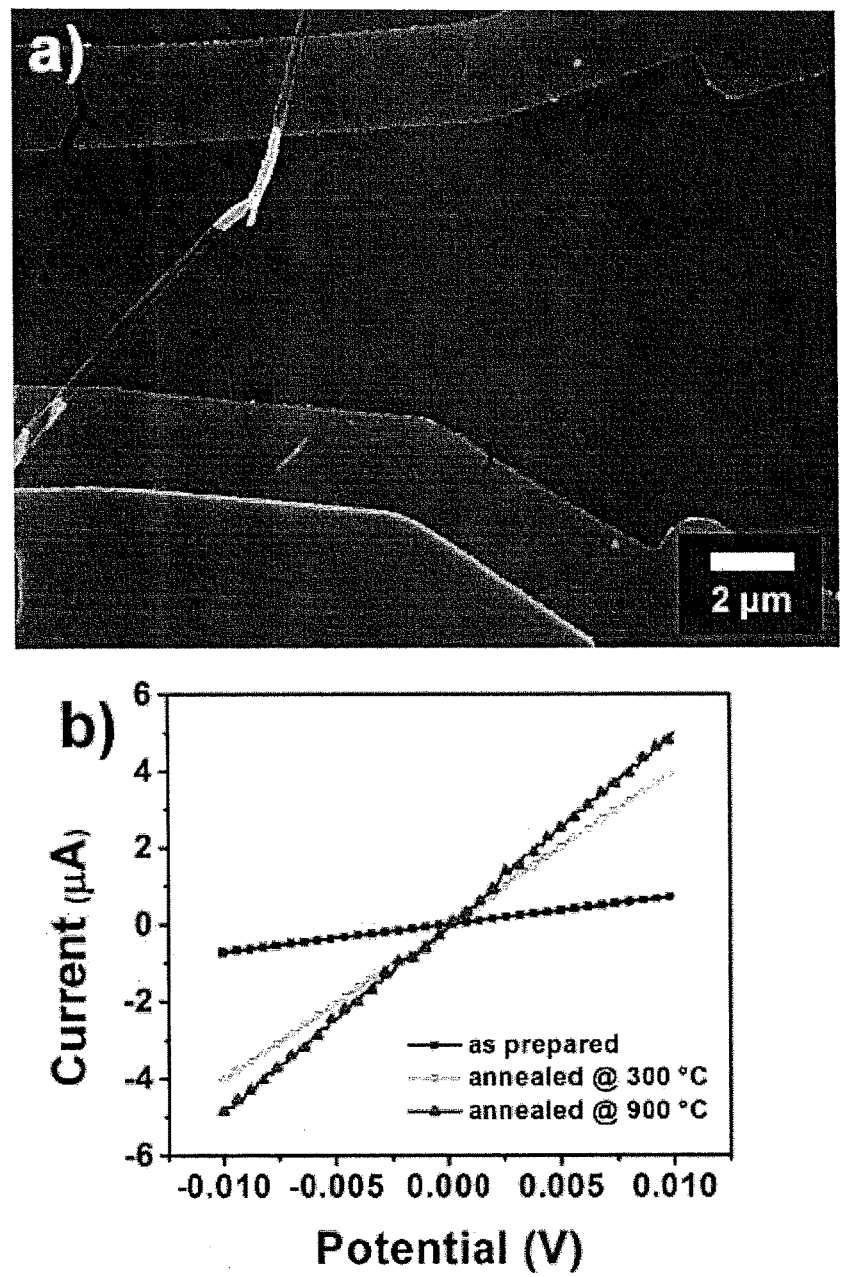
FIG. 3 shows a fabricated device and conductivity measurements for the device.
Figure 11:
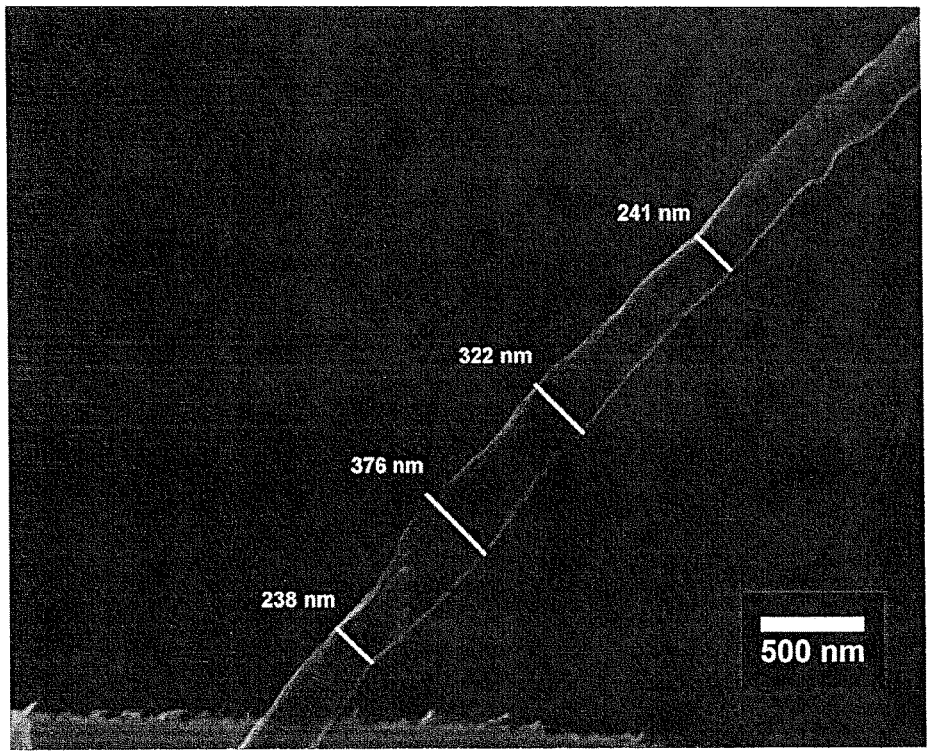
FIG. 11 is an SEM image showing the width of single HD-GNRs used in a device for conductivity measurements.
Figure 12:
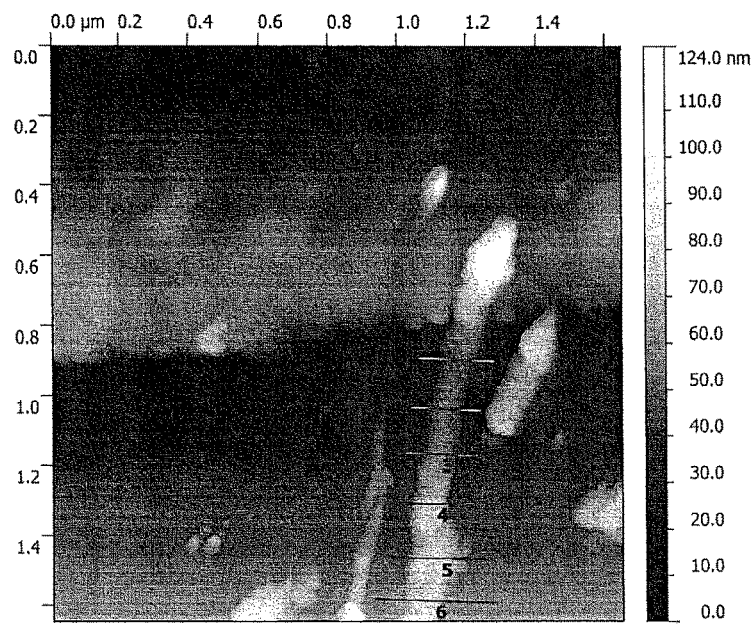
FIG. 12 shows atomic force microscopy (AFM) images of HD-GNRs and the corresponding profile plot.
Figure 12:
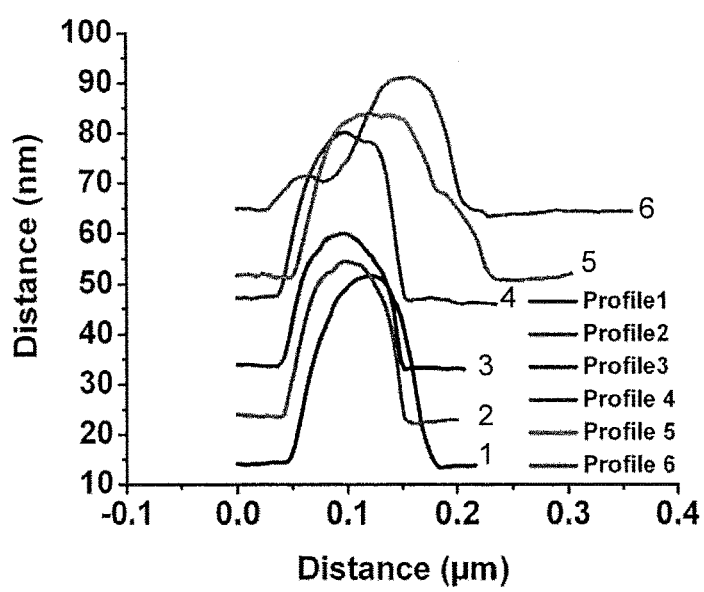

A desirable property in functionalized GNRs is the retention of conductivity, especially if they are to be used in transparent electrodes or energy-related devices such as ultracapacitors, Li-ion batteries and solar cells. Applicants have fabricated a single HD-GNR device by depositing 20 nm thick Pt contacts on opposite ends of GNR stacks using lithography. See FIG. 3A. The HD-GNR stack used in the device was 7.9 μm long, ~300 nm wide (FIG. 11) and ~30 nm thick. The thickness was estimated from the AFM image (FIG. 12). As-prepared, single ribbon device exhibited a conductivity of 600 S/cm. See Eq. 1 and Table 1.

$$\text{Conductivity } (S/cm) = \frac{L(cm)}{R(\Omega) * t(\mu m) * W(cm) * 0.0001} \quad \text{(Eq 1)}$$

TABLE 1

The data used for calculating conductivity of GNRs with Eq 1.

| Resistance R (Ω) | Resistivity R (Ωcm) | Conductivity s(S/cm) | GNR Thickness t (μm) | GNR Width W (cm) | GNR Length L (cm) | Temperature of annealing ° C. |
|---|---|---|---|---|---|---|
| 2060 | 0.0002347 | 4261.06 | 0.03 | 0.00003 | 0.00079 | 900 |
| 2480 | 0.0002825 | 3539.42 | 0.03 | 0.00003 | 0.00079 | 300 |
| 14600 | 0.0016633 | 601.22 | 0.03 | 0.00003 | 0.00079 | 25 |

The conductivity increased almost six times to 3540 S/cm when the device was annealed at 300° C. There are at least two reasons for such a difference in conductivity between the as-prepared sample and the sample annealed at 300° C. The conductivity could be partially increased due to improved contact between the electrodes and the GNR stack. However, previous work on graphene materials with Pt-contacts shows that the good wetting of the carbon with Pt leads to a low-barrier contact. Thus, without being bound by theory, it is envisioned that the main contribution may be due to deintercalation of hydrocarbons (but not necessarily defunctionalization) from the graphene galleries.

The intercalated graphene galleries are electrically isolated from each other, as alkanes are known insulators. Thus, it is envisioned that deintercalation reinstates the interaction between the graphene layers. A control experiment where HD-GNRs were heated at 300° C. for 2 hours showed that their solubility in chloroform after annealing was comparable to the as-prepared HD-GNRs. The latter result indicates that the HD functional groups staying intact at temperatures up to 300° C.

When the device was further heated to 900° C. (a temperature at which the HD functional groups are expected to have cleaved from the GNRs), the conductivity increased to 4260 S/cm. This small increase could indicate that edge functionalization does not substantially disturb the conductivity of the graphene basal planes. The conductivities of the functionalized HD-GNRs are comparable to previous literature reports on pristine materials, such as graphite (200-8300 S/cm), CNTs (1000-100000 S/cm) and GNRs (~800 S/cm).

Figure 13:
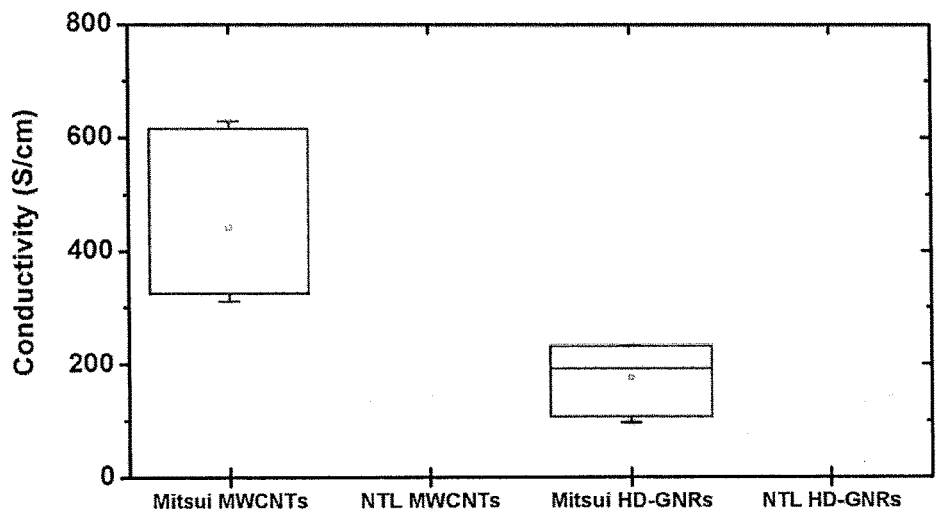
FIG. 13 shows statistical representation of bulk conductivities of starting material MWNTs and functionalized HD-GNRs using a four-point probe cell. Five pellets of each sample were prepared. The pellets were pressed using a pellet die with a 13 mm diameter. 100 mg of sample was loaded into the die and pressed applying 8 T of pressure for 30 seconds. The solid pellet was then loaded into the four-point probe cell (See FIG. 14). Current and potential were then measured. Bulk conductivity was calculated from Eq. 2.
Figure 14:
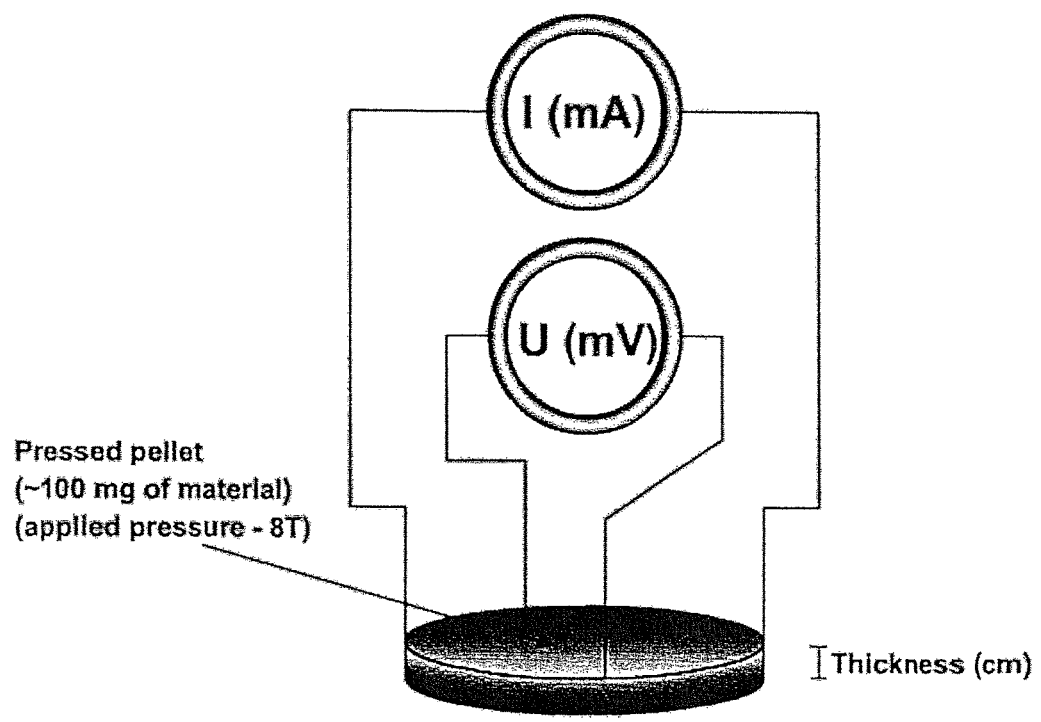
FIG. 14 shows a four-point probe cell used for the measurement of the current and potential of the solid HD-GNR pellets.

Bulk conductivities of as-prepared samples were also measured using four-point probe measurement on pressed pellet. Similarly, relatively high conductivity ranging from 145 to 175 S/cm was observed, which is 2.5 times smaller than conductivities of the starting material MWNTs. See FIGS. 13-14.

Example 5. Evolved Gas Analysis (EGA) of the Formed GNRs

Figure 15:
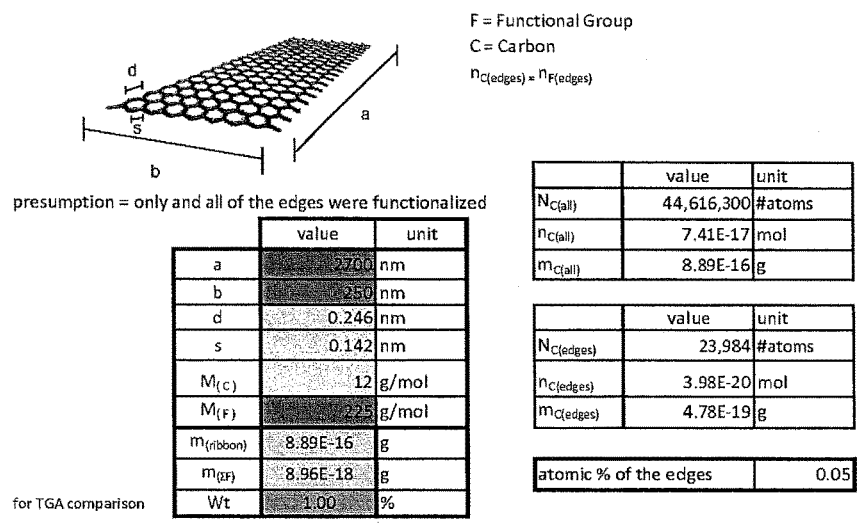
FIG. 15 provides data related to edge functionalization of HD-GNRs.
Figure 15:
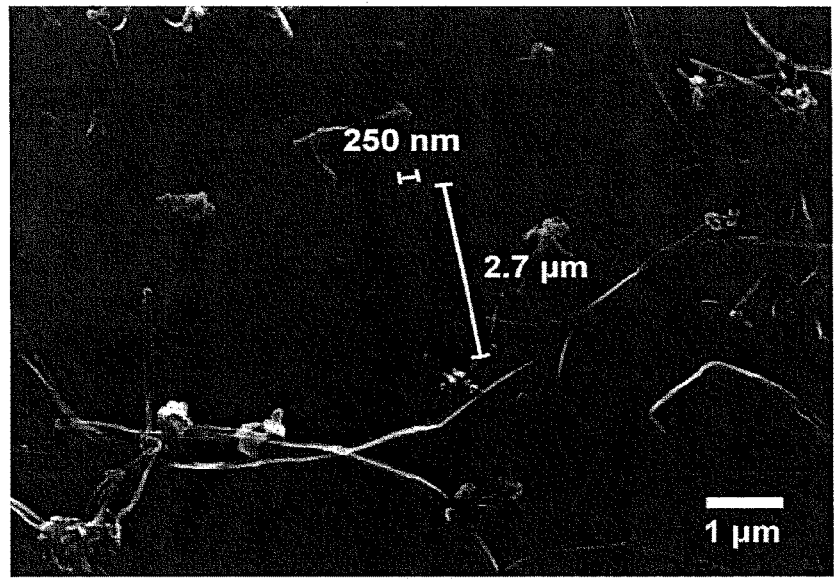

Determining edge functionalization as opposed to intercalation remains challenging. This may be due to the expected low degree of edge carbons to non-edge carbons. For instance, the average GNRs stack with a 250 nm width and a 2.7 μm length (estimated from the SEM image in FIG. 11) should have 0.05 atomic % of edge carbons in GNRs. See FIG. 15. If all of the edge carbons are functionalized, then the functional groups would contribute 1 wt % of the total weight to the HD-GNRs; 0.5 wt % if considering O-GNRs, and 0.25 wt % if considering B-GNRs.

Figure 4:
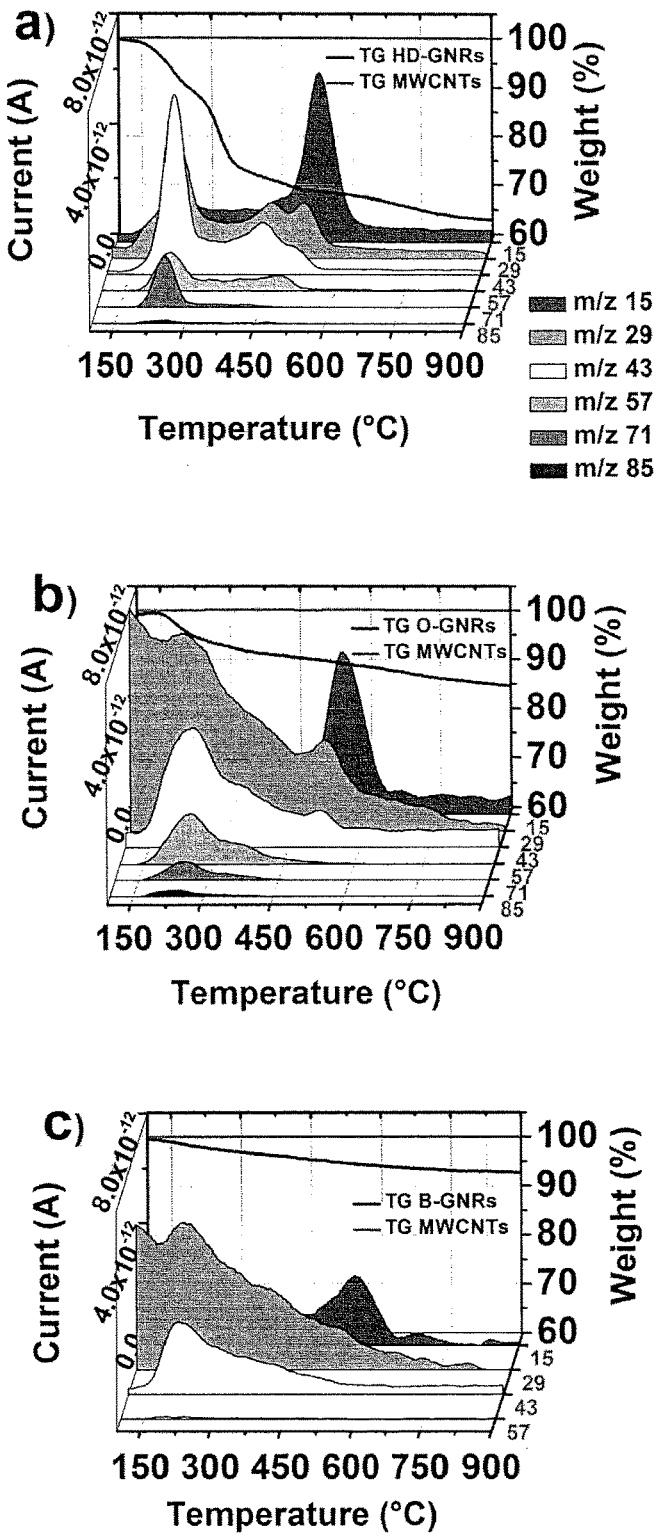
FIG. 4 shows the evolved gas analysis (EGA) of various GNRs. Different colors represent fragments with m/z that correspond to alkane fragments. Black and gold curves represent the thermogravimetric analysis (TGA) profile of functionalized GNRs and pristine MWNTs, respectively.

Therefore, since the expected degree of edge functionalization is low on GNRs, Applicants have used thermogravimetric analysis (TGA) coupled with a quadrupole mass spectrometer (QMS) to detect thermalized products. The sensitivity of QMS provides insight into the quantitative nature of the alkylated graphene nanoribbons (A-GNRs). TGA of HD-GNRs shows a total weight loss of 37% in the range between 40° C. and 900° C., which is substantially above the expected value of 1%. See FIG. 4A. The reference compound, hexadecane, has a specific fragmentation pattern, with high abundance fragments and decreasing intensities at m/z=57, 43, 71, 85, 29, and 99. Similar patterns are expected for octane (m/z=43, 57, 29, 85, 71) and butane (m/z=43, 29, 15, 57). These fragments were also found in the evolved gases during the TGA, indicating that alkyl groups are present in the A-GNRs samples. See FIG. 4.

However, there are three distinct temperature ranges during which the alkyl groups are present in the off-gas from HD-GNR thermolysis products. See FIG. 4A. The first is the range between 154° C. and 374° C. (Region I), where the weight loss is 26%. The second range is between 400° C. and 474° C. with a weight loss of 2% (Region II). The third range is between 480° C. and 612° C. with a weight loss of 2% (Region III).

Region I is assigned to deintercalation of alkanes (see Examples below for further explanation). Regions II and III were assigned to covalently bound alkyl groups, most likely hexadecyl. The temperature interval for Region II corresponds with previous reports on covalently attached organic moieties on different carbon substrates. The mass spectrometer detection limit is up to 100 atomic mass units. Thus, the molecular ion corresponding to the hexadecyl moiety could not be detected. Various fragments (m/z=29, 15, 43, 57, 85, and 71) that are present in Region II are indications that fragmentation due to thermal cleavage of the hexadecyl group is most likely occurring. The major fragments present in Region III are the methyl and ethyl groups (m/z=15, 29) which could be the remainder of the hexadecyl group bound directly to the graphene substrate.

Similar results were obtained for O-GNRs and B-GNRs (FIGS. 4B and 4C), where we observed 7 wt % loss between 139° C. and 293° C. for O-GNRs in Region I, and a 4 wt % loss between 121° C. and 247° C. for B-GNRs for Region I. Region II between 448° C. and 526° C. for O-GNRs showed a 1 wt % loss, while Region III between 526° C. and 628° C. had a 1.3 wt % loss. B-GNRs show 1.3 wt % loss for Region II between 328° C. and 453° C., and 1.7 wt % for Region III between 453° C. and 636° C. According to this data and the assumption that Regions II and III correspond to the same functional groups but have different fragmentation temperatures, the degree of functionalization is 4.6% for HD-GNRs, 2.3% for O-GNRs and 3% for B-GNRs. Without being bound by theory, it is envisioned that the discrepancy between the estimated degree of edge functionalization and the actual degree of functionalization may be due to the decomposition of the residual intercalation compound when the islands of intercalant trapped between the carbon layers are removed.

Figure 16:
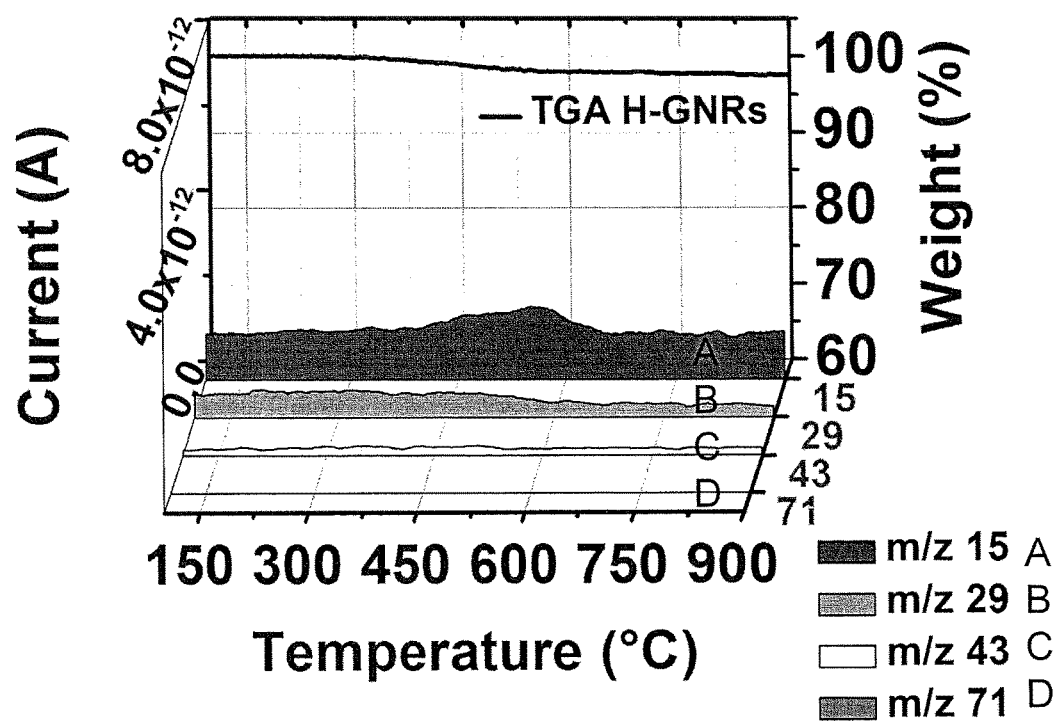
FIG. 16 shows an evolved gas analysis (EGA) for hydrogen terminated GNRs (H-GNRs). The colors represent fragments with m/z 15 (A), 29 (B), 43 (C) and 71 (D) that correspond to alkane fragments. The black curve represents the TGA profile of the H-GNRs.

To exclude the reaction between solvent and active GNRs, EGA of methanol quenched, hydrogen terminated GNRs (H-GNRs) was also done. TGA-MS analysis confirmed the absence of all fragments except m/z 15, the methyl fragment between 400° C. and 600° C. See FIG. 16. The methyl fragment could be the result of rearrangements with successive cleavage on defects and edges where carbons are expected to be hydrogenated or form trace methanol.

Example 6. X-Ray Powder Diffraction (XRD) Analysis of the Formed GNRs

Figure 5:
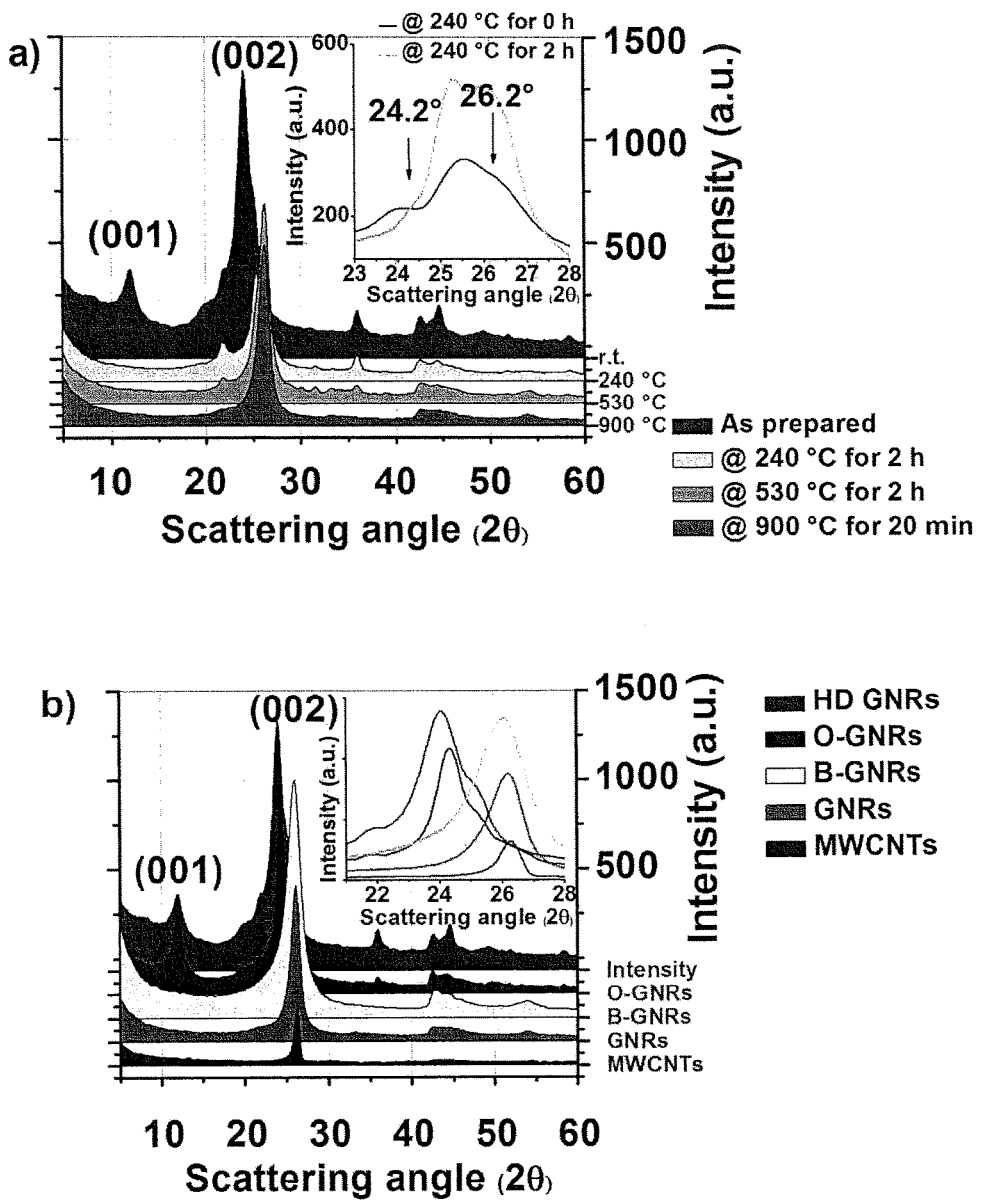
FIG. 5 shows powder diffraction patterns of various GNRs.
Figure 17:
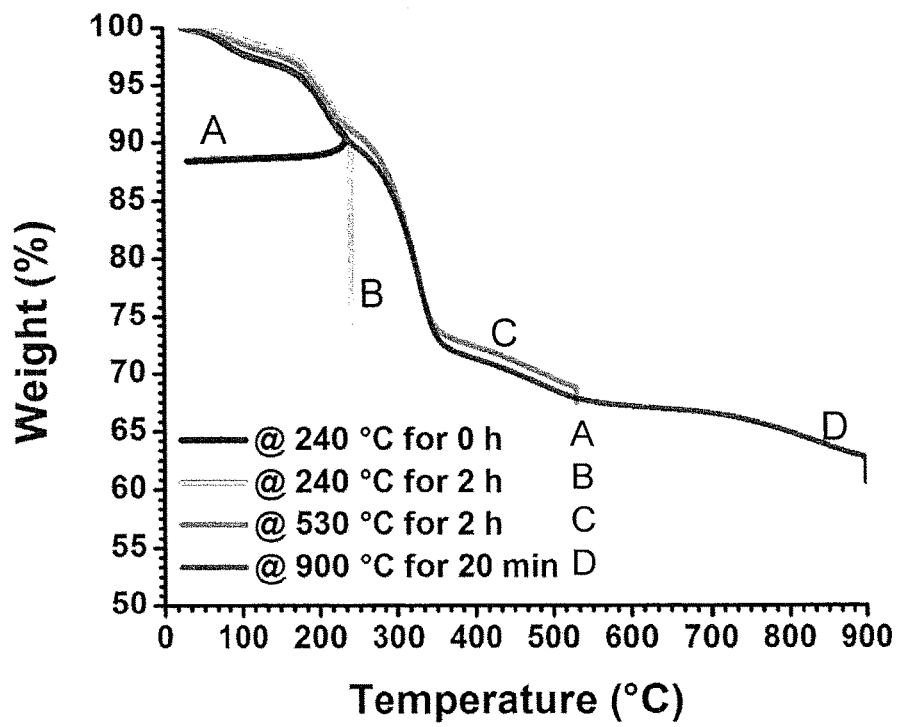
FIG. 17 shows TGA plots of thermally treated HD-GNRs. The curves represent the weight loss of HD-GNRs thermally treated at different temperatures. Curve A: the HD-GNRs were heated to 240° C. and then cooled to room temperature without holding at 240° C.; the product was partially deintercalated. Curve B: the HD-GNRs were heated at 240° C. for 2 h; the product was fully deintercalated. Curve C: the HD-GNRs were heated at 530° C. for 2 h; the product was fully deintercalated and partially defunctionalized. Curve D: the HD-GNRs were heated at 900° C. for 20 min; the product was fully deintercalated and completely defunctionalized.

For direct evidence of deintercalation in Region I, HD-GNRs thermally treated at temperatures of 240° C., 530° C. and 900° C. were prepared. The XRD spectra for the HD-GNRs were then recorded and analyzed. See FIG. 5A. The total weight loss for the sample heated at 240° C. for 2 h was 26%, which corresponds to the weight loss in Region I in FIG. 4A. For the sample heated at 530° C. for 2 h, the weight loss was 32%. For the sample heated at 900° C. for 20 min, the weight loss was 39%. The TGA plots of the thermally treated HD-GNRs are shown in FIG. 17.

The XRD spectrum for the as-prepared sample contains well-pronounced diffraction lines at 12.0° and 24.2° 2θ angle, which correspond to the (001) and (002) signals of a stage 1 intercalation compound, respectively. The calculated c-axis repeat distance ($I_c$) is 0.738 nm, which is the typical spacing ($d_s$) between the two carbon layers sandwiching the layer of intercalant. As one can see from FIG. 5A, both the 12.0° and 24.2° signals disappear after heating at 240° C. The new diffraction line at 26.2° 2θ angle corresponding to the (002) signal of graphite appears instead.

The sample heated to 240° C. and then cooled to room temperature can be considered an intermediate state between the fully intercalated as-prepared sample and the one heated for 2 hours at 240° C. The weight loss during heating to 240° C. was ~12%. See FIG. 17. The sample that was heated and then cooled contains both the 24.2° signal and the 26.2° signal in a ratio of ~1:2. See FIG. 5A. Interestingly, no intermediate stage compound was detected in the sample. These findings were unexpected for graphite intercalation compounds (GICs), where graphite gradually intercalates and then gradually deintercalates, sequentially going through all the stage numbers. Instead, Applicants detect only the two states, the stage 1 GIC and the non-intercalated graphitic GNRs. Without being bound by theory, Applicants suggest that the mixed stage comes from different GNRs. Individual GNRs likely deintercalate quickly and completely. The observed "mixed stage" is likely a mixture of completely intercalated and completely deintercalated individual GNR stacks.

Samples heated at temperatures of 530° C. and 900° C. are completely deintercalated and give spectra identical to H-GNRs or the starting material MWNTs. See FIG. 5B. Since weight losses of 7% and 4% were also observed for O-GNRs and B-GNRs in Region I, XRD spectra were also recorded for as-prepared samples. However, O-GNRs show similar intercalation compounds as HD-GNRs, with $I_c$ spacing between graphene layers of 0.731 nm.

Interestingly, B-GNRs do not show any intercalation (FIG. 5B), since the spectra are identical to H-GNRs or MWNTs. Without being bound by theory, the reason might be in the size of the intercalant. In the case of HD-GNRs, it is expected to be at least 16 or 32 carbon chains (the latter is the dimer product). For O-GNRs, the spacing would be about half of 0.731 nm. For B-GNRs, the spacing would be about one-fourth of 0.731 nm.

Hexadecane and octane are higher boiling point liquids while dotriacontane is a solid. On the other hand, butane is a gas which is likely too volatile and mobile to form a stable GIC. For HD-GNRs, the proposed major intercalant is dotriacontane, but others cannot be excluded.

Figure 18:
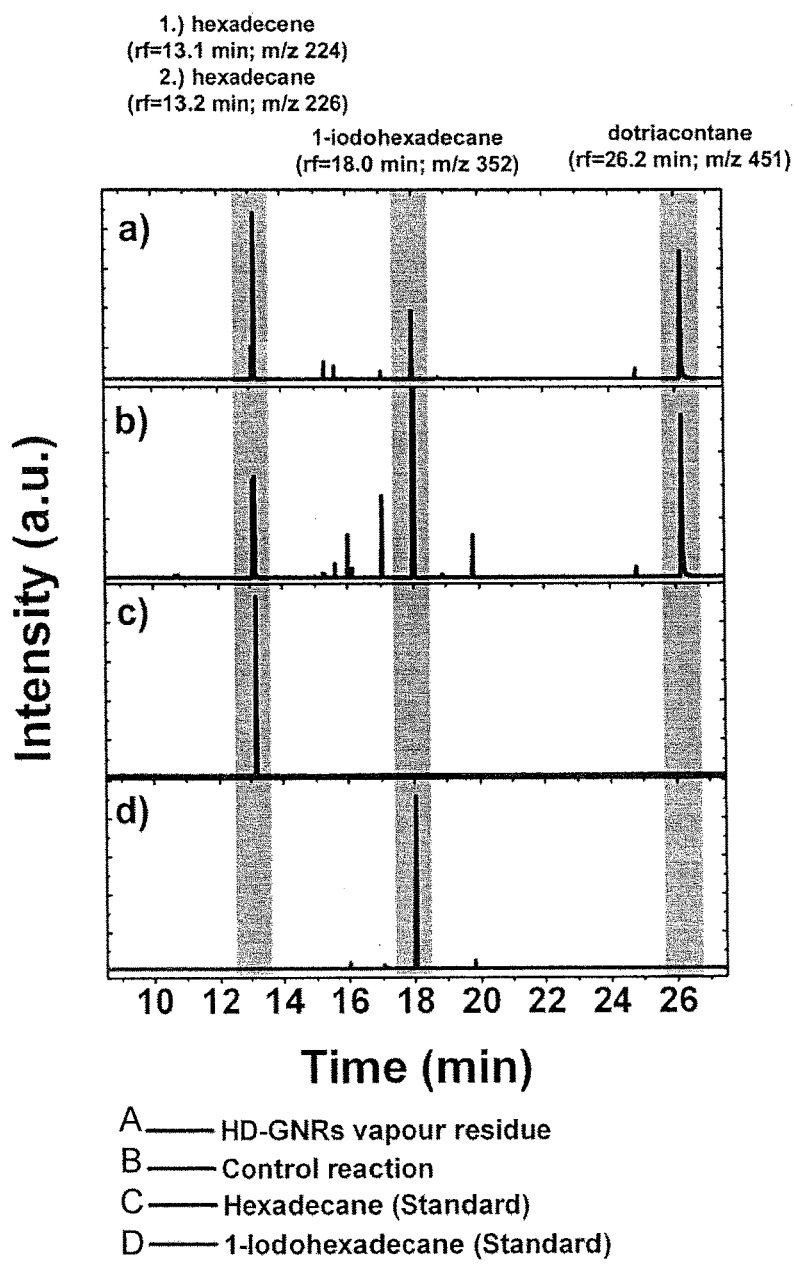
FIG. 18 shows gas chromatography mass spectroscopy (GC-MS) of control experiments for qualitative and quantitative intercalant determination.

The synthesis of HD-GNRs (as discussed earlier) leads to side products that are also potential intercalants. Two control experiments produced evidence that dotriacontane is indeed the main component. In the first control experiment, 1-iodohexadecane was added into the dispersion of Na/K in DME. Gas chromatography-mass spectrometry (GC-MS) showed the presence of 1-hexadecene and hexadecane as minor components (21% and 19%, respectively) and dotriacontane as the major component (60%) of the reaction mixture. Another experiment with as-prepared HD-GNRs was done. HD-GNRs were heated at 150° C. in vacuum. A cold finger cooled to 0° C. was connected to the system to capture products that were released. Analysis of the collected vapors using GC-MS again showed dotriacontane as the major component (45%). Other components detected were 1-hexadecene (6%), hexadecane (35%) and starting material 1-iodohexadecane (13%, for the GC-MS analysis, as shown in FIG. 18).

Example 7. Solid-State $^{13}$C Nuclear Magnetic Resonance Spectroscopy (SS NMR)

To further investigate the nature of the intercalant, two types of magic angle spinning (MAS) NMR experiments were performed. The relatively high conductivity of HD-GNRs caused severe probe tuning problems, which initially prevented useful $^1$H-$^{13}$C cross polarization (CP) and direct $^{13}$C pulse spectra from being obtained. However, dispersing the sample in silica (an approach previously used to obtain a $^{13}$C spectrum of graphite) enabled the $^{13}$C and $^1$H channels to be properly tuned on a sample of 10 wt % HD-GNRs and 90 wt % silica.

Figure 6:
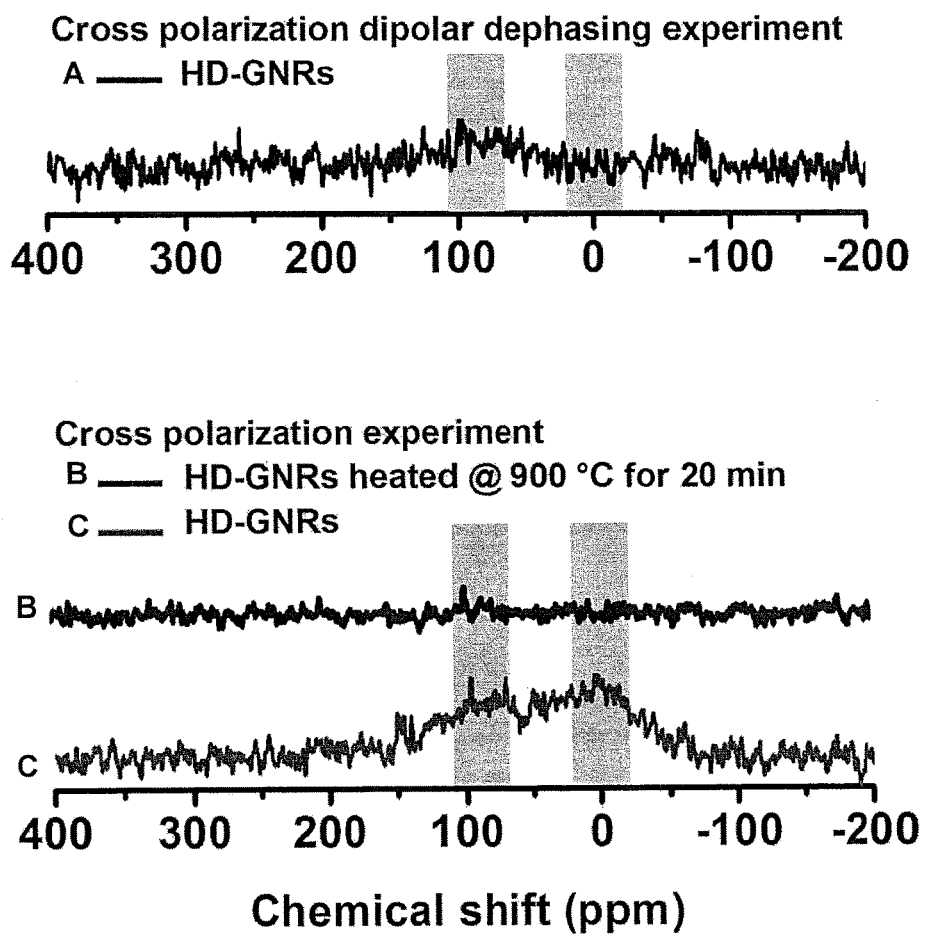
FIG. 6 shows a solid-state $^{13}$C nuclear magnetic resonance spectroscopy (SS NMR) of various GNRs. Functionalized and intercalated HD-GNRs (curve C) and defunctionalized and deintercalated HD-GNRs after heating at 900° C. for 20 min (curve B) are shown. Cross polarization dipolar dephasing experiment of functionalized and intercalated HD-GNRs (curve A) are also shown.

In the CP spectrum of the unheated material (FIG. 6, red spectrum), two broad, overlapping bands are evident. The band centered at about 90 ppm is thought to be from several types of carbons: graphene sheet sp$^2$ C—H carbons, graphene sheet sp$^2$ carbons that are either on or near the edge of the sheet or near a covalently bound hexadecyl group or intercalated alkane. Thus, it is envisioned that the functional groups are capable of being cross polarized, such as from the downfield tail of the signal from the methylene carbons in covalently bound hexadecyl groups and in intercalated side products (e.g., hexadecane, 1-hexadecene, and dotriacontane).

The band centered at about 90 ppm is unusually broad and shielded, as is the signal from the carbons detected in a direct $^{13}$C pulse spectrum of graphite dispersed in silica. The breadth of the band centered at about 90 ppm can be at least partially attributed to the inability of MAS to completely remove the anisotropy of the magnetic susceptibility in the graphene sheets, while the shielding can be attributed to the diamagnetic shift in the $\delta_{33}$ component of the shielding tensor of the numerous graphene carbons in a very large condensed aromatic ring system. This broadening and shielding is reminiscent of what is observed as graphite oxide is steadily reduced and becomes increasingly like graphite.

The band centered at about 0 ppm is thought to be from the methylene carbons indicated above and from the upfield tail of the signal from graphene sheet sp$^2$ carbons. The band centered at about 0 ppm is also unusually shielded, as would be expected if the covalently bound hexadecyl groups or intercalated alkanes are sandwiched between the graphene sheets and thus are subjected to a large diamagnetic susceptibility resulting from delocalized electrons (a π-electron ring current) in the graphene sheets. Indeed, a less dramatic shielding effect but much better resolution are observed with anthracite bearing dodecyl groups on the edges. In contrast, the central methylene carbons in methylene chains constrained to be above an aromatic ring in molecules such as [12]-paracyclophane and various 1,n-dioxa[n](2,7)pyreneophanes experience a very small ring current shielding effect. The much weaker signal from the methyl carbons in the HD-GNRs is not recognizable.

The 50-μs dephasing period in the dipolar dephasing experiment on the unheated material (FIG. 6, black spectrum) strongly attenuates the band centered at about 90 ppm and completely eliminates the band centered at about 0 ppm. Since this dephasing period is designed to eliminate CH and CH$_2$ signals with minimal attenuation of quaternary carbon signals, the less shielded band in the basic (red) CP spectrum has significant contributions from graphene sheet sp$^2$ C—H carbons and the downfield tail of the signal from the various methylene carbons. The more shielded band in the basic CP spectrum is consistent with the various methylene carbons and the upfield tail of the signal from graphene sheet sp$^2$ C—H carbons. The relatively immobile nature of the covalently bound hexadecyl groups and intercalated alkanes results in a correspondingly strong $^1$H-$^{13}$C dipole-dipole interaction that both makes it possible for these methylene groups to cross polarize (red spectrum) and then to have the signal rapidly decay (black spectrum). The very weak signal centered at about 90 ppm in the dephasing experiment may result from the attenuated signal from graphene sheet sp$^2$ carbons that poorly cross polarized.

The CP spectrum of the heated material (FIG. 6, blue spectrum labeled as "B") shows no signal above the noise. As seen from the conductivity, TGA, and XRD results, defunctionalization and deintercalation at this temperature is complete. With no covalently bound hexadecyl groups or intercalated alkanes remaining, no NMR signal is detected. The importance of these hexadecyl groups and alkanes for generating the signals in the spectrum of the unheated material (red spectrum) is evident.

Example 8. Raman Spectroscopy

The Raman spectrum of the as-prepared sample is significantly enhanced compared to the heated samples. See FIG. 7. This confirms formation of the intercalation compound. It is known that when several species are intercalated into graphite, or simply physisorbed on the graphene surface, the Raman spectra are enhanced. No blue-shift of the G-peak is detected, however. This suggests that the intercalant in HD-GNRs is neutral toward carbon and does not charge the carbon layers. The spectrum of the as-prepared sample contains a D-peak at ~1360 cm$^{-1}$ of very high intensity and the G+D' peak at ~2950 cm$^{-1}$. This suggests that significant disorder in the system was induced by splitting and intercalation. Such results were unexpected because for most of the known GIC compounds, intercalation does not cause appearance of the D-band. The D-band gradually decreases with heating and is finally of the same magnitude as non-intercalated split GNRs. The D/G ratio can be considered a measure of disorder. Without being bound by theory, the fact that the D/G ratio decreases suggests that disorder induced by the intercalant decreases when the intercalant is removed.

Figure 21:
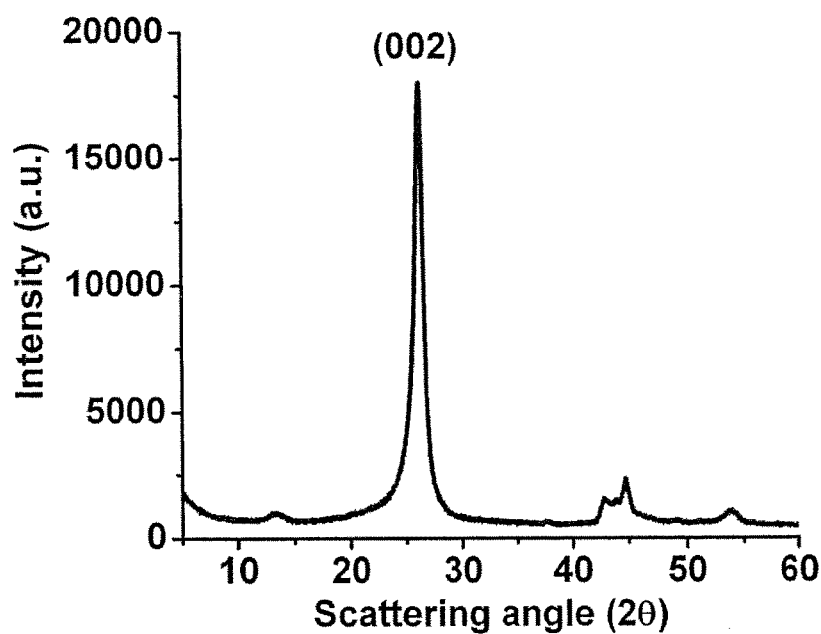
FIG. 21 is an x-ray diffraction (XRD) spectrum of the product of the control reaction with hexadecane that displays a well-pronounced diffraction line at 26.2° 2θ angle. This diffraction line corresponds to the (002) signal and is similar to the spectra of N-GNRs or MWNTs, which means that intercalation does not occur when hexadecane is used instead of 1-iodohexadecane.
Figure 22:
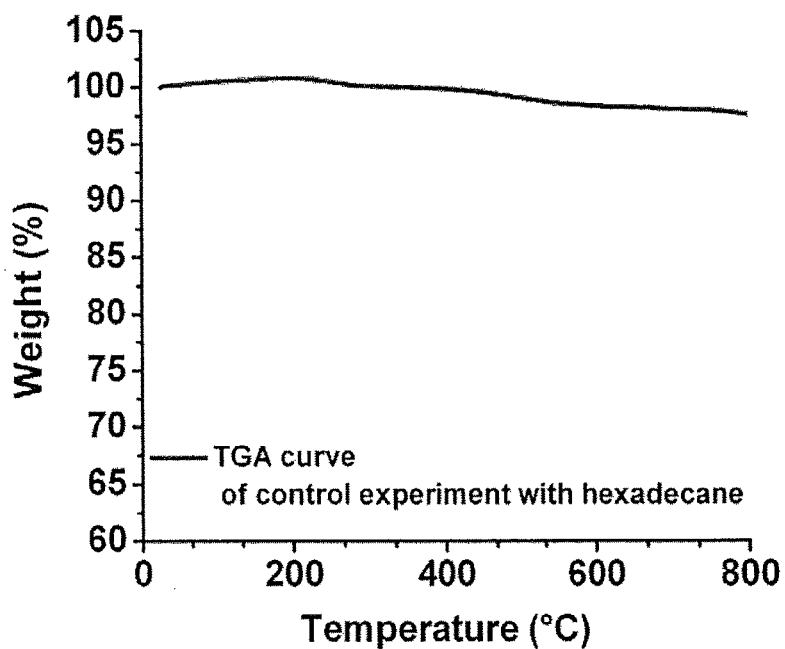
FIG. 22 is a TGA curve of the product of the control reaction in FIG. 20.

Without again being bound by theory, it is also hypothesized that intercalation is optimal when the reaction of intercalated K and 1-iodoalkane occurs between graphene sheets. The by-product KI is forced out, while newly formed alkanes and alkenes (as well as covalently bound alkyl groups) take their places between sheets. For this process the term "replacement-driven intercalation" is introduced. To partially confirm the latter, Applicants performed a control experiment, where instead of 1-iodohexadecane, hexadecane was used. Under the same reaction conditions, no intercalation was observed, as confirmed by XRD. The XRD data is shown in FIG. 21, where the (002) signal was observed at 26.2° 2θ angle, which corresponds to non-intercalated material. The XRD data was also confirmed by TGA, where a weight loss of ~2% was observed in the region between room temperature and 800° C. See FIG. 22.

In sum, the above Examples provide a high yielding conversion of commercially available MWNTs to in-situ functionalized GNRs stacks by a reductive method. GNRs bearing long alkyl chains are well-dispersible in organic solvents such as alcohols, ketones, ethers and alkanes. Particularly stable dispersions are produced in chloroform and chlorobenzene. HD-GNRs exhibit relatively high GNR conductivity as well as bulk material conductivity. The conductivity of ~3540 S/cm of single deintercalated HD-GNR was achieved through minimal interruption of the conjugated π-system of the basal plane. Therefore, Applicants propose that functionalization occurs on the edges of graphene. The concept of edge functionalization was partially supported by EGA, enhanced solubility and relatively high conductivity of single and bulk functionalized material. Replacement of intercalated addends was observed and thoroughly investigated for the HD-GNRs and O-GNRs. TGA-MS showed deintercalation of alkanes and alkenes at temperatures between 140° C. and 300° C. XRD revealed stage 1 intercalation compound for the as-prepared samples. Interestingly, no intermediate stage compounds were detected. GC-MS showed dotriacontane as major intercalant compound in HD-GNRs. Further, solid-state $^{13}$C nuclear magnetic resonance spectra of HD-GNRs were consistent with the presence of methylene carbons in covalently bound hexadecyl groups and intercalated alkanes, as the signal attributed to the methylene carbons is unusually shielded and disappears after the sample is deintercalated and defunctionalized by heating. Similarly, Raman spectroscopy for the as-prepared sample indicated the intercalation compound. XRD and Raman spectroscopy revealed that thermal treatment of intercalated HD-GNRs up to ~300° C. leads to full deintercalation. However, covalently bound functional groups are stable at that temperature and still provide enhanced solubility, as the deintercalated HD-GNRs are still soluble in organic solvents.

Example 9. Materials and Methods

Reactions were performed in dried glassware under an N$_2$ atmosphere unless stated otherwise. Reagent grade 1,2-dimethoxyethane was degassed with Ar, refluxed over sodium in an N$_2$ atmosphere and freshly distilled. Other solvents were used without further distillation. Mitsui MWNTs were received from Mitsui & Co. (lot no. 05072001K28). NTL—M grade MWNTs were donated by Nanotech Labs, Inc. (5T10M10). All other commercially available reagents were used as received. Liquid Na/K alloy was prepared in a vial inside of a N$_2$ glove box by pressing together freshly cut K (1 molar equivalent) and Na (0.22 molar equivalents) chunks using tweezers to facilitate the melting process. Amounts of liquid Na/K alloy indicated are by volume. Caution: All synthetic steps involving Na/K alloy should be carried out with extreme caution under strict exclusion of air or moisture, under inert gas and appropriate personal protection (hood, blast shields, face shield, protective and fire resistant clothing) should be used and worn at all times. 1-Iodohexadecane, 1-iodooctane and 1-iodobutane were all obtained from Sigma-Aldrich and used as received without further purification. In-house deionized water was used during purification of the products.

Synthesis of Functionalized Graphene Nanoribbons Stacks and Intercalation Replacement To an oven-dried 250 mL round-bottom flask containing a magnetic stir bar were added the MWNTs (100 mg, 8.3 mmol). The vessel was then transferred to a N$_2$ glove box where freshly distilled 1,2-dimethoxyethane (35 mL) and liquid Na/K alloy (0.29 mL) were added. The flask containing the suspension was then sealed with a septum and transferred out of the glove box where the suspension was dispersed by a short 5 min ultrasonication (using ultrasonic cleaner Cole-Parmer model 08849-00) to yield a dark greenish to red suspension. After ultrasonication, the reaction mixture was vigorously stirred (450 RPM) at room temperature for 3 d. The reaction suspension was then quenched by the addition of the 1-iodoalkane (8.75 mmol) using a syringe and left to stir at the room temperature for an additional day. Methanol (20 mL, 500 mmol) was then added to quench any excess Na/K alloy and the mixture was stirred at room temperature for 10 min. For workup, the reaction mixture was filtered over a 0.45 μm pore size PTFE membrane. The filter cake was successively washed with THF (100 mL), i-PrOH (100 mL), H$_2$O (100 mL), i-PrOH (100 mL), THF (100 mL), Et$_2$O (10 mL) then Soxhlet extraction with THF was used for 3 d and the product dried in vacuum (~10$^{-2}$ mbar) for 24 h.

Electron Microscopy

Samples were dispersed in chlorobenzene and bath sonicated using an ultrasonic cleaner for 15 min for a quick dispersion. A drop was cast on a 100 nm SiO$_2$/Si substrate and large area low resolution images were taken at 20 kV under FEI Quanta 400 ESEM FEG scanning electron microscope and under a JEOL-6500 field-emission microscope.

Conductivity Measurements

Fabrication of HD-GNR devices was performed by tracking individual GNRs on the surface of 500 nm-thick thermal SiO$_2$ layer covered highly doped Si substrates by SEM (JEOL-6500 microscope), and followed by patterning of 20 nm-thick Pt contacts by standard electron beam lithography. The electrical transport properties were tested using a probe station (Desert Cryogenics TT-probe 6 system) under vacuum with chamber base pressure below 10$^{-5}$ Torr. The IV data were collected by an Agilent 4155C semiconductor parameter analyzer.

Evolved Gas Analysis (EGA) Experimental Part

Thermogravimetric measurements were performed on a Netzsch 449 F3 Jupiter® instrument under a dynamic Ar (5.0) flow with a flow rate of 60 mL/min in a temperature range from 25° C. to 900° C. A heating rate of 10 K/min was used. About 5 mg of sample was placed in alumina (Al$_2$O$_3$) crucible. Simultaneously mass spectrometry was performed on MS 403C Aëolos® with detector SEM Chemeltron and system pressure of 2×10$^{-5}$ mbar. Gasses evolved under TG heat treatment were transferred to mass spectrometer through transfer capillary: quartz ID 75 μm which was heated up to 220° C. The upper limit of the mass spectrometer detector was 100 AMU.

XRD

X-ray powder diffraction (XRD) was performed using a Rigaku D/Max 2550 diffractometer with Cu Kα radiation (λ=1.5418 Å). Where necessary, the data obtained was analyzed and processed using the Jade 9 software package.

GC-MS

GC-MS was performed on Agilent Technologies 6890N Network GC system coupled to Agilent 5973 network mass selective detector.

SS$^{13}$C NMR Spectroscopy

Spectra were obtained at 50.3 MHz $^{13}$C on a Bruker Avance 200 spectrometer with a probe for magic angle spinning (MAS) of rotors 4 mm in diameter. Chemical shifts are relative to the carbonyl carbon in glycine defined as 176.46 ppm.[38] Both samples in FIG. 6 were dispersed in silica (10 wt % sample, 90 wt % silica). Parameters for the $^1$H-$^{13}$C CP spectrum of functionalized and intercalated HD-GNRs (red curve in FIG. 6) were as follows: 7.6 kHz MAS (so that any spinning sidebands are at multiples of + or −151 ppm from a centerband), 90° $^1$H pulse=2.4 μs, contact time=1 ms with ramped amplitude proton pulse, FID=32.8 ms with spinal64 decoupling, relaxation delay=5 s, number of scans=40,400, line broadening=50 Hz (1 ppm) used in processing the FID. Parameters for the $^1$H-$^{13}$C CP/dipolar dephasing spectrum of functionalized and intercalated HD-GNRs (black curve in FIG. 6) were as follows: as above except that a pair of 25-μs dephasing periods with a central 8.3-μs, 180° $^{13}$C refocusing pulse immediately preceded FID acquisition. Parameters for the $^1$H-$^{13}$C CP spectrum of functionalized and intercalated HD-GNRs heated at 900° C. for 20 min (blue curve in FIG. 6) are the same as for the unheated sample (red curve) except for 85,000 scans. Parameters for the $^1$H-$^{13}$C CP spectrum of 100% silica (control sample) are the same except for 55,000 scans; no signal was detected.

Raman Spectroscopy

The Raman spectra were acquired using a Renishow Raman RE01 microscope with 40× lens; 514 nm wavelength laser was used for excitation.

Example 10. Synthesis of Non-Functionalized GNRs (N-GNRs)

Figure 10:
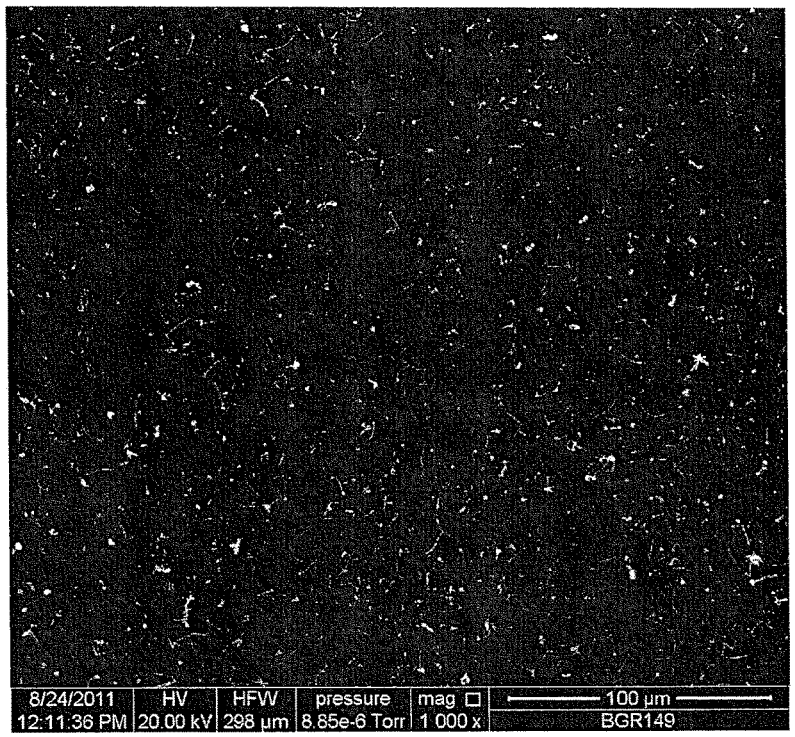
FIG. 10 provides images of various GNRs.
Figure 10:
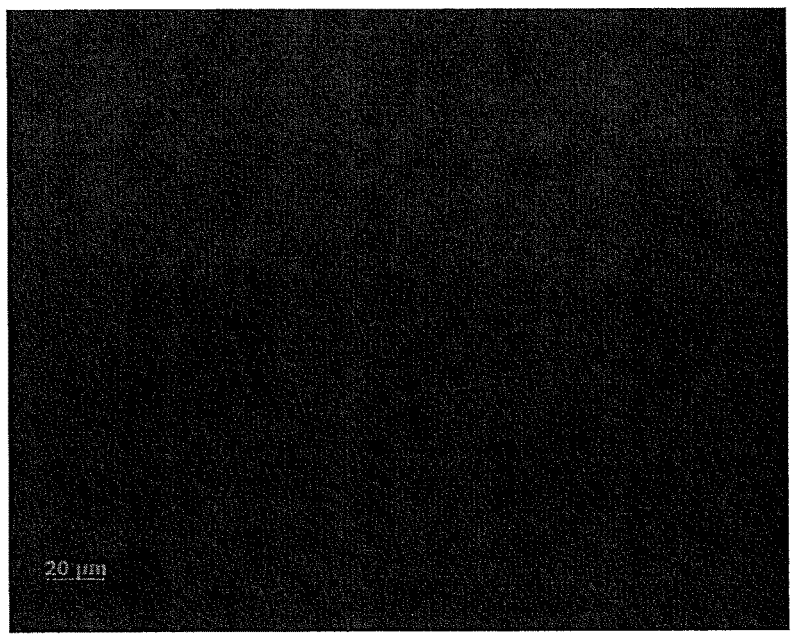

To an oven-dried 250 mL round-bottom flask containing a magnetic stir bar were added the multi-walled carbon nanotubes (MWNTs, 100 mg, 8.3 mmol). The vessel was then transferred to a N$_2$ glove box where freshly distilled 1,2-dimethoxyethane (35 mL) and liquid Na/K alloy (0.29 mL) were added. The flask with the suspension was then sealed with septa and transferred out of the glove box where it was dispersed by a short 5 min ultrasonication to yield a dark greenish to red suspension. After ultrasonication, the reaction mixture was vigorously stirred (450 RPM) at room temperature for 3 d. The reaction suspension was then quenched by the addition of methanol (20 mL, 500 mmol) using a syringe and stirring was continued at room temperature for 10 min. The reaction mixture was filtered over a 0.45 μm pore size PTFE membrane. The filter cake was successively washed with THF (100 mL), i-PrOH (100 mL), H$_2$O (100 mL), i-PrOH (20 mL), THF (20 mL), Et$_2$O (10 mL) and dried under in high vacuo. The scheme is illustrated in FIG. 10.

Figure 19:
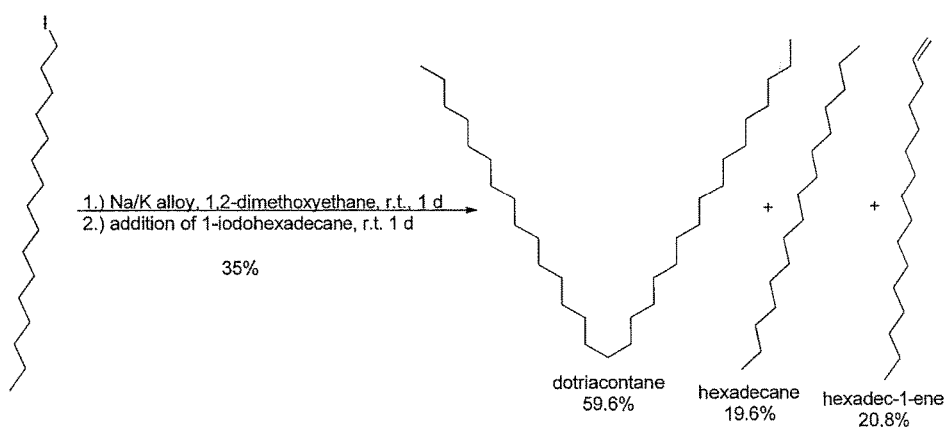
FIG. 19 shows a control reaction of 1-iodohexadecane with Na/K in the absence of MWNTs

Example 11. Control Reaction of 1-iodohexadecane with Na/K in the Absence of MWNTs An oven-dried 5 mL RB flask containing a magnetic stir bar was transferred to a N$_2$ glove box where freshly distilled 1,2-dimethoxyethane (DME, 40 mL) and liquid Na/K alloy (0.057 mL, 1.29 mmol) were added. The flask containing the suspension was then sealed with septa and transferred out of the glove box where the suspension was dispersed by a 5 min ultrasonication to yield a blue suspension. After ultrasonication, the reaction mixture was vigorously stirred (450 RPM) at room temperature for 1 hour. The reaction suspension was then quenched by the addition of the 1-iodohexadecane (1 mL, 2.56 mmol) and left to stir at the room temperature for an additional d. The reaction mixture was then diluted with CH$_2$Cl$_2$ and GC-MS analysis was performed. The scheme is shown in FIG. 19.

Example 12. Control Reaction with Hexadecane and MWNTs

Figure 20:
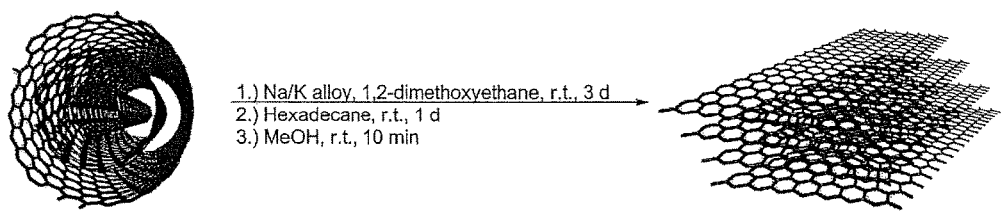
FIG. 20 shows a control reaction with hexadecane and MWNTs.

MWNTs (100 mg; 8.33 mmol) were added to an oven-dried 100 mL round-bottom flask containing a magnetic stir bar. The vessel was then transferred to a N$_2$ glove box where freshly distilled 1,2-dimethoxyethane (26 mL) and liquid Na/K alloy (0.13 mL; 3 mmol) were added. The flask containing the suspension was then sealed with septa and transferred out of the glove box where the suspension was dispersed by a short 5 min ultrasonication to yield a dark greenish to red suspension. After ultrasonication, the reaction mixture was vigorously stirred (450 RPM) at room temperature for 3 days. Hexadecane (0.6 mL; 3.34 mmol) was then added using a syringe and stirred at room temperature for an additional day. The reaction mixture was then quenched by addition of MeOH (21 mL) and stirred at room temperature for 10 min. For workup, the reaction mixture was filtered over a PTFE membrane with a 0.45 μm pore size. The remaining solid was successively washed with THF (100 mL), PrOH (100 mL), H$_2$O (100 mL), i-PrOH (20 mL), THF (20 mL), and Et$_2$O (10 mL). The solid was then dried in vacuum. The scheme is shown in FIG. 20.

Example 13. Synthesis and Characterization of Fe-TD-GNRs

This Example illustrates various schemes for the synthesis and characterization of iron-intercalated and tetradecane-functionalized graphene nanoribbons (Fe-TD-GNRs). See FIG. 23. In particular, Fe-TD-GNRs were made from commercially available carbon nanotubes by a facile synthesis. The physical properties of Fe-TD-GNRs were analyzed by transmission electron microscopy, thermogravimetric analysis, X-ray photoelectron spectroscopy, evolved gas analysis, Raman spectroscopy, and scanning electron microscopy. By the intercalation of iron, the alignment of the Fe-TD-GNRs in a magnetic field was enabled. The aligned structures enhanced electrical percolation at given concentrations in previously non-conductive solvents.

Synthesis of Fe-TD-GNRs

Route 1: FIG. 23A.

MWNTs (200 mg) and FeCl$_3$ (600 mg) were loaded into a two zone glass ampoule separately. The ampoule was then evacuated and sealed under vacuum using an acetylene torch. The loaded and sealed ampoule was put into a muffle furnace (NEY 6-160A) and heated at 360° C. for 24 h. The cooled ampoule was transferred to a glove box and opened. The intercalated and partially unzipped carbon material was then removed from the glove box and transferred into a glass vial. The vial with carbon material was then put into a bigger glass bottle together with two other vials, one filled with distilled water (20 mL), and the other with solid potassium hydroxide (2 g). The glass bottle was then inserted into an oven and heated at 110° C. for 24 h. The vial with carbon material was removed from the bottle and dried overnight in vacuum oven at 60° C. and ~100 Torr. The dried material was transferred into a porcelain boat and inserted into a standard quartz tube. The tube was then heated in a standard quartz tube furnace (Lindberg/Blue M, Model No.: TF55035COMA-1) at 800° C. for 1 h under H$_2$ flow (200 SCCM). The reduced material (100 mg) was then loaded into an oven-dried 250 mL round-bottom flask containing a magnetic stir bar and transferred to a N$_2$ glove box where freshly distilled 1,2-dimethoxyethane (35 mL) and liquid Na/K alloy (0.29 mL) were added. The flask containing the suspension was then sealed with a septum and transferred out of the glove box where the suspension was dispersed by a short 5 min ultrasonication (using ultrasonic cleaner Cole-Parmer model 08849-00) to yield a dark green to red suspension. After ultrasonication, the reaction mixture was vigorously stirred (450 RPM) at room temperature for 1 day. The reaction suspension was then quenched by the addition of 1-iodoalkane (8.75 mmol) using a syringe and stirred at room temperature for an additional day. Methanol (20 mL, 500 mmol) was then added to quench any excess Na/K alloy. Next the mixture was stirred at room temperature for 10 min. For workup, the reaction mixture was filtered over a 0.45 μm pore size PTFE membrane and the filter cake was successively washed with THF (100 mL), i-PrOH (100 mL), H$_2$O (100 mL), i-PrOH (100 mL), THF (100 mL), and Et$_2$O (10 mL). Finally, the product was dried in vacuum (~10$^{-2}$ mbar) for 24 hours.

Figure 23:
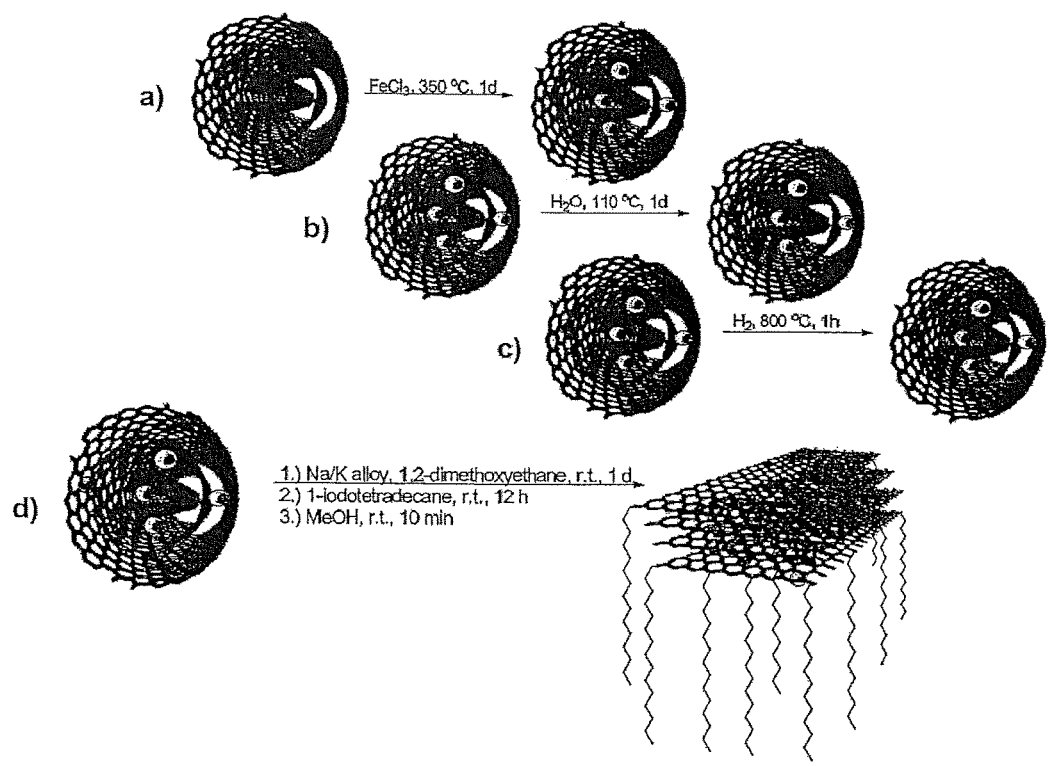
FIG. 23 illustrates various schemes in A-D for the synthesis of iron-intercalated and tetradecane-functionalized graphene nanoribbons (Fe-TD-GNRs).
Figure 23:
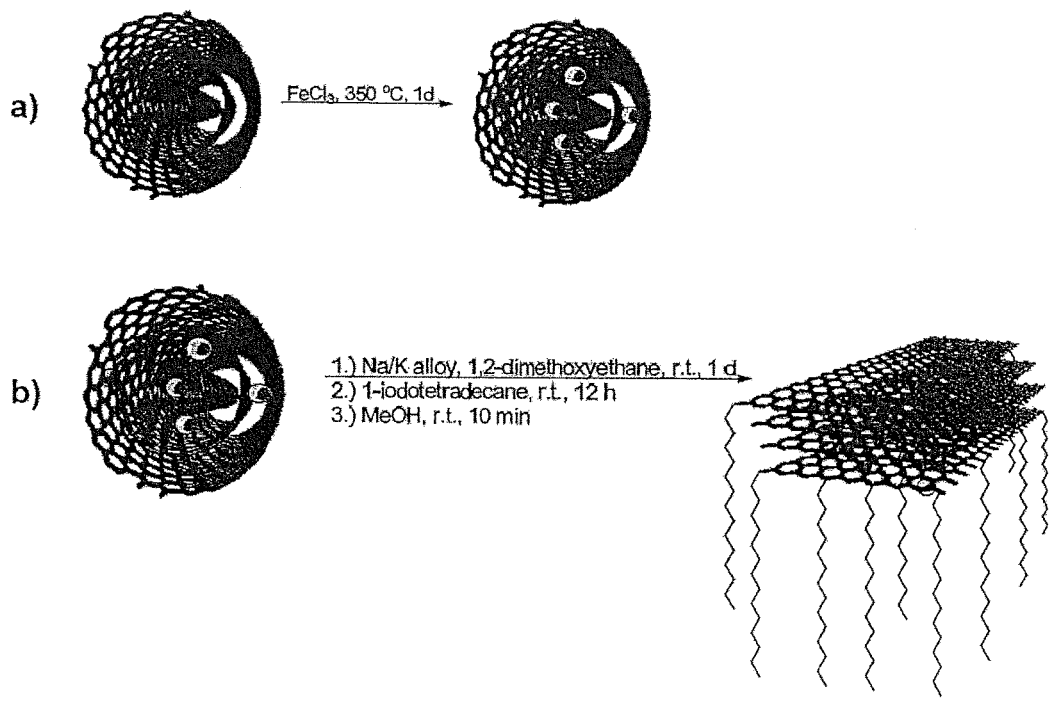
Figure 23:
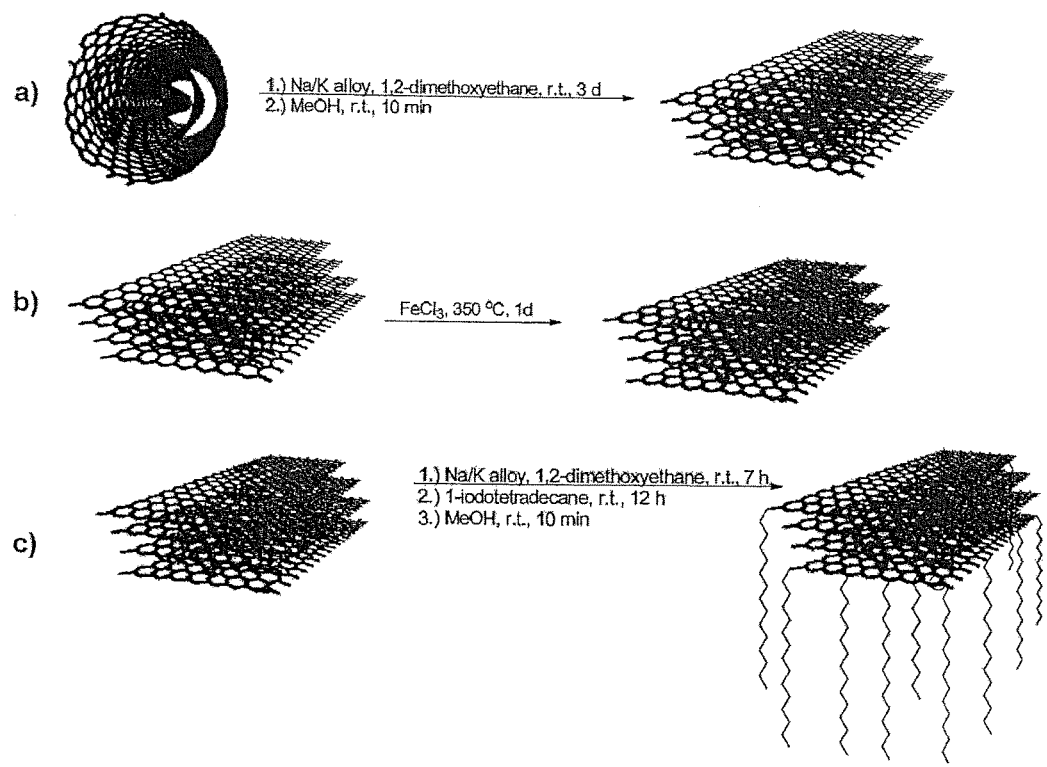
Figure 23:
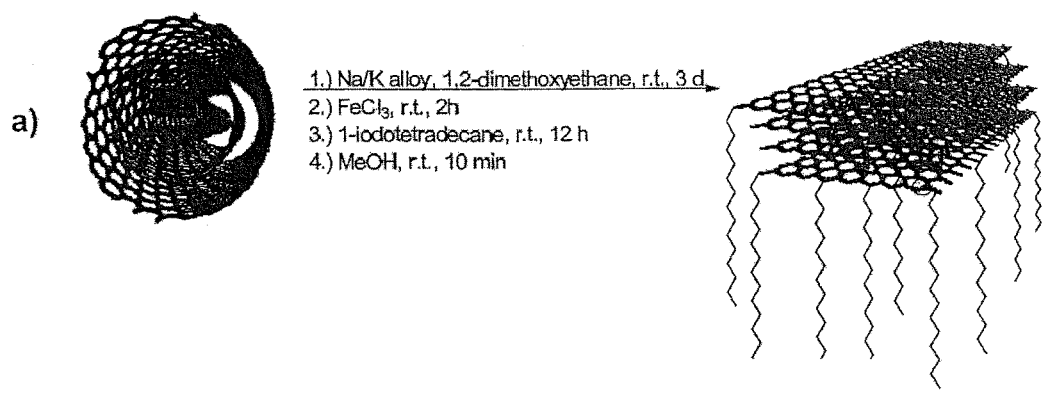

Route 2: FIG. 23 B.

MWNTs (200 mg) and FeCl$_3$ (600 mg) were loaded into a two zone glass ampoule separately. The ampoule was then evacuated and sealed under vacuum using an acetylene torch. The loaded and sealed ampoule was put into a muffle furnace (NEY 6-160A) and heated at 360° C. for 24 h. The cooled ampoule was transferred to a glove box and opened. The intercalated and partially unzipped carbon material (100 mg) was then loaded into an oven-dried 250 mL round-bottom flask containing a magnetic stir bar. Distilled 1,2-dimethoxyethane (35 mL) and liquid Na/K alloy (0.29 mL) were then added to the flask. The flask containing the suspension was then sealed with a septum and transferred out of the glove box where the suspension was dispersed by a short 5 min ultrasonication (using ultrasonic cleaner Cole-Parmer model 08849-00) to yield a dark green to red suspension. After ultrasonication, the reaction mixture was vigorously stirred (450 RPM) at room temperature for 1 day. The reaction suspension was then quenched by the addition of the 1-iodoalkane (8.75 mmol) using a syringe and stirred at room temperature for an additional day. Methanol (20 mL, 500 mmol) was then added to quench any excess Na/K alloy. The mixture was then stirred at room temperature for 10 min. For workup, the reaction mixture was filtered over a 0.45 μm pore size PTFE membrane. The filter cake was successively washed with THF (100 mL), i-PrOH (100 mL), H$_2$O (100 mL), i-PrOH (100 mL), THF (100 mL), and Et$_2$O (10 mL). The product was then dried in a vacuum (~10$^{-2}$ mbar) for 24 hours.

Route 3: FIG. 23 C.

MWNTs, (100 mg, 8.3 mmol) were added to an oven-dried 250 mL round-bottom flask containing a magnetic stir bar. The flask was then transferred to a N$_2$ glove box. Freshly distilled 1,2-dimethoxyethane (35 mL) and liquid Na/K alloy (0.29 mL) were then added to the flask. The flask with the suspension was then sealed with septa and transferred out of the glove box where it was dispersed by a short 5 min ultrasonication to yield a dark green to red suspension. After ultrasonication, the reaction mixture was vigorously stirred (450 RPM) at room temperature for 3 days. The reaction suspension was then quenched by the addition of methanol (20 mL, 500 mmol) using a syringe and stirred at room temperature for an additional 10 minutes. Next, the reaction mixture was filtered over a 0.45 μm pore size PTFE membrane and the filter cake was successively washed with THF (100 mL), i-PrOH (100 mL), H$_2$O (100 mL), i-PrOH (20 mL), THF (20 mL), and Et$_2$O (10 mL). The filter cake was then dried in vacuum (~10$^{-2}$ mbar) for 24 h. The product of the reaction (non-functionalized GNRs (H-GNRs) (100 mg)) and FeCl$_3$ (300 mg) were then separately loaded into two different zones of a two zone glass ampoule. The ampoule was evacuated and sealed under vacuum using an acetylene torch. The loaded and sealed ampoule was placed in a muffle furnace (NEY 6-160A) and heated at 360° C. for 24 h. The cooled ampoule was then transferred to a glove box and opened. The intercalated and partially unzipped carbon material was then transferred into an oven-dried 250 mL round-bottom flask containing a magnetic stir bar. Freshly distilled 1,2-dimethoxyethane (35 mL) and liquid Na/K alloy (0.29 mL) were then added to the flask. The flask containing the suspension was then sealed with a septum and transferred out of the glove box where the suspension was dispersed by a short 5 min ultrasonication (using ultrasonic cleaner Cole-Parmer model 08849-00) to yield a dark green to red suspension. After ultrasonication, the reaction mixture was vigorously stirred (450 RPM) at room temperature for 7 h. The reaction suspension was then quenched by the addition of the 1-iodoalkane (8.75 mmol) using a syringe and stirred at room temperature for an additional day. Methanol (20 mL, 500 mmol) was then added to quench any excess Na/K alloy. The mixture was then stirred at room temperature for 10 minutes. For workup, the reaction mixture was filtered over a 0.45 µm pore size PTFE membrane and the filter cake was successively washed with THF (100 mL), i-PrOH (100 mL), $H_2O$ (100 mL), i-PrOH (100 mL), THF (100 mL), $Et_2O$ (10 mL). The product was then dried in vacuum (~$10^{-2}$ mbar) for 24 hours.

Route 4: FIG. 23 D.

MWNTs (100 mg, 8.3 mmol) were added to an oven-dried 250 mL round-bottom flask containing a magnetic stir bar. The vessel was then transferred to a $N_2$ glove box. Freshly distilled 1,2-dimethoxyethane (35 mL) and liquid Na/K alloy (0.29 mL) were then added. The flask containing the suspension was then sealed with a septum and transferred out of the glove box where the suspension was dispersed by a short 5 min ultrasonication (using ultrasonic cleaner Cole-Parmer model 08849-00) to yield a dark green to red suspension. After ultrasonication, the reaction mixture was vigorously stirred (450 RPM) at room temperature for 3 days. The vessel was then transferred to a glove box and opened. $FeCl_3$ (300 mg) was added and transferred out of the glove box where the suspension was stirred for 2 h. The reaction suspension was then quenched by the addition of the 1-iodoalkane (8.75 mmol) using a syringe and stirred at room temperature for an additional day. Methanol (20 mL, 500 mmol) was then added to quench any excess Na/K alloy. The mixture was then stirred at room temperature for 10 minutes. For workup, the reaction mixture was filtered over a 0.45 µm pore size PTFE membrane and the filter cake was successively washed with THF (100 mL), i-PrOH (100 mL), $H_2O$ (100 mL), i-PrOH (100 mL), THF (100 mL), and $Et_2O$ (10 mL). Finally, the product was dried in vacuum (~$10^{-2}$ mbar) for 24 hours.

TGA of the Fe-TD-GNRs

Figure 24:
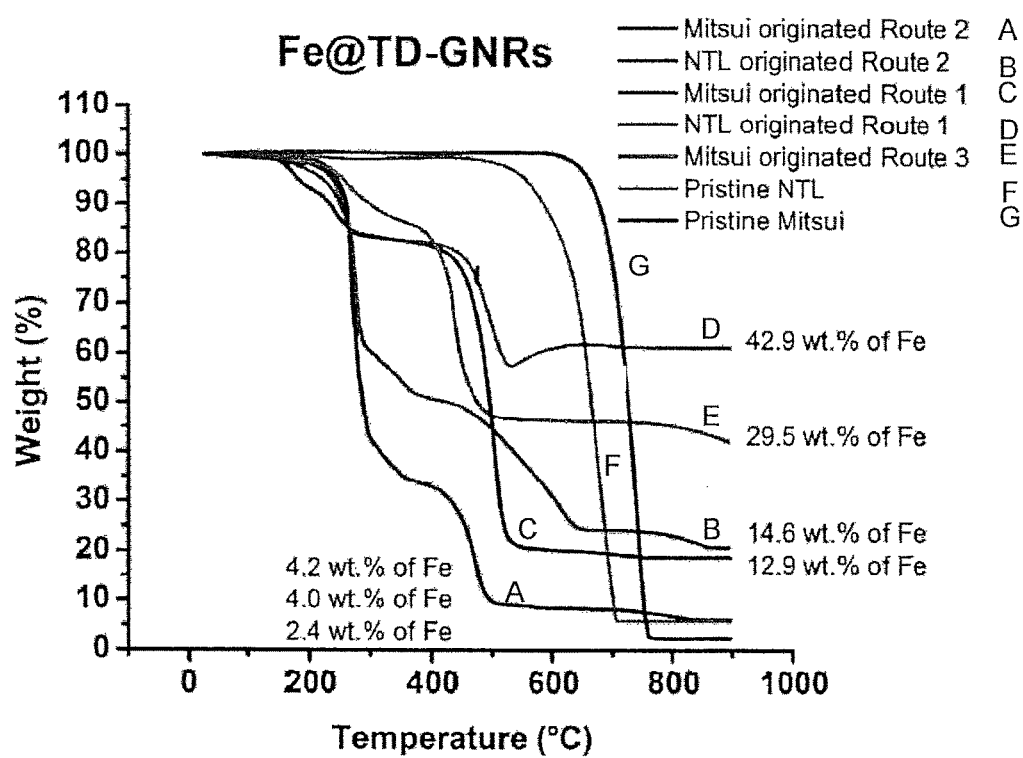
FIG. 24 shows the TGA of the iron content of the synthesized Fe-TD-GNRs.

Thermogravimetric measurements were performed under a dynamic air flow with a flow rate of 100 mL/min in a temperature range from 25° C. to 900° C. with a heating rate of 10° C./min. Roughly 5 mg of sample was heated in an alumina ($Al_2O_3$) crucible. The concentration of iron was calculated from the thermolysis residue, assuming the residue was $Fe_2O_3$. The results indicated that NTL M-Grade MWCNTs may be suitable precursors for the intercalation of iron, as the iron concentration was higher than for Mitsui MWCNTs for most of the samples. The highest iron concentration (42.9 wt. %) in NTL originated Fe-TD-GNRs was estimated in a sample synthesized according to Route 1 (FIG. 24D). Mitsui-originated Fe-TD-GNRs synthesized according to Route 1 (FIG. 24C) show an iron intercalation of about 12.9 wt. %. In Mitsui originated Fe-TD-GNRs synthesized according to Route 3 (FIG. 24E), the iron concentration was estimated at about 29.5 wt. %. Without being bound by theory, it is envisioned that the differences in the iron concentrations between NTL and Mitsui originated Fe-TD-GNRs can be ascribed to the number of defects, which are higher in the case of NTL. As MWCNTs are split to GNRs before intercalation, more defects as well as sites are introduced where iron can be intercalated between the graphene layers. Consequently, more iron can be intercalated, as illustrated in curve E (FIG. 24E). Route 2 (FIGS. 23A and 23B) yielded materials with lower iron concentration for both MWCNT precursors, NTL and Mitsui. CA control TGA for pristine NTL and Mitsui showed minimum amount of the inorganic residue indicating that most of the iron was intercalated and not inherited (FIGS. 24F and 24G).

XPS Estimations of the Iron Content of the Fe-TD-GNRs

Figure 25:
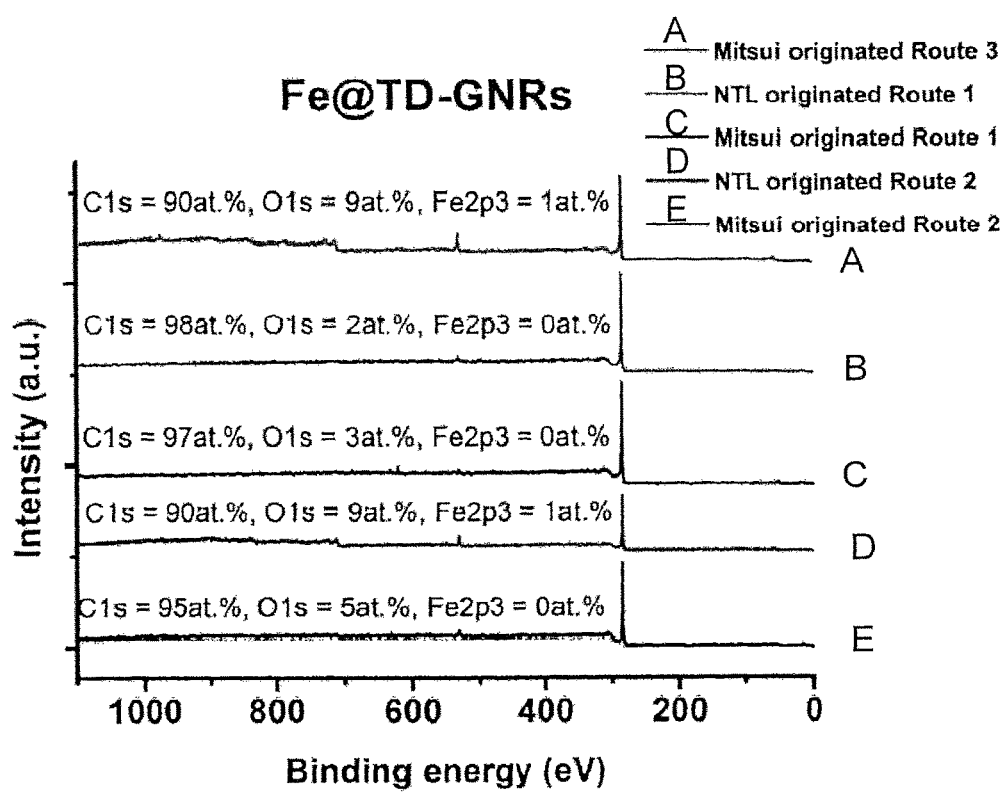
FIG. 25 shows x-ray photoelectron spectroscopy (XPS) estimations of the iron content in the synthesized Fe-TD-GNRs.

Another method for estimating the iron concentration is XPS. Concentrations were measured in atomic % (at. %) and were between 0 at. % (FIGS. 25 B, C, and E) and 1 at. % (FIGS. 25A and D), which is much lower than concentrations estimated from the TGA. Without being bound by theory, it is envisioned that such results are an indication that iron is indeed intercalated and not adsorbed on the surface, as XPS is a surface technique where the maximum depth of analysis was 2 nm.

EGA of the Iron Content in the Fe-TD-GNRs

Figure 26:
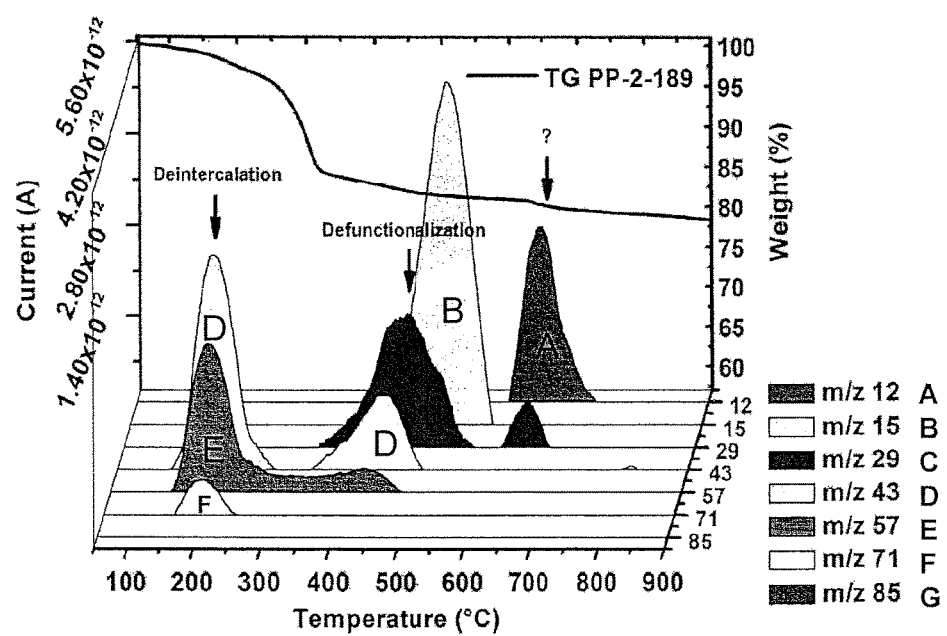
FIG. 26 shows EGA of NTL originated Fe-TD-GNRs that were synthesized according to route 1 shown in FIG. 23A.
Figure 27:
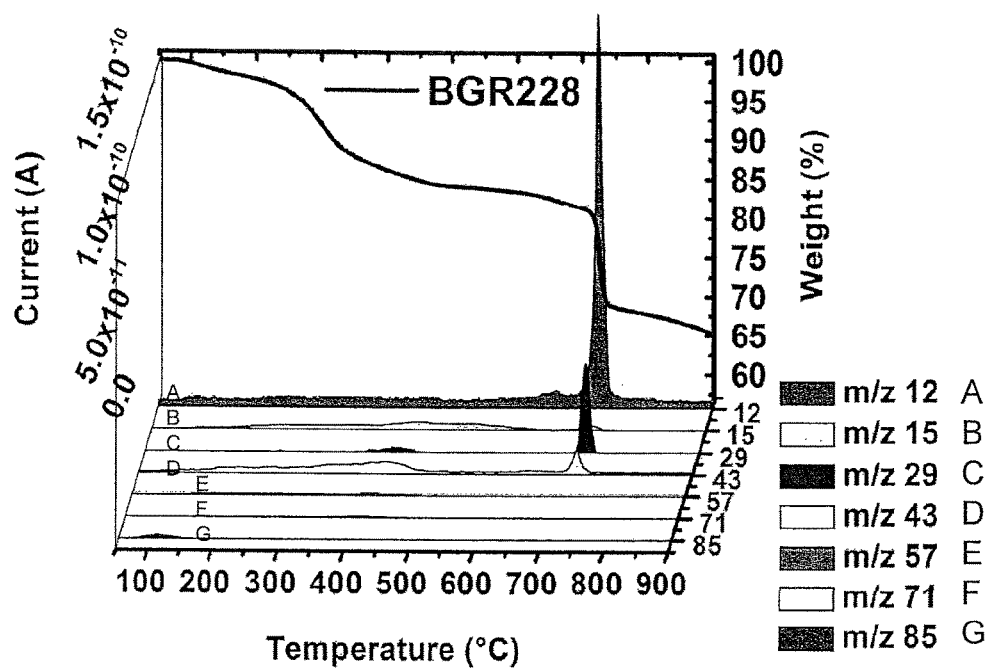
FIG. 27 shows EGA of Mitsui originated Fe-TD-GNRs that were synthesized according to route 3 shown in FIG. 23C.
Figure 28:
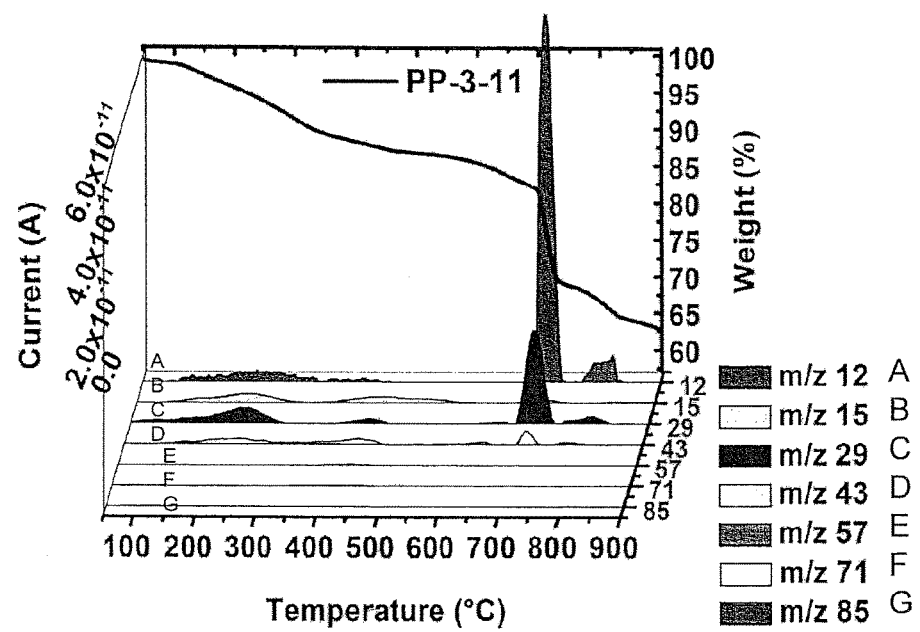
FIG. 28 shows EGA of Mitsui originated Fe-TD-GNRs that were synthesized according to route 3 shown in FIG. 23D.

Similarly as for alkylated-GNRs, EGA analysis was done for Fe-TD-GNRs. For NTL originated Fe-TD-GNRs (FIG. 26), at least three distinct temperature ranges were determined in which the alkyl groups could be present in the off-gas from thermolysis products. The first region is between 180° C. and 250° C. (FIGS. 26 D, E, F), second between 350° C. and 570° C. (FIGS. 26 B, C, D), and third between 650° C. and 700° C. (FIGS. 26 A, C). First and second regions were assigned to deintercalation and defunctionalization respectively. Decomposition in the third region still remains under investigation. However, is the results are characteristic for iron intercalated functionalized GNRs and absent in HD-GNRs. Thus, it is envisioned that intercalated iron may be stabilizing the alkyl based functional groups or intercalants. The third region is even more pronounced in the TGA-MS of Mitsui originated Fe-TD-GNRs synthesized according to route 3 (FIG. 27), and the TGA-MS of Mitsui originated Fe-TD-GNRs synthesized according to route 4 (FIG. 28). In both FIG. 27 and FIG. 28, deintercalation as well as defunctionalization regions are present.

Raman Spectra of the Fe-TD-GNRs

Figure 7:
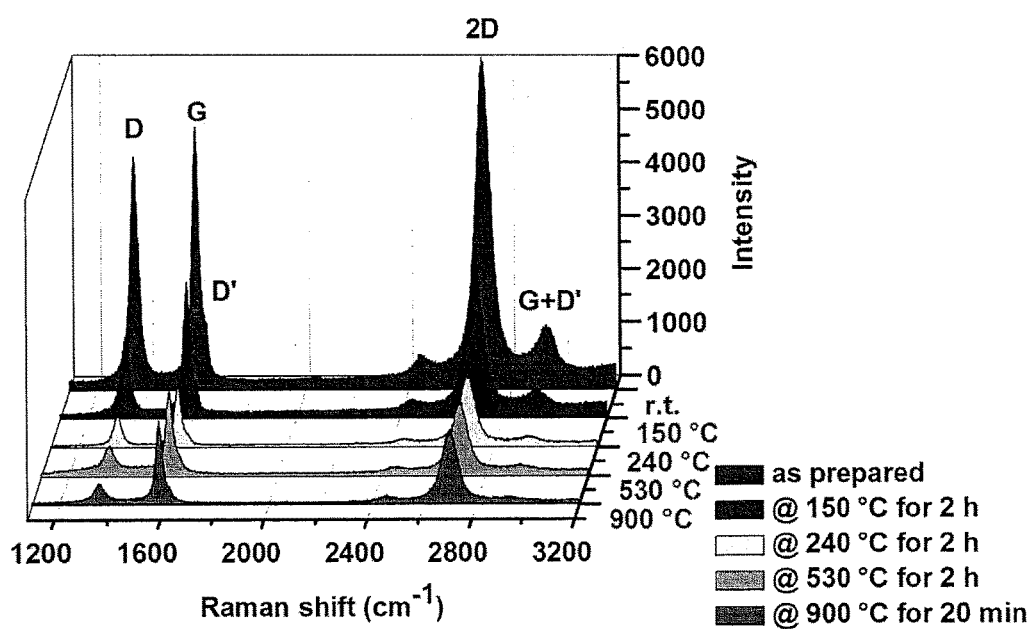
FIG. 7 shows Raman spectra that compare thermally treated HD-GNRs with as-prepared GNR samples.
Figure 8:
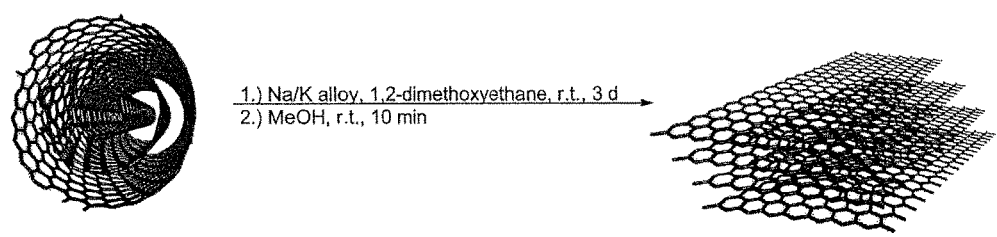
FIG. 8 illustrates the scheme for the synthesis of non-functionalized GNRs (N-GNRs), where the edges are protonated with methanol.
Figure 29:
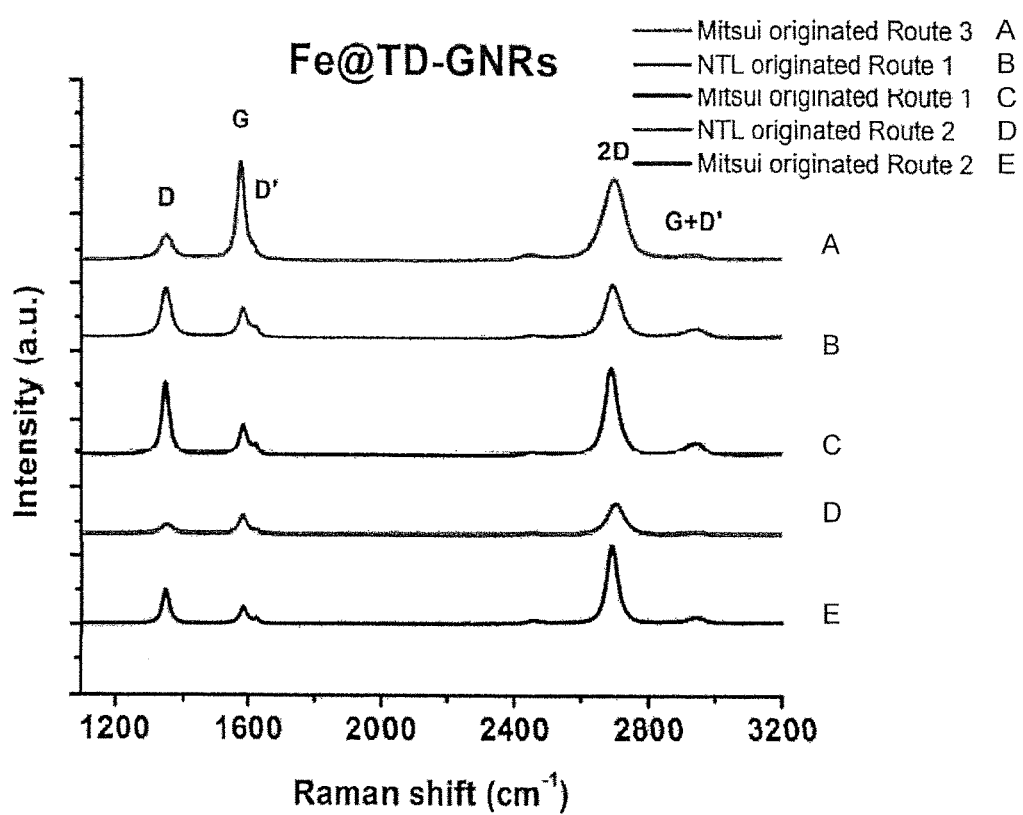
FIG. 29 shows Raman spectra of various Fe-TD-GNRs.

The Raman spectra for Mitsui originated Fe-TD-GNRs synthesized according to route 3 (FIG. 29 A) and NTL originated Fe-TD-GNRs synthesized according to route 2 (FIG. 29 D) are similar to the Raman spectrum of HD-GNRs (FIG. 7). Contrary, Raman spectra of NTL originated Fe-TD-GNRs synthesized according to route 1 (FIG. 29 B), Mitsui originated Fe-TD-GNRs synthesized according to route 1 (FIG. 29 C), and Mitsui originated Fe-TD-GNRs synthesized according to route 2 (FIG. 29 E) show an unusual D-peak at ~1360 $cm^{-1}$ of very high intensity. The D/G ratio can be considered as a measure of disorder. The fact that the ratio is very high for the spectra on FIGS. 29 B, C, and E indicates the presence of disordered graphitic structures due to randomly intercalated irons. On the other hand, spectra on FIGS. 29 A, D exhibit lower D/G ratio which can be ascribed to more ordered structure, despite high concentrations of intercalated iron, especially in Mitsui originated Fe-TD-GNRs synthesized according to route 3 (FIG. 29 A).

Solubility of the Fe-TD-GNRs

Figure 30:
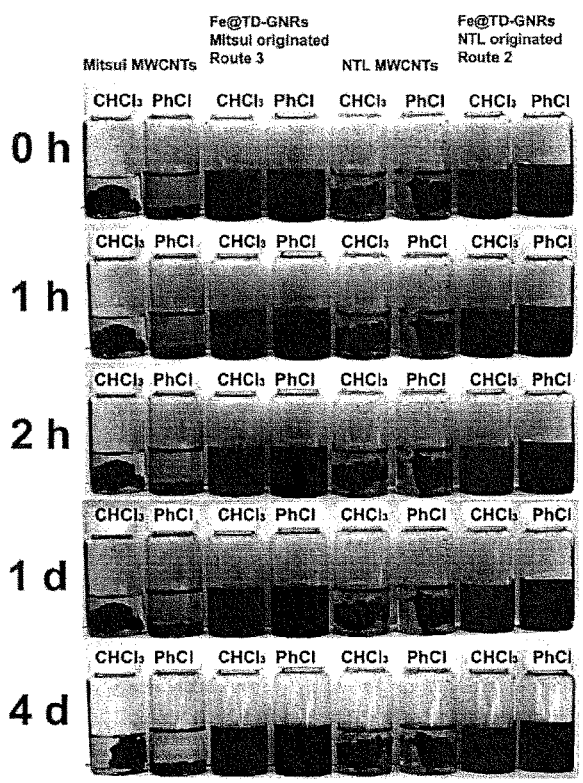
FIG. 30 shows the results of solubility test for various Fe-TD-GNRs and the results of the magnetic properties of the materials in solvent.
Figure 30:
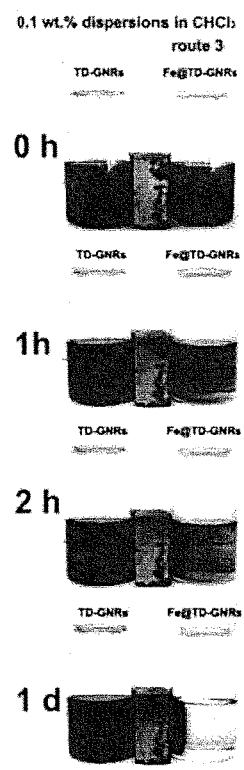

The solubility of NTL and Mitsui MWCNTs were compared to the solubility of NTL and Mitsui originated Fe-TD-GNRs through solubility tests in chloroform and chlorobenzene (FIG. 30). Fe-TD-GNRs show stable 0.1 wt. % dispersions in chloroform and chlorobenzene (FIG. 30—left $3^{rd}$, $4^{th}$, $7^{th}$, and $8^{th}$ columns) even after four days of shelf aging. However, MWCNTs (FIG. 30—left $1^{st}$, $2^{nd}$, $5^{th}$, and $6^{th}$ columns) cannot be dispersed using the same conditions.

To show that stable Fe-TD-GNRs suspensions respond to a magnetic field, another solubility test was done in the presence of a magnetic field and compared to HD-GNRs (FIG. 30—right). At the beginning (time 0 h), HD-GNRs (FIG. 30—right 1$^{st}$ column) and Fe-TD-GNRs (FIG. 30—right 2$^{nd}$ column) are stable 0.1 wt. % suspensions in chloroform. After 1 h of exposure to a magnetic field, the Fe-TD-GNRs suspension becomes more transparent, indicating separation of magnetic material to the walls of the vial closer to the magnet. After 1 d, the separation of the liquid and solid is complete in the case of the Fe-TD-GNRs. A control experiment of the non-magnetic HD-GNRs show no separation and consequently stable suspension in the presence of the magnetic field.

Conductivity of the Fe-TD-GNRs

Figure 31:
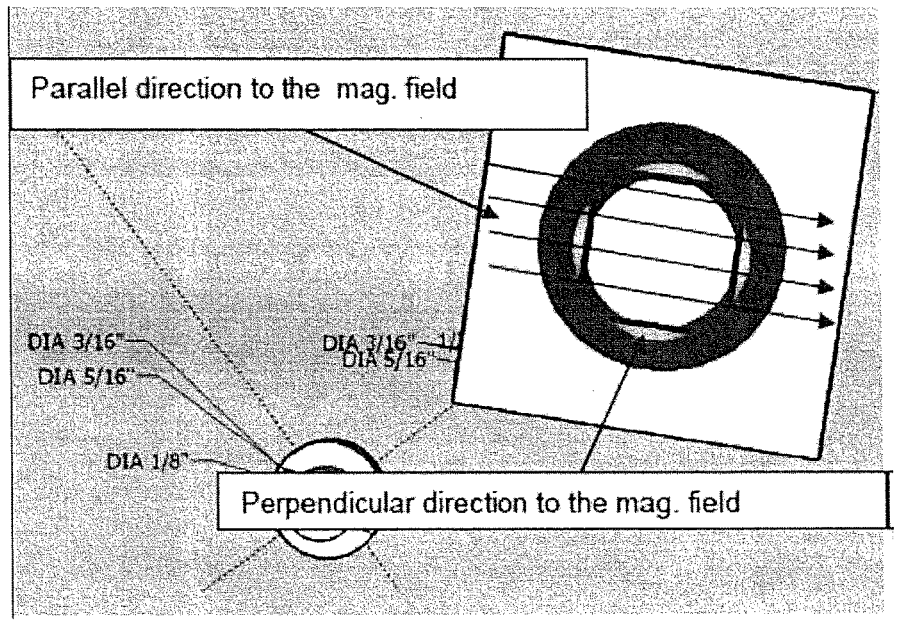
FIG. 31 shows the measurement cell design and the conductivity measurements for various Fe-TD-GNRs.
Figure 31:
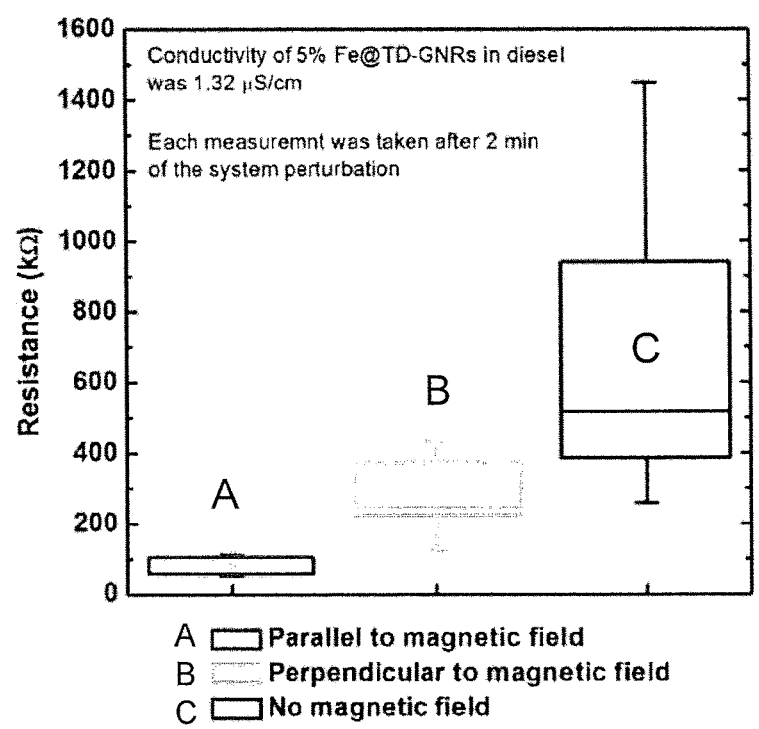

Conductivity and resistance were measured for the Fe-TD-GNRs suspensions in diesel (FIG. 31). Conductivity of still 5 wt. % suspensions out of the magnetic field was measured to be 1.32 µS/cm using a conductivity meter. To estimate the influence of the magnetic field to the Fe-TD-GNRs in diesel, a measuring cell was designed (FIG. 31 upper image). The cell consists of four electrodes where resistance parallel to the magnetic field and resistance perpendicular to the magnetic field can be measured. Results confirmed the understanding that anisotropic Fe-TD-GNRs align parallel to the magnetic field and form organized structures, which enable percolation paths at low resistance (i.e., resistance below 100 kΩ). In addition, the statistical distribution was narrow, indicating that the percolation architecture is restored after each system perturbation (FIG. 31 lower image A). In addition, resistance measured perpendicular to the magnetic field was higher (~300 kΩ), and statistical distribution was wider (FIG. 31 lower image B).

In a control experiment, the measurement of resistance out of magnetic field yielded resistance of (~700 kΩ) and wide statistical distributions (FIG. 31 lower image C). Without being bound by theory, such results indicate percolation may be coincidental and random.

Imaging of the Fe-TD-GNRs

Figure 32:
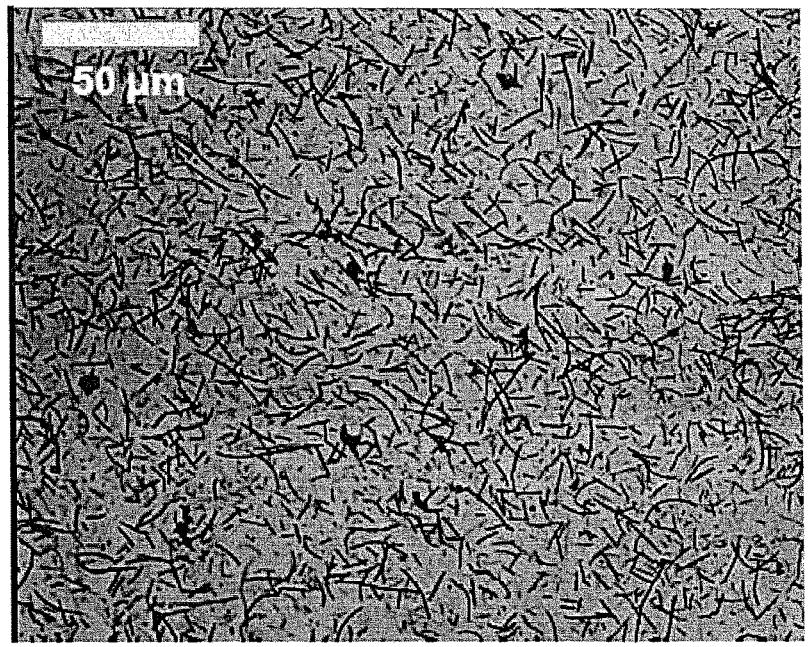
FIG. 32 shows optical microscope images of NTL originated Fe-TD-GNRs.
Figure 32:
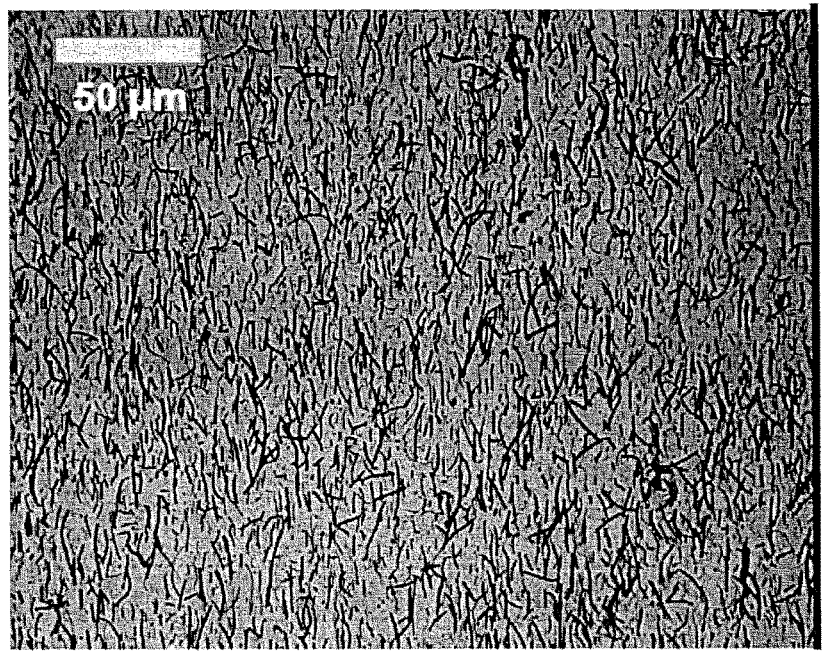
Figure 33:
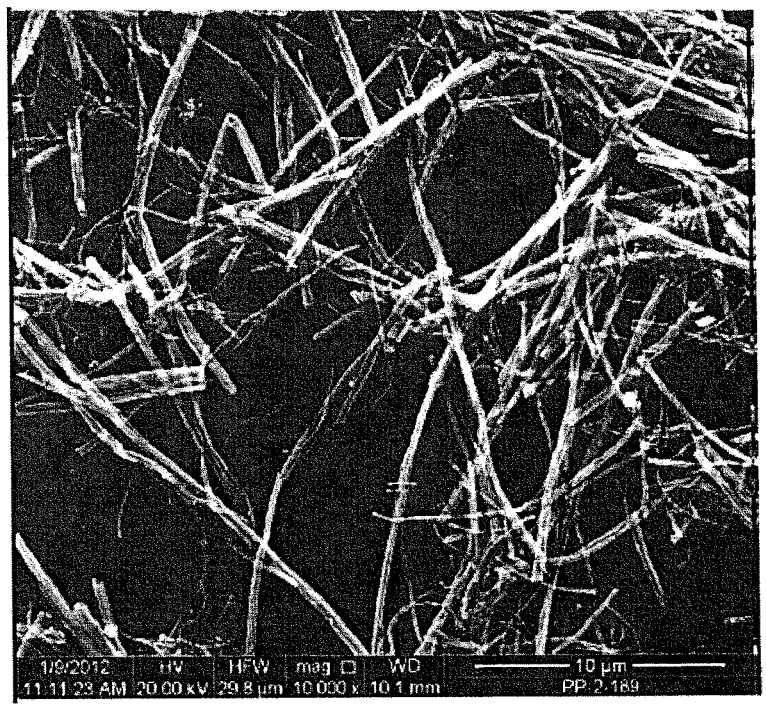
FIG. 33 shows SEM images of NTL originated Fe-TD-GNRs.
Figure 33:
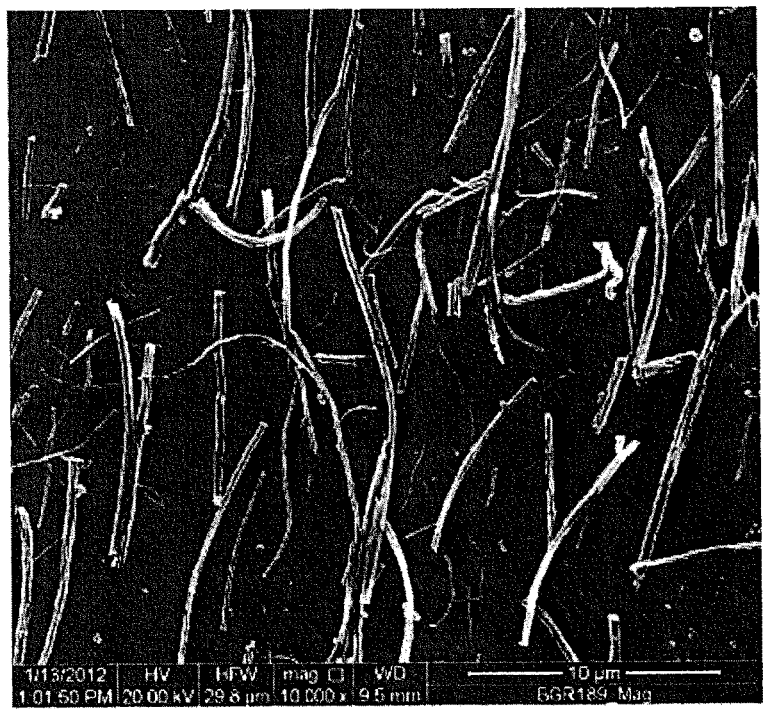
Figure 34:
FIG. 34 shows optical microscope images of Mitsui originated Fe-TD-GNRs.
Figure 34:
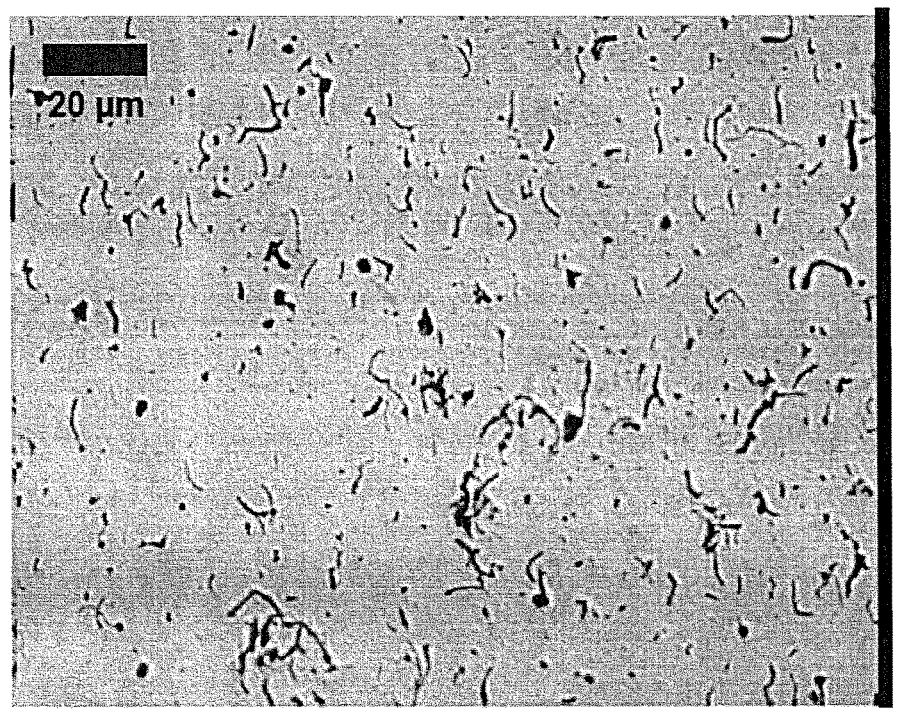
Figure 35:
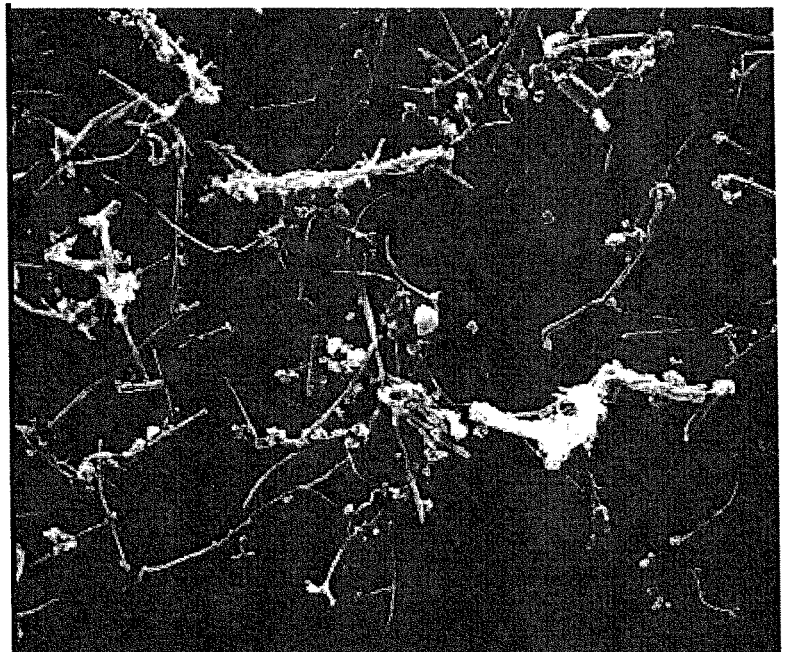
FIG. 35 shows SEM images of Mitsui originated Fe-TD-GNRs.
Figure 35:
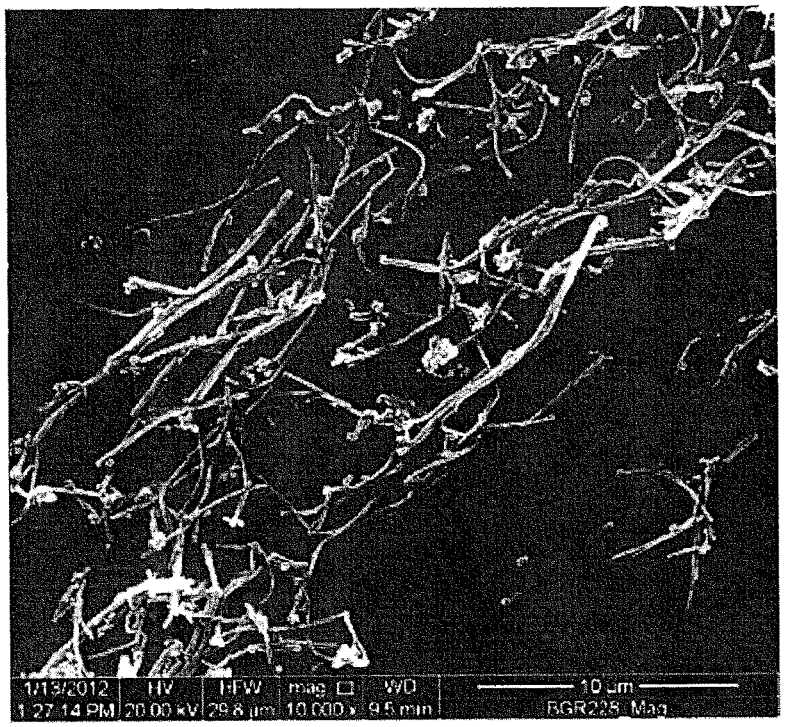
Figure 36:
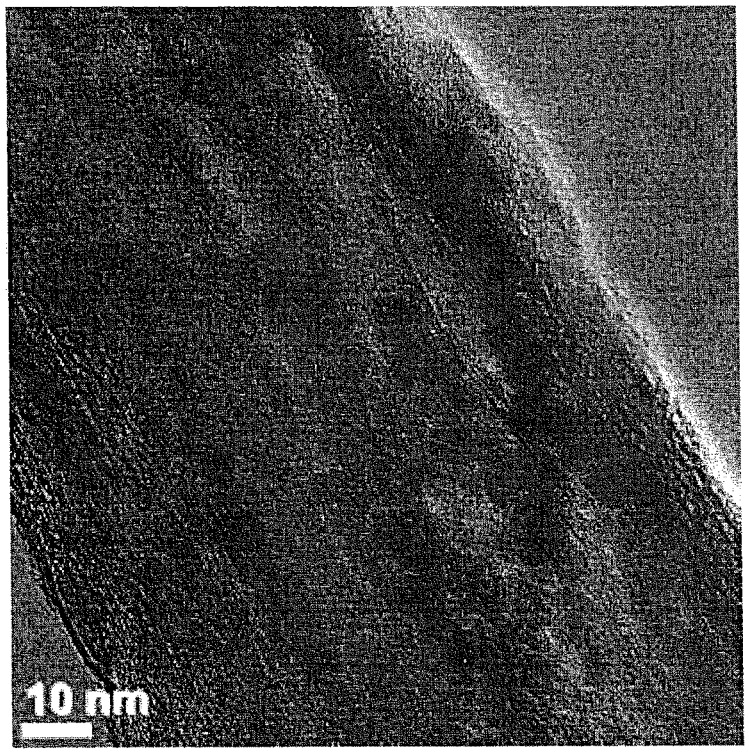
FIG. 36 shows transmission electron microscopy (TEM) images of Mitsui originated Fe-TD-GNRs.
Figure 36:
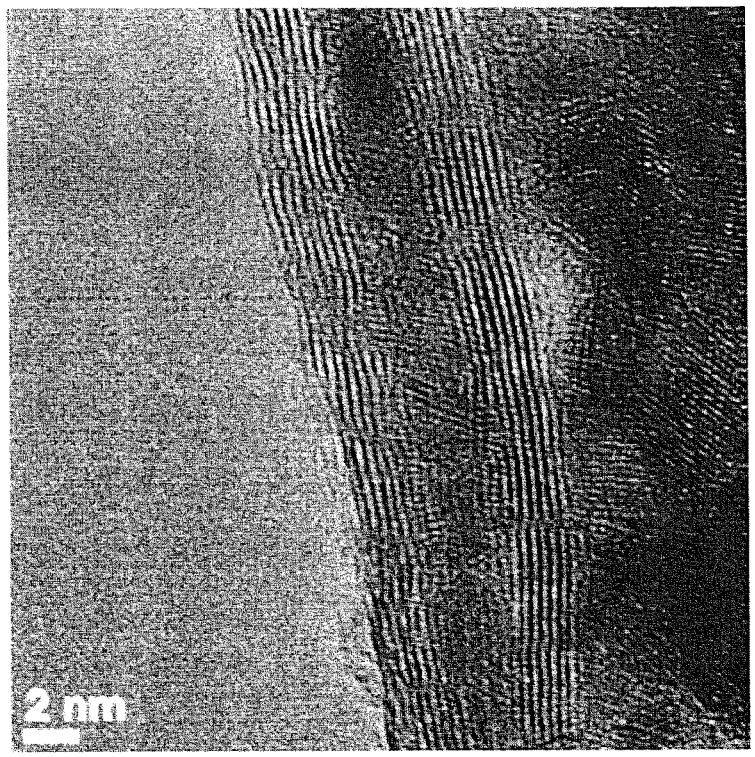

To further demonstrate GNR alignment, suspensions of Fe-TD-GNRs were dried out outside of a magnetic field and inside of the magnetic field. On the optical microscope images taken, one can see randomly dispersed NTL originated Fe-TD-GNRs (FIG. 32 A) that were dried out outside of the magnetic field. One can also see aligned NTL originated Fe-TD-GNRs (FIG. 32 B) that were dried out inside of the parallel magnetic field. For clearness, SEM images of the NTL originated Fe-TD-GNRs suspensions dried out outside and inside of the magnetic field were also taken (FIG. 33). The results are identical. Similarly, Mitsui originated Fe-TD-GNRs exhibit magnetic anisotropy in the presence of the magnetic field where they were aligned after they were dried out in the presence of the parallel magnetic field (FIG. 34 B and FIG. 35 B). On the other hand, one can see randomly dispersed Mitsui originated Fe-TD-GNRs which were dried out outside of the magnetic field (FIG. 34 A and FIG. 35 A). For the closer insight of the Fe-TD-GNRs, TEM images were taken. Black dots different sizes ranging from 2 nm to 10 nm are presumably iron nanoparticles intercalated between graphene layers (FIG. 36). Stripes that can be seen on the image (FIG. 36 B) are the edges of the ribbons that are likely to be functionalized.

In sum, Applicants have shown in the present Example that iron has been intercalated between edge functionalized graphene nanoribbon stacks to make Fe-TD-GNRs. The intercalated iron was imaged by TEM. The synthesis route was optimized to enhance iron concentration. Iron content was estimated with TGA and XPS. Additional data relating to this Example can be found in ACS Nano, 2012, 6(11): 10396-10404. The entirety of this article is incorporated herein by reference.

Example 14. Synthesis of Functionalized GNRs Through Anionic Polymerization Initiated by Alkali Metal-Intercalated Carbon Nanotubes This Example describes the preparation of polymer-functionalized graphene nanoribbons (PF-GNRs) in a one-pot synthesis. MWNTs were intercalated by potassium under vapor- or liquid-phase conditions, followed by addition of vinyl monomers, resulting in PF-GNRs. Scanning electron microscopy, thermogravimetric mass spectrometry and X-ray photoelectron spectroscopy were used to characterize the PF-GNRs. Also explored here is the correlation between the splitting of MWNTs, the intrinsic properties of the intercalants and the degree of defects and graphitization of the starting MWNTs. The PF-GNRs could have applications in conductive composites, transparent electrodes, heat circuits and supercapacitors.

In particular, Applicants demonstrate in this Example that, in analogy to the intercalation chemistry of graphite, potassium intercalation into MWNTs followed by in situ reaction with vinyl monomers results in exfoliation of the MWNTs and subsequent splitting with functionalization into PF-GNRs in a one-pot solution-based process. These polymer addends provide enhanced integration between the GNRs and polymer matrices. Furthermore, since polymerization is mainly initiated from GNR edges, the basal planes can remain sp$^2$-hybridized. This stands in contrast to the covalent functionalization of carbon nanotubes, where the functionalized nanotubes must contain sp$^3$-hybridized carbons at all functionalization sites. In this Example, Applicants have also correlated the exfoliation of MWNTs with the structural characteristics of the starting materials and the intrinsic properties of the intercalants.

Figure 37:
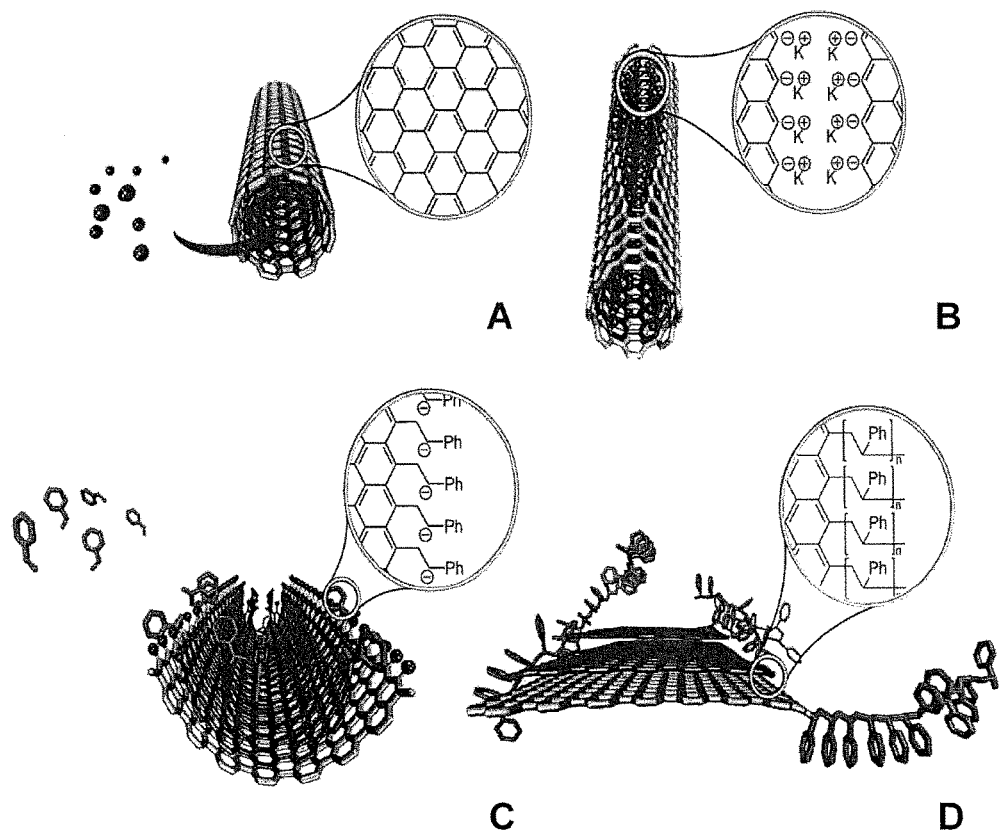
FIG. 37 provides a reaction scheme for the one-pot synthesis of polymer-functionalized GNRs (PF-GNRs). First, MWNTs are intercalated with potassium naphthalenide (blue dots) (FIG. 37A). Next, a longitudinal fissure is formed in the walls of the MWNTs due to expansion caused by intercalation of THF-stabilized potassium ions into the MWNT host (FIG. 37B). This would cause the edge radicals to be immediately reduced to the corresponding anions under the reducing conditions. Thereafter, polymerization of styrene monomers assists in exfoliation of MWNTs (FIG. 37C). Next, PF-GNRs are formed upon quenching (FIG. 37D).

The synthetic strategy for the one-pot synthesis of PF-GNRs used in this Example is shown in FIG. 37. MWNTs were converted into edge-negatively charged polymerization macroinitiators via intercalation and splitting. Without being bound by theory, it is envisioned that the edges of the split tubes are lined by aryl anions and their associated metal cations. Second, anionic polymerization of vinyl monomers starting at the negatively charged GNR edges results in the formation of PF-GNRs.

An analogous alkylation with alkyl halides was recently disclosed with Na/K. While the vapor phase intercalation of MWNTs was reported earlier, the potassium naphthalenide liquid-phase intercalation will be described here along with the subsequent polymerization methodology. Briefly, MWNTs, potassium metal, naphthalene and THF were added to a Schlenk flask and subjected to three freeze-pump-thaw cycles to remove oxygen. Without being bound by theory, it is envisioned that the intercalation of solvent-stabilized potassium cations into MWNTs may lead to expansion of the d-space between MWNT layers, causing the MWNTs to partially or fully split. The fissures in the sidewalls of the MWNTs serve as the starting points for vinyl monomers, such as styrene and isoprene in the present case, to anionically polymerize from the GNR edges. Due to polymerization likely proceeding between the GNR layers, only a small amount of olefin was needed to effect the exfoliation of the MWNTs. The non-attached polymer was removed by extracting the raw product with boiling chloroform in a Soxhlet extractor.

Figure 38:
FIG. 38 shows a representative SEM image of MWNTs treated with potassium naphthalenide followed by addition of styrene. GNRs can be readily identified under SEM with widths that are in the range of several hundred nm. The amorphous material wrapping the GNRs or extending across neighboring GNRs is polystyrene.
Figure 39:
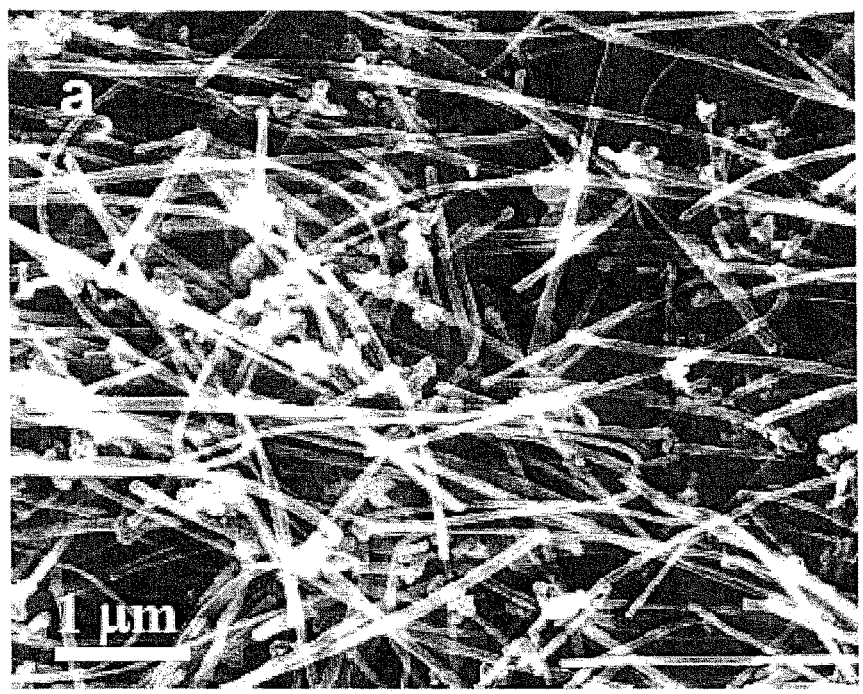
FIG. 39 shows SEM images of Mitsui MWNTs at low-magnification (FIG. 39A) and high-magnification (FIG. 39B).
Figure 39:
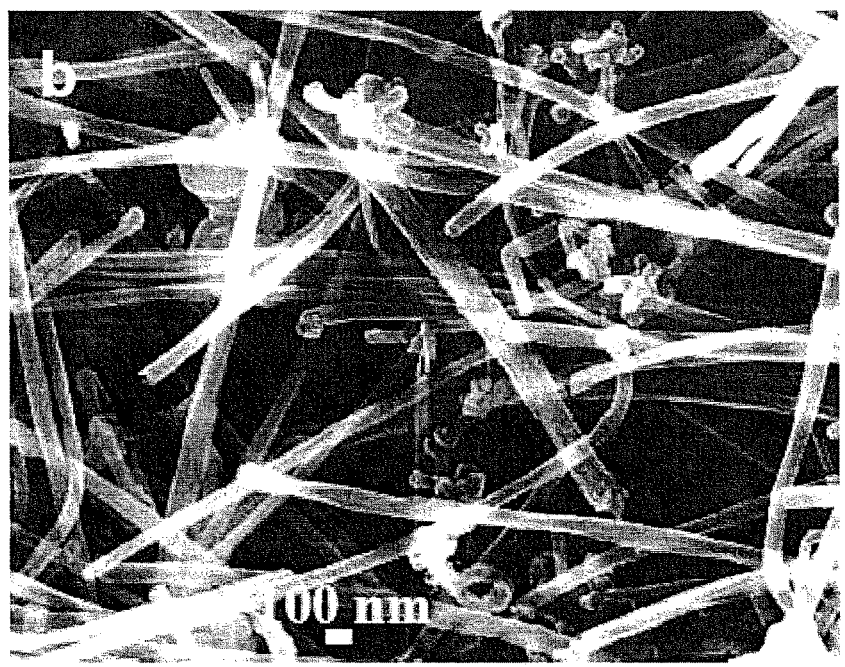
Figure 40:
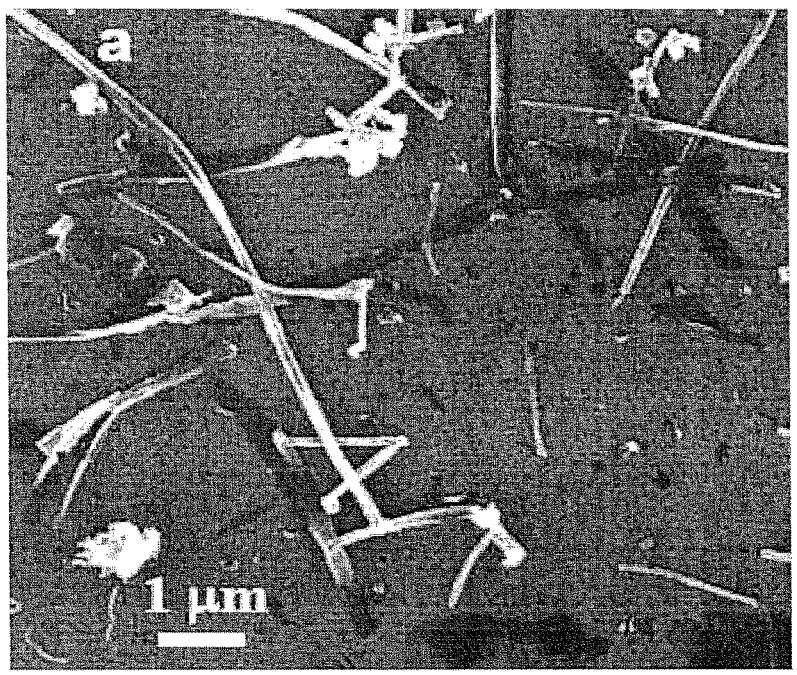
FIG. 40 provides TEM images of PF-GNRs.
Figure 40:
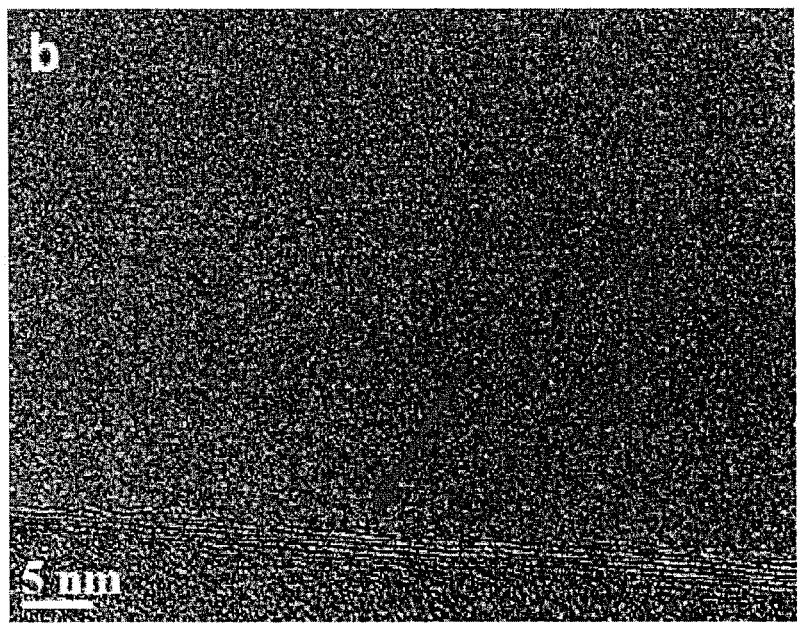
Figure 41:
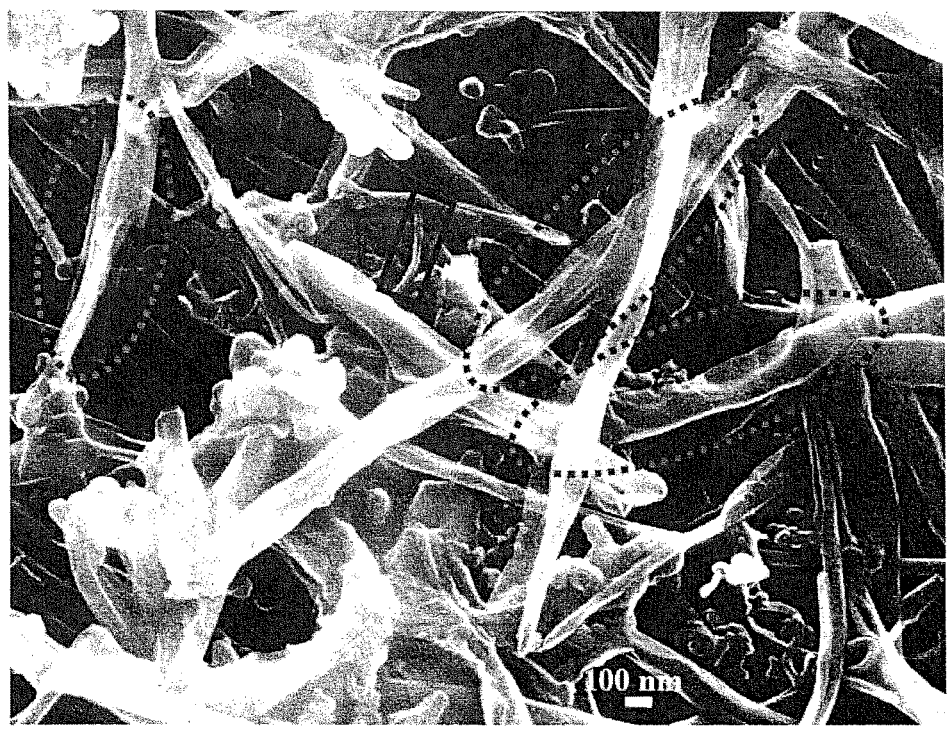
FIG. 41 provides an SEM image of Mitsui MWNTs treated with potassium naphthalenide followed by addition of isoprene. The ribbon-like structure can be easily identified, as indicated by the dashed circles. The blue rectangle indicates an exfoliated MWNT that is partially split. Since the sample was imaged before extraction with chloroform, the unbound amorphous polymer domains are present.

SEM was used to image the MWNTs after intercalation and polymerization with styrene. PF-GNRs with widths in the range of several hundred nm are clearly shown in FIG. 38. Additional images of the PF-GNRs are shown in FIGS. 39-40. In another example, SEM was used to image the MWNTs after intercalation and polymerization with isoprene. PF-GNRs from this Example are shown in FIG. 41.

Thermogravimetric mass spectrometry (TG-MS) was used to confirm the presence of the polystyrene chains, to estimate the quantity of the repeat units, and to determine the temperature window of degradation of the PF-GNRs. To exclude the influence of the surface physisorbed components, all of the PF-GNRs were extracted with chloroform in a Soxhlet extractor for 1 week and then dried at 60° C. overnight. The thermogravimetric analysis (TGA) thermogram (FIG. 42A) indicates a one-step weight-loss process with a total weight loss of 9% between 100 and 900° C. Major decomposition occurs between 384 and 474° C. According to MS analysis and a previous report, this is the range where depolymerization of the polystyrene occurs. Charged molecule fragments with mass to charge ratios (m/z) 78, 77, 51, and 50 were observed, with intensities that are distinct for the styrene monomer, one of the expected degradation products.

Figure 42:
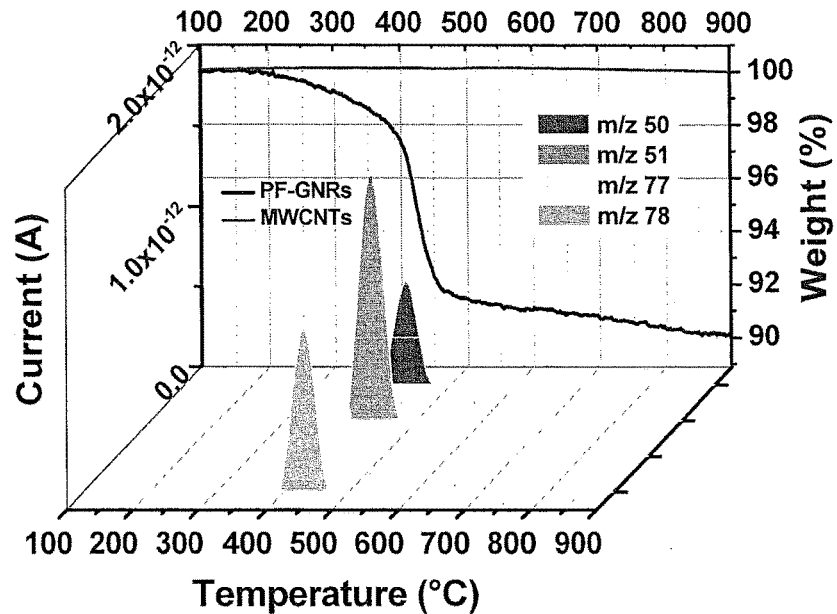
FIG. 42 shows data characterizing PF-GNRs.
Figure 42:
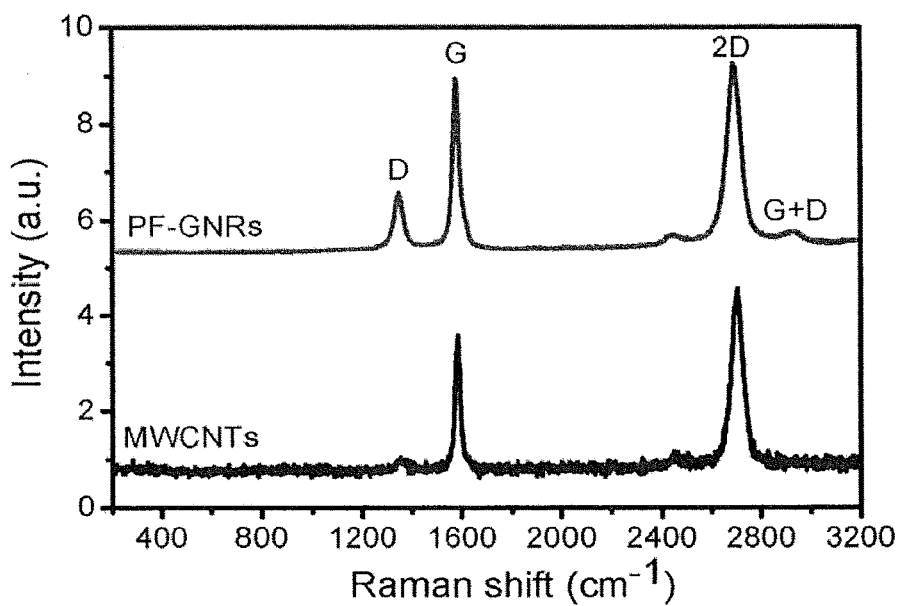
Figure 42:
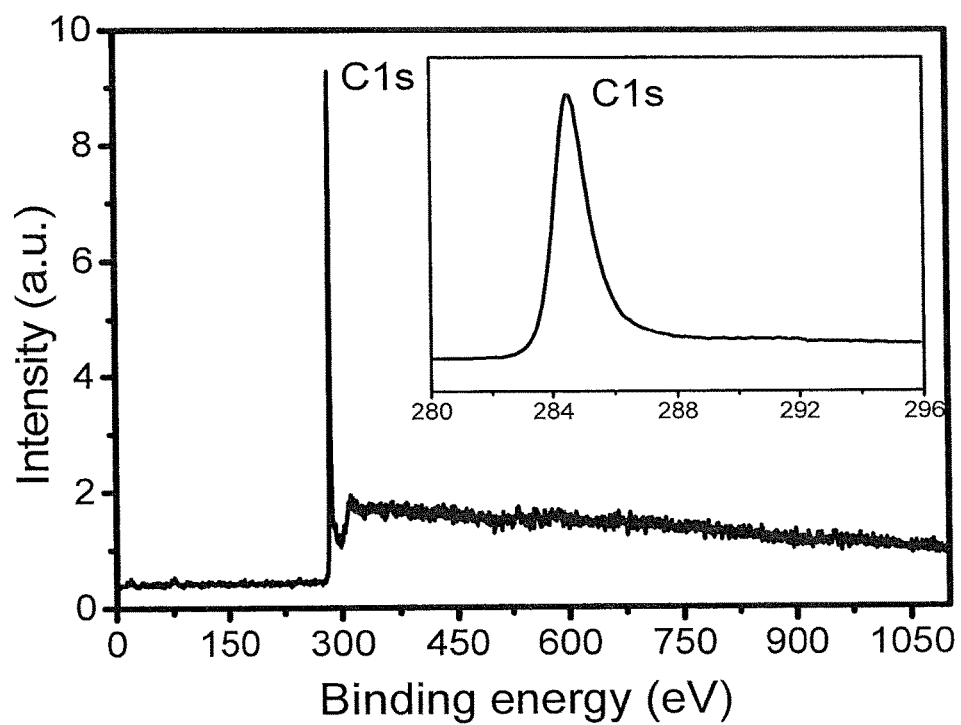

A control experiment with starting MWNTs was also performed where no weight loss was observed (blue curve in FIG. 42A). Based on the weight loss between 384 and 474° C., the weight ratio between the styrene monomer unit and carbon atoms of the graphene material was 1:136. If all of the edge carbons of the graphene nanoribbons were functionalized, this data would indicate that the average polymer chain length was only 9 units for a 3 μm×150 nm ribbon (see below for the calculation), but it is unlikely that all sites had equal exposures to the monomer, so varied chain lengths may be present.

Raman spectroscopy was also used to characterize the graphitic structure of the PF-GNRs. An increase in the intensity of the D band over the G band from 0.15 for MWNTs to 0.35 for PF-GNRs was observed in FIG. 42B. Upon splitting of MWNTs, a prominent D peak is an indication of disorder in the graphene structure due to the high edge content. The disordered structure also results in a slight broadening of the G band and the 2D band, as well as the combination mode of D+G band at ~2700 cm$^{-1}$ in PF-GNRs. However, splitting of the G band, corresponding to an intercalated graphitic structure, is not observed in the Raman spectrum, implying that little residual intercalants (if any) or solvents were between the PF-GNRs.

X-ray photoelectron spectroscopy (XPS) was used to examine the PF-GNR surface functionalities. The survey spectrum in FIG. 42C shows that no oxygen was detected in the PF-GNRs. This is further confirmed by the high-resolution XPS C1s spectrum in the inset of FIG. 42C, as no peaks corresponding to 286 eV (C—O) or 287 eV (C=O) were observed.

Figure 43:
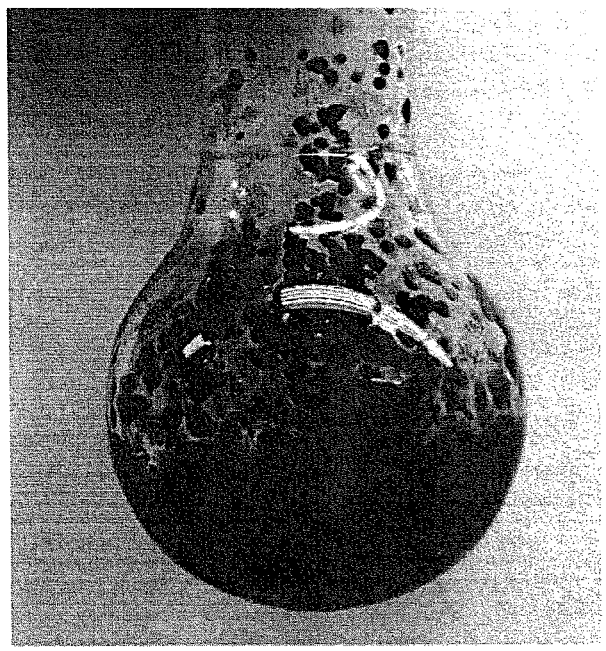
FIG. 43 shows data related to potassium vapor treated MWNTs quenched with styrene.
Figure 43:
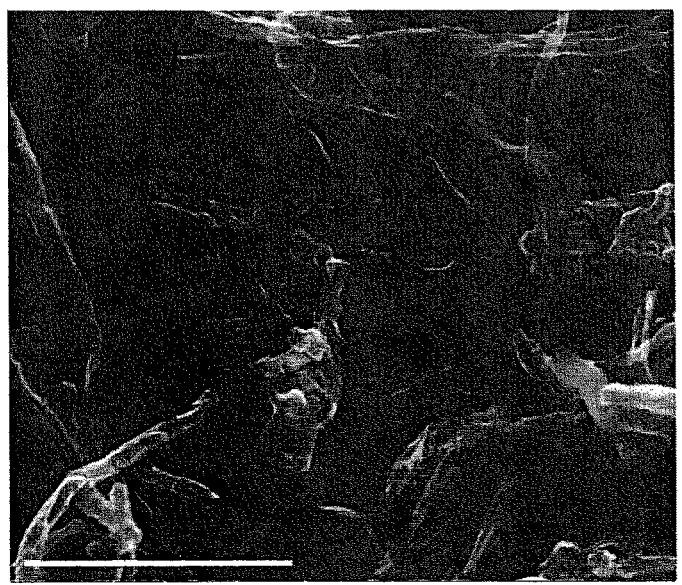
Figure 43:
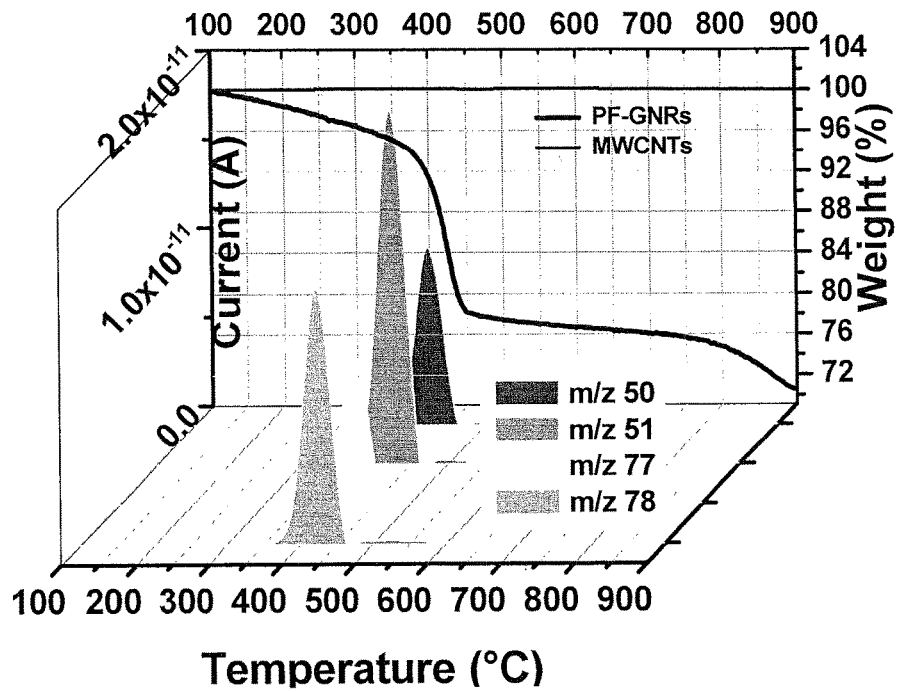
Figure 44:
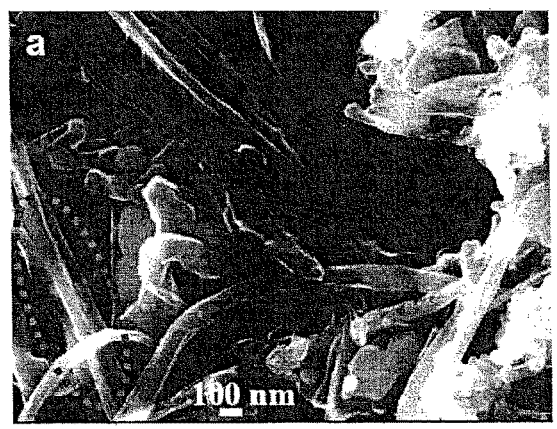
FIG. 44 shows additional images of PF-GNRs and their precursors.
Figure 44:
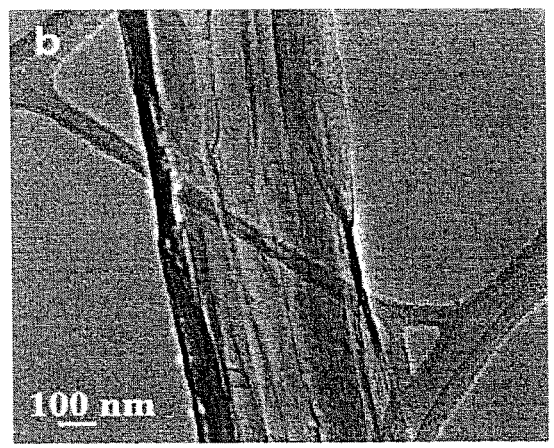
Figure 44:
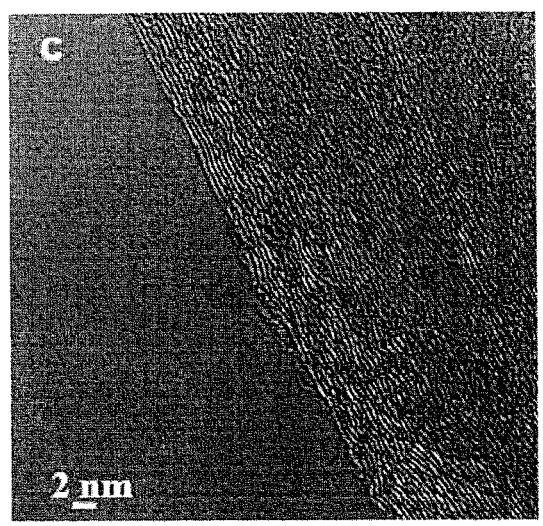

To further explore polymerization initiated by reactive GNR anions, MWNTs were potassium vapor-treated at 350° C. for 24 h. The product was transferred to a round-bottom flask in the glove box and styrene was added dropwise. The reaction mixture was kept at room temperature for 24 h and then at 60° C. overnight to complete the polymerization. The potassium intercalated MWNTs were fluffy and randomly distributed inside the flask. Addition of styrene monomer led to plastic beads with black centers, indicating the growth of polystyrene on partially split GNRs, as shown in FIG. 43A (see below for the one-pot synthesis protocol). Some ribbon-like structures were identified in FIG. 43B. Also see FIG. 44 for additional images. The TGA in FIG. 43C shows that the weight loss was 22% (after extensive Soxhlet extraction with chloroform), four times higher than that of MWNTs treated in the liquid-phase intercalation process.

Figure 45:
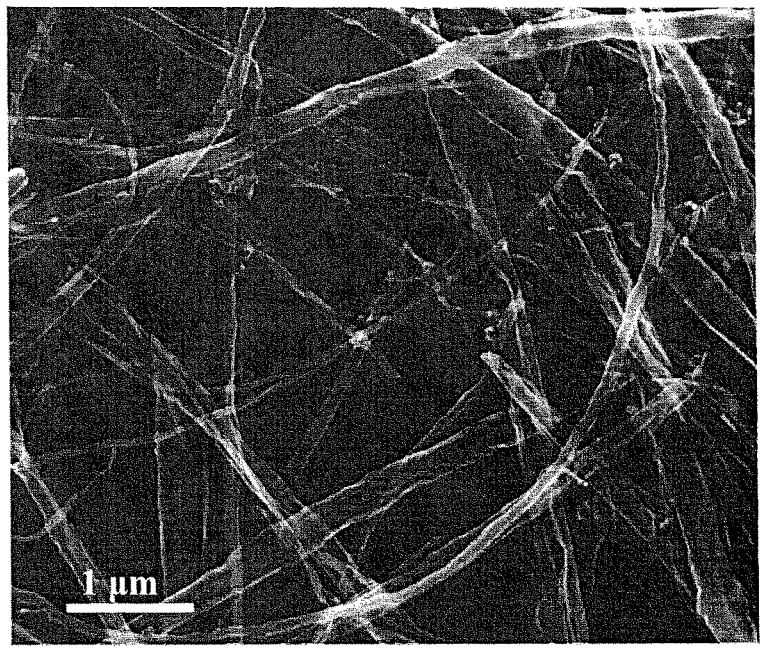
FIG. 45 shows additional images of PF-GNRs.
Figure 45:
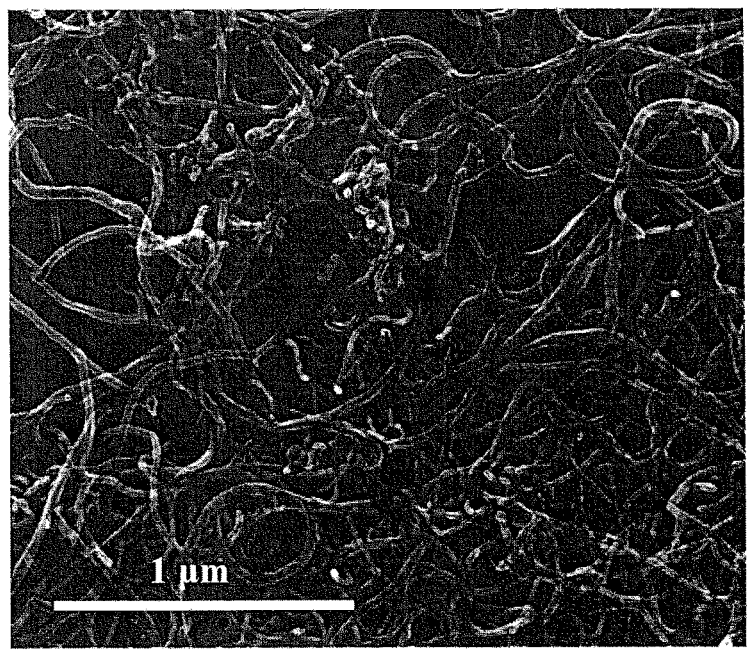

To explore the flexibility of the present protocol, two other sources of MWNTs, NanoTechLabs MWNTs (NTL MWNTs) and Bayer MWNTs (Baytubes), were also subjected to the reaction to compare the results to those from the Mitsui MWNTs used for the former two experiments. Upon liquid-phase intercalation followed by polymerization, NTL MWNTs were split but not further flattened to form GNRs (FIG. 45). With the Baytubes MWNTs, although some partially flattened GNRs could be identified, most of the MWNTs remained intact (FIG. 45B).

Generally, the charge transfer from naphthalene radical anions to the graphitic structure is governed by the electronic state of the host material. If the host materials are highly crystalline, overlap of the valence and conduction bands could lead to two carriers, electrons and holes, in the conjugated graphene plane. Therefore, the electrons, during intercalation, can be transferred from the potassium naphthalenide to the host to balance the concentration of holes, and then into the graphene conduction band. Consequently, well-defined graphite intercalation compounds (GICs) can be obtained from highly crystallized hosts. For materials with a low degree of crystallinity, unorganized intercalation structures are observed since there is no overlap between the conduction band and the valence band due to the disrupted graphitic structures. Previous work on exfoliation of GICs suggests that forming a well-defined intercalation structure could be a prerequisite for making exfoliated GNRs via polymerization-assisted exfoliation of MWNTs. The important link between the structural characteristics of the MWNTs host and splitting and exfoliation of MWNTs has been less explored, despite the fact that Mordkovich et al. (*Carbon* 1996, 34, 1301-1303) studied the scroll carbon nanotubes by intercalating potassium metal into carbon nanotubes. The degree of graphitization can be calculated from the interplanar d spacing between two graphitic layers, according to eq 1:

$$g = \frac{0.3440 - d_{002}}{0.3440 - 0.3354} \qquad \text{(eq 1)}$$

Figure 46:
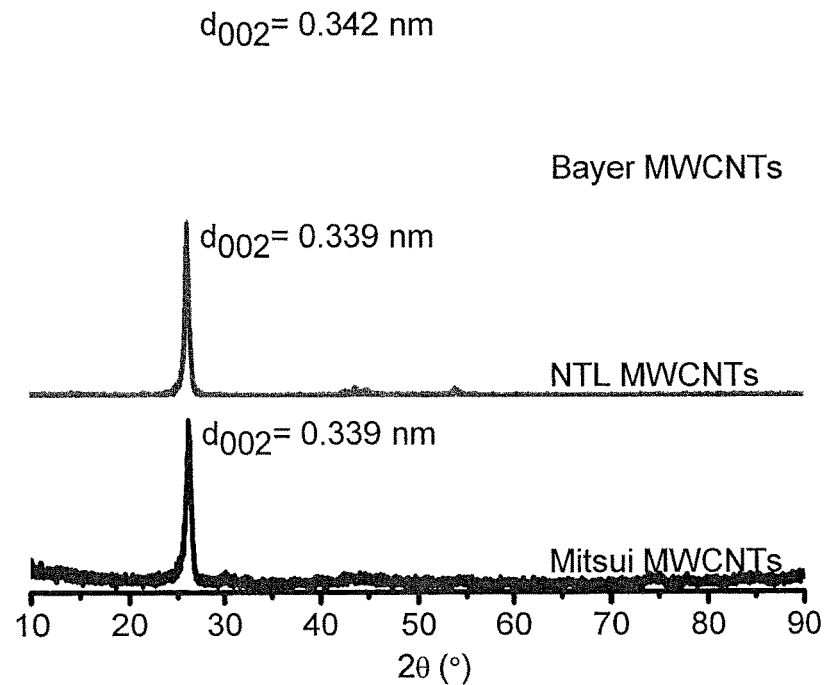
FIG. 46 provides spectral fingerprints from three different MWNT sources.
Figure 46:
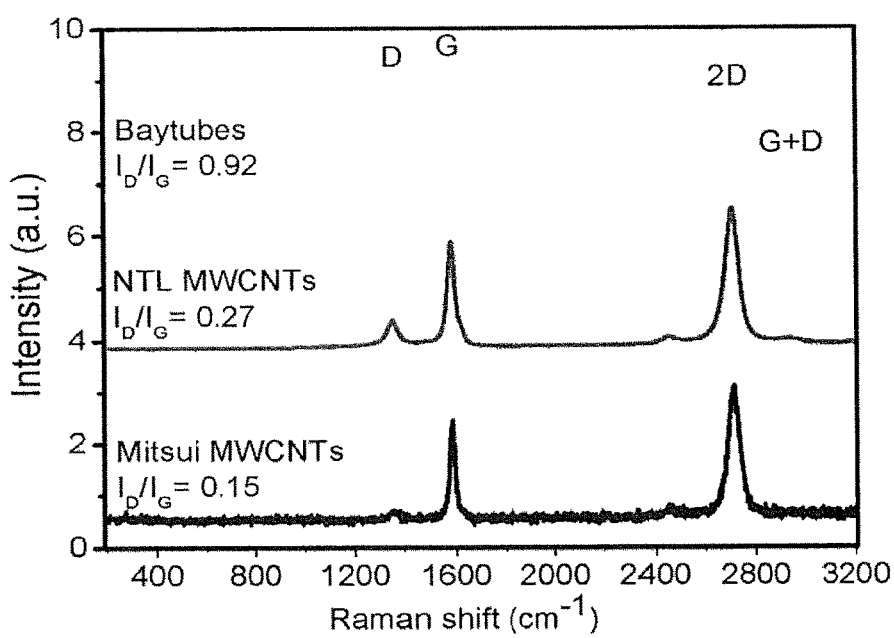

In equation 1, g is the degree of graphitization, 0.3440 (nm) is the interlayer spacing of the fully non-graphitized carbon; 0.3354 (nm) is the d spacing of the ideal graphite crystallite, and $d_{002}$ (nm) derived from X-ray diffraction (XRD) is the interlayer spacing corresponding to (002) planes of the graphitic material. For Mitsui MWNTs and NTL MWNTs, g=0.58, which is higher than that for Bayer MWNTs, where g=0.23 (FIG. 46), indicating that more facile exfoliation of the carbon host would be possible with Mitsui and NTL nanotubes.

The presence of any disordered structures caused by sp$^3$-hybridized carbons or defects that could terminate the splitting or exfoliation of MWNTs cannot be determined from XRD patterns. Consequently, Raman spectroscopy was used to differentiate the degree of disordered structure in the host materials by calculating the ratio of the intensity of the D band to the G band. The relative intensity of disorder-induced D band to crystalline G band, $I_D/I_G$, is 0.15 for Mitsui MWNTs, 0.27 for NTL MWNTs, and 0.92 for Baytubes, as shown in FIG. 46B. Defect sites on graphite do not favor the formation of well-defined intercalation structure and thus the complete exfoliation of highly defective Baytubes by intercalation is likely more difficult. This is corroborated by recent work on reductive alkylation of MWNTs with potassium naphthalenide, in which the outer surface of highly defective MWNTs ($I_D/I_G>1$) were functionalized with decanoic acid and no ribbon-like structure was observed in the SEM images. Although NTL MWNTs have fewer defects, flattening ultra-long split tubes may require further treatment. Thus, most NTL MWNTs remained split and stacked rather than completely flattened. It is difficult to precisely establish the structural threshold (i.e. the critical value for g or $I_D/I_G$) that can be used to predict if the MWNTs can be split and exfoliated. However, it is noteworthy that the higher the degree of graphitization of the carbon host, or the less defective the carbon host, the easier the exfoliation of the MWNTs via intercalation.

Figure 47:
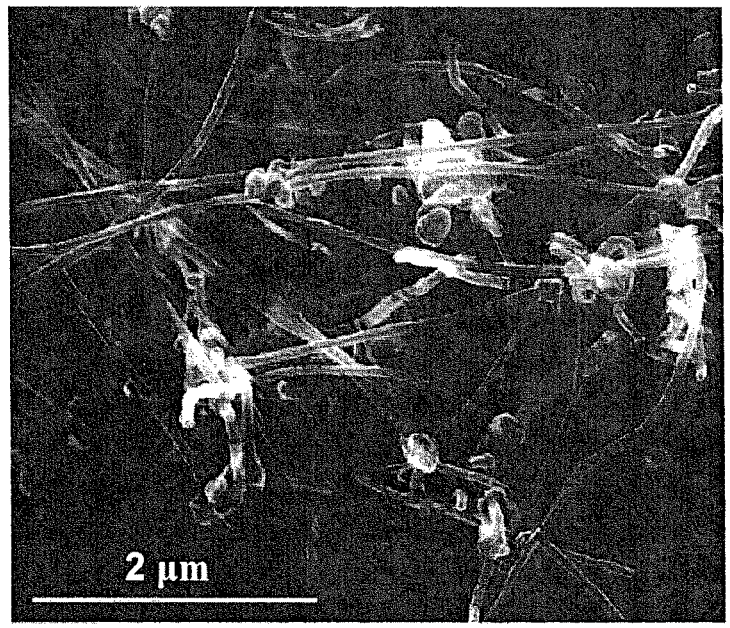
FIG. 47 provides representative SEM images of styrene treated alkali-metal intercalated MWNTs.
Figure 47:
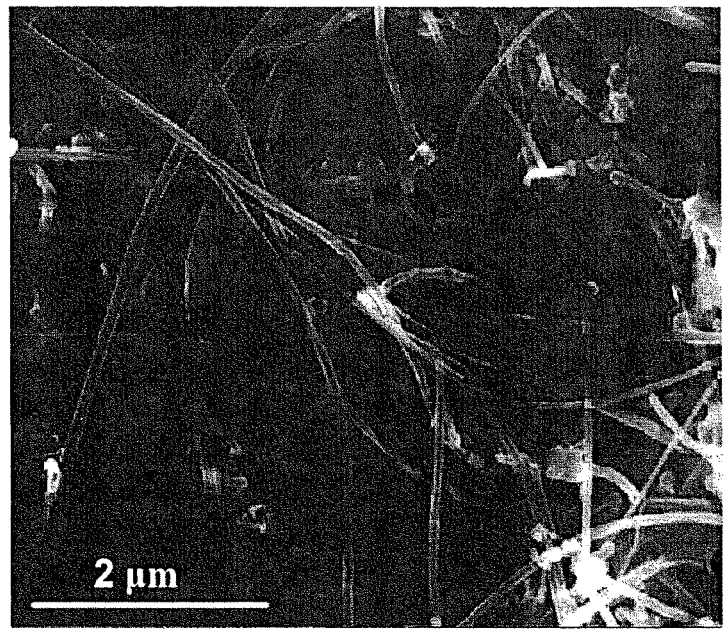
Figure 48:
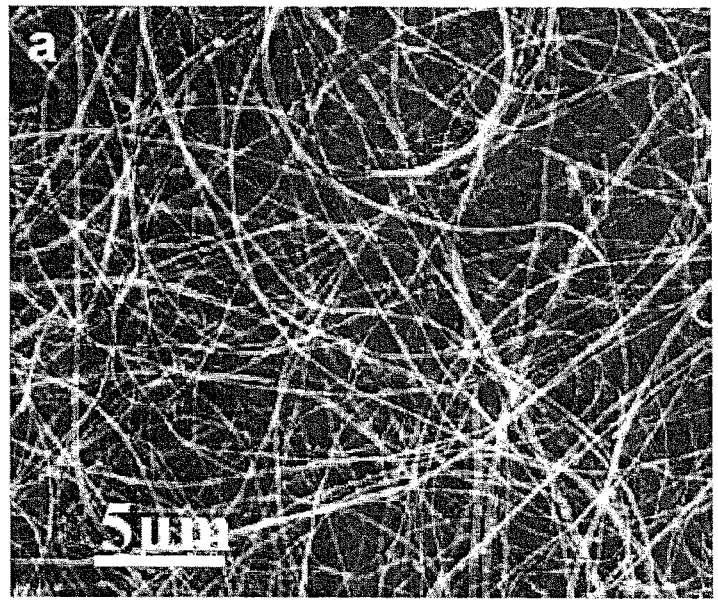
FIG. 48 shows SEM images of NTL MWNTs at low-magnification (FIG. 48A) and high-magnification (FIG. 48B).
Figure 48:
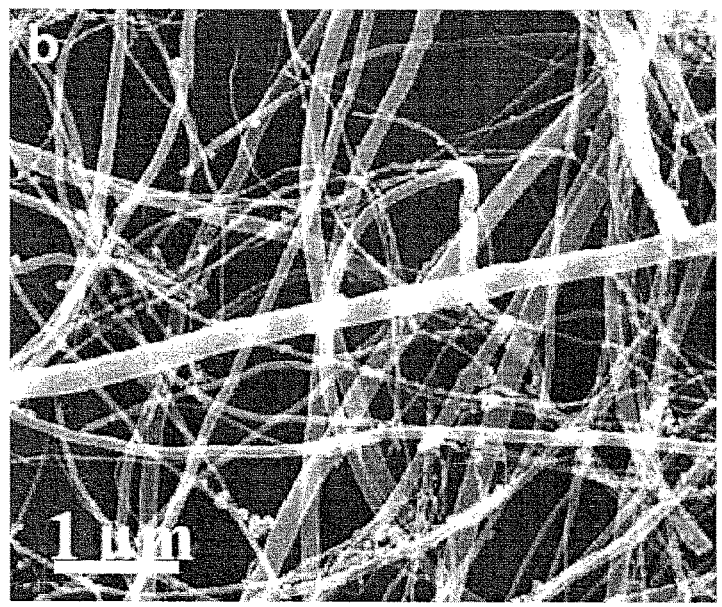
Figure 49:
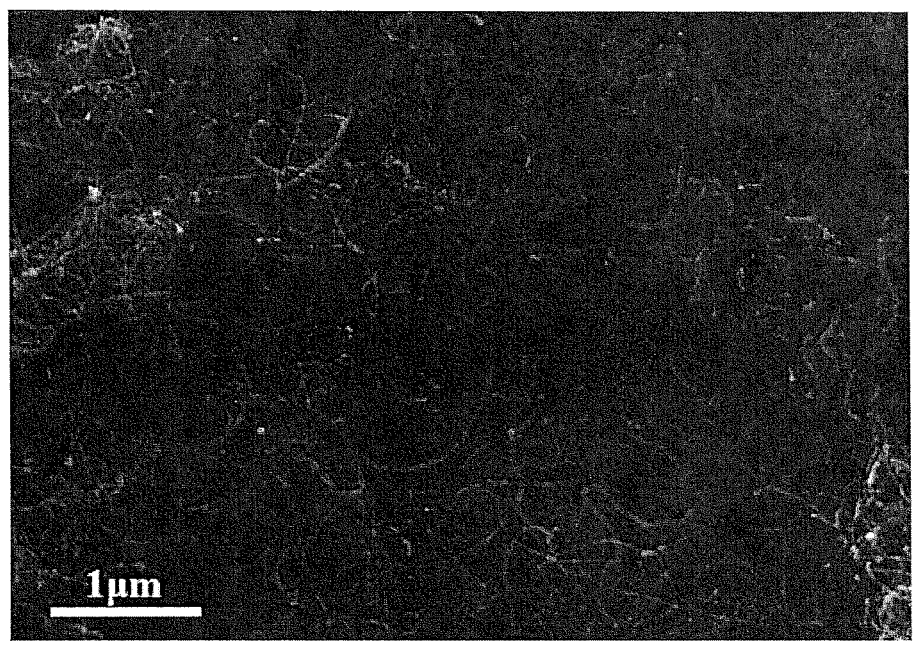
FIG. 49 shows an SEM image of pristine Baytubes that are highly defective.

Similar to the degree of graphitization of the starting carbon nanotubes, the ionization potential and the atomic size of the alkali metals also play an active role in intercalation and subsequent exfoliating. Since sodium naphthalenide and lithium naphthalenide have been used to make GICs and they are also commonly used as initiators for anionic polymerization, the intercalation of solvent-stabilized sodium and lithium into MWNTs for making functionalized GNRs was explored. However, neither of the reaction products contained significant numbers of exfoliated MWNTs. Furthermore, most of the MWNTs remained intact, as shown by the SEM images in FIG. 47.

In sum, the wet chemical preparation of high-quality PF-GNRs was achieved by polymerization-assisted exfoliation of MWNTs in a one-pot synthesis. The in situ functionalized GNRs were examined by TG/MS, SEM, TEM and Raman spectroscopy. Compared to MWNTs treated with potassium vapor followed by addition of isoprene, liquid-phase intercalation of MWNTs and subsequent polymerization was more efficient in exfoliating MWNTs to form PF-GNRs, but with less polymer bound onto the edges. Also demonstrated was the correlation between the structural characteristics of the host (the degree of graphitization and the intensity of D band over G band) and the exfoliation efficiency. The PF-GNRs or split tubes could be used for reinforcing polymers, since the sword-in-sheath type failure of MWNTs due to interlayer slip could be retarded owing to the entangled polymer chains anchored on the edges. Through the compatiblizing appended polymer chains, the load might be effectively transferred from the polymer matrix to the rigid PF-GNRs, thus making stronger composites. In addition, it has been shown that functionalized GNRs remain conductive, since the functionalization preferably occurs on the graphene edges. Systematic studies are underway to better understand the correlation between functionalization and conductivity of the PF-GNRs for use in making reinforced conductive composites and conductive transparent films.

Methods

MWNTs were obtained from Mitsui & Co. (lot no. 05072001K28), NanoTechLabs, Inc. (lot no. #5T10M10), or Bayer MaterialScience (lot no. C720P) and they were used as received. THF was treated with potassium hydroxide for several days, degassed and freshly distilled over sodium/benzophenone under nitrogen atmosphere. Styrene was passed through a neutral alumina column and then degassed before use. Isoprene was distilled under a nitrogen atmosphere. All chemicals were purchased from Sigma-Aldrich unless otherwise specified.

TG-MS measurements were performed using a Netzsch449 F3 Jupiter® instrument under a dynamic Ar (99.999%) flow with a flow rate of 60 mL/min in a temperature range from 25° C. to 900° C. A heating rate of 10° C./min was used. About 5 mg of the sample was placed in an alumina ($Al_2O_3$) crucible. Simultaneous MS used a MS 403CAëolos® with a detector secondary electron multiplier Chemeltron at a system pressure of $2\times10^{-5}$ mbar. Gasses evolved under TG heat treatment were transferred to a MS detector using a quartz transfer capillary with an inside diameter of 75 μm that was heated to 220° C. The upper limit of the MS detector was 100 amu. Raman spectroscopy was done using a Renishaw Raman RE01 microscopy with a 514.5 nm laser. The PF-GNRs were dispersed in ortho-dichlorobenzene using mild bath sonication (Cole-Parmer, EW-08849-00). The suspension was drop-cast onto Si chips with a 500 nm-thick $SiO_2$ layer. The solvent was evaporated upon heating, and the sample was imaged using a JEOL 6500 field-emission microscope and 2100F field emission gun transmission electron microscope.

To prepare PF-GNRs, 0.1 g of alkali metal (Li, Na, or K), 0.256 g of naphthalene, and 50 mg of MWNTs (Mitsui MWNTs, NTL MWNTs or Baytubes) were added to a 100 mL oven dried Schlenk flask. 50 mL of THF was added. The flask was capped and the suspension was subjected to three freeze-pump-thaw cycles to remove oxygen. The reaction mixture was stirred at room temperature for 3 d and 20 mL of monomer (styrene or isoprene) was added dropwise while cooling in a dry ice/acetone bath. The mixture was stirred at room temperature for 1 d and then the reaction mixture was quenched by 20 mL of anhydrous ethanol. The gray precipitate was filtered through a polytetrafluoroethylene (PTFE) membrane (0.45 μm), followed by extraction with boiling chloroform in a Soxhlet extractor for 1 week to remove unbound polymer. The final product (55 mg of PF-GNRs) was collected on a PTFE membrane (0.45 μm), washed with THF (3×100 mL), ethanol (3×100 mL), DI water (3×100 mL), and acetone (50 mL), ether (50 mL), and dried in vacuum oven at 60° C. overnight.

Synthesis of PF-GNRs Through Vapor-Phase Intercalation

Details of potassium intercalation of MWNTs can be found in Applicants' previous work. *ACS Nano* 2011, 5, 968-974. The sealed reaction vessel loaded with potassium intercalated MWNTs was opened in a glove box and the intercalated tubes were transferred into a 50 mL round-bottom flask, followed by dropwise addition of 20 mL styrene monomer. The sealed reaction mixture was taken out from the glove box and kept at room temperature for 24 hours and then heated to 60° C. overnight to complete the polymerization. The polystyrene/PF-GNRs mixture was dissolved in chloroform and precipitated by ethanol. After filtration, plastic chunks were cut into small pieces and extracted by chloroform in a Soxhlet extractor for one week. Finally, the black solid was collected on a PTFE membrane (0.45 μm), washed with THF (3×100 mL), ethanol (3×100 mL), DI water (3×100 mL), and acetone (50 mL), ether (50 mL), and dried in vacuum oven at 60° C. overnight. Alternatively, PF-GNRs can be prepared in a one-pot synthesis: heating the MWNTs and potassium chunks in a tightly capped Schlenk flask at 350° C. for 24 h followed by dropwise addition of styrene or isoprene through the stopcock under nitrogen at room temperature.

Calculation of Carbon Atoms that are Functionalized with Polymer

Figure 50:
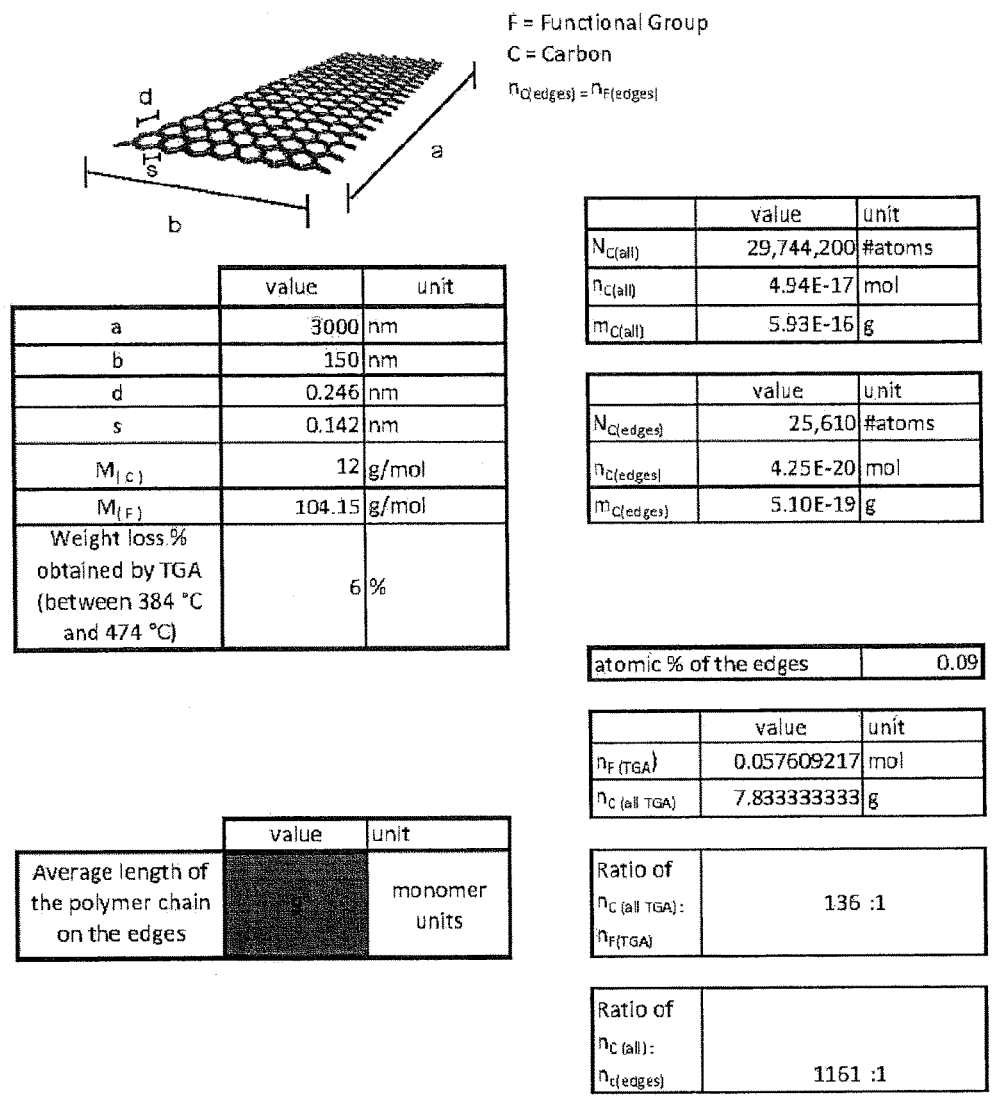
FIG. 50 shows data relating to the calculation of carbon atoms that are functionalized with polymers in PF-GNRs.

The calculation is based on the assumption that all of the edge carbons of a 3 μm×150 nm ribbon were functionalized. The amount of polymer that was chemically attached to the GNRs is corresponding to the weight loss between 384 and 474° C. The calculations are summarized in FIG. 50. Based on the calculation, the average polymer chain length was 9 units for a 3 µm×150 nm nanoribbon.

Example 15. Preparation of Poly(ethylene oxide)-Functionalized Graphene Nanoribbons This example pertains to the preparation of poly(ethylene oxide)-functionalized graphene nanoribbons (PEO-GNRs). To prepare PEO-GNRs, 0.1 g of potassium metal, 0.256 g of naphthalene, and 40 mg of MWNTs (Mitsui MWNTs) were added to a 100 mL oven dried Schlenk flask. 50 mL of THF was also added. The flask was capped and the suspension was subjected to three freeze-pump-thaw cycles to remove oxygen. The reaction mixture was stirred at room temperature for 3 days. Next, 10 mL of condensed ethylene oxide was added while cooling in a dry ice/acetone bath. The mixture was then stirred at 65° C. for 2 days. Then the reaction mixture was quenched by 20 mL of anhydrous ethanol. The gray precipitate was filtered through a polytetrafluoroethylene (PTFE) membrane (0.45 µm). This was followed by washing with THF (3×100 mL), ethanol (3×100 mL), DI water (3×100 mL), acetone (50 mL), and ether (50 mL). The product was dried in a vacuum oven at 60° C. overnight. 50 mg of PEO-GNRs was obtained.

Figure 51:
FIG. 51 provides data relating to the characterization of poly(ethylene oxide)-functionalized graphene nanoribbons (PEO-GNRs) that were made in accordance with the method described in Example 15.
Figure 51:
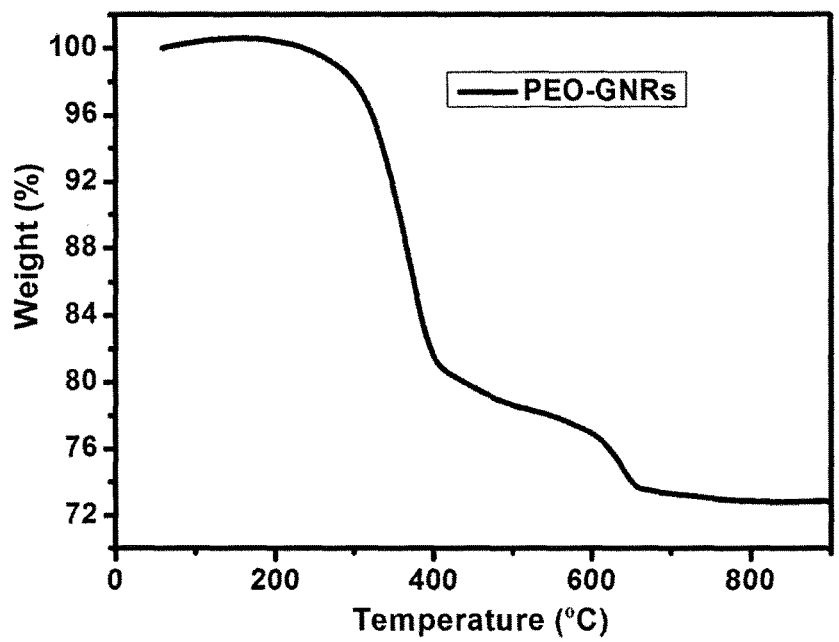

As shown in FIG. 51A, the PEO-GNRs were identified in an SEM image. This confirmed that liquid phase intercalation followed by addition of ethylene oxide could produce PEO-GNRs.

Thermogravimetric analysis (TGA) was also performed on the PEO-GNRs. For TGA, a sample containing PEO-GNRs was heated at 120° C. for 30 min to remove adsorbed water. The sample was then cooled to 40° C. under argon. Next, the sample was heated to 900° C. at a rate of 10° C./min. As shown in FIG. 51B, The TGA indicates a total weight loss of 28% between 100° C. and 900° C. A major decomposition occurs between 350° C. and 400° C. (20%), which corresponds to the decomposition of PEO.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of performing wellbore operations, comprising:
    circulating a wellbore fluid comprising a magnetic carbon nanoribbon composition and a base fluid through a wellbore, wherein the magnetic carbon nanoribbon composition comprises one or more magnetic carbon ribbons, wherein the one or more magnetic carbon ribbons comprise carbon nanoribbons that are intercalated with one or more selected from a group consisting of magnetic materials, ferromagnetic precursors and ferrimagnetic precursors.

2. The method of claim 1, wherein the magnetic carbon nanoribbons are functionalized with one or more functionalizing agents, wherein the functionalizing agents are selected from the group consisting of alkyl groups, haloalkanes, iodoalkanes, hexadecyl groups, octyl groups, butyl groups, oxides, epoxides, alcohols, halides, aldehydes, ketones, esters, enones, nitriles, silyl chlorides, monomers, vinyl monomers, CO2, CS2, and combinations thereof.

3. The method of claim 1, wherein the magnetic carbon nanoribbons are selected from the group consisting of doped graphene nanoribbons, graphene oxide nanoribbons, functionalized graphene oxide nanoribbons, doped graphene oxide nanoribbons, reduced graphene oxide nanoribbons, stacked grapheme nanoribbons and combinations thereof.

4. The method of claim 1, wherein the magnetic materials are selected from the groups consisting of metal salts, alkali metals, metal carboxylates, metals, metallic alloys, metal oxides, and combinations thereof.

5. The method of claim 1, wherein the magnetic materials are selected from the group consisting of lithium, sodium, potassium, cesium, rubidium, calcium, cobalt, iron, nickel, copper, manganese, gadolinium, yttrium, chromium, dysprosium, europium, cobalt, alloys thereof, and combinations thereof.

6. The method of claim 1, wherein the magnetic carbon nanoribbons are arranged as single sheets.

7. The method of claim 1, wherein the magnetic carbon nanoribbons are arranged as stacks.

8. The method of claim 7, wherein the stacks comprise from about 1 sheets of magnetic carbon nanoribbon to about 100 sheets of magnetic carbon nanoribbons.

9. The method of claim 1, wherein the magnetic carbon nanoribbons comprise graphene nanoribbons.

10. The method of claim 1, wherein the magnetic carbon nanoribbons comprise graphite nanoribbons.

11. The method of claim 1, wherein circulating the wellbore fluid occurs while drilling the wellbore.

12. The method of claim 1, wherein circulating the wellbore fluid occurs prior to or during completion of the wellbore.

13. The method of claim 1, wherein circulating the wellbore fluid occurs prior to or while logging.

14. The method of claim 1, wherein the base fluid comprises one or more of an oleaginous fluid, a non-oleaginous fluid, or emulsions thereof.

15. The method of claim 1, wherein the wellbore fluid further comprises one or more emulsifiers selected from a group consisting of carboxylic acid-based emulsifiers, carboxylic fatty acids, dimer acids, and dimers of fatty acids.

16. A method for electrical logging of a subterranean well comprising:
    placing into the subterranean well a logging medium, wherein the logging medium comprises a non-aqueous fluid and one or more magnetic carbon nanoribbons, wherein the one or more magnetic carbon nanoribbons are present in a concentration so as to permit the electrical logging of the subterranean well, and wherein the magnetic carbon nanoribbon composition comprises one or more magnetic carbon ribbons, wherein the one or more magnetic carbon ribbons comprise carbon nanoribbons that are intercalated with one or more selected from a group consisting of magnetic materials, ferromagnetic precursors and ferrimagnetic precursors; and
    acquiring an electrical log of the subterranean well.

17. The method of claim 16, further comprising:
collecting logging data; and
refining a drill location based on the collected logging data.

18. The method of claim 16, further comprising inducing a magnetic field within the subterranean well prior to and during acquisition of the electrical log of the subterranean well.

19. The method of claim 18, wherein the induced magnetic field is capable of aligning at least 5% of the magnetic carbon nanoribbons in the direction of the magnetic field.

20. The method of claim 16, wherein the one or more magnetic carbon nanoribbons have lengths or diameters from about 1 nanometer to about 3 centimeters.

21. The method of claim 16, wherein the magnetic carbon nanoribbons are functionalized with one or more functionalizing agents, wherein the functionalizing agents are selected from the group consisting of alkyl groups, haloalkanes, iodoalkanes, hexadecyl groups, octyl groups, butyl groups, oxides, epoxides, alcohols, halides, aldehydes, ketones, esters, enones, nitriles, silyl chlorides, monomers, vinyl monomers, CO2, CS2, and combinations thereof.

22. The method of claim 16, wherein the magnetic carbon nanoribbons are selected from the group consisting of doped graphene nanoribbons, graphene oxide nanoribbons, functionalized graphene oxide nanoribbons, doped graphene oxide nanoribbons, reduced graphene oxide nanoribbons, stacked grapheme nanoribbons and combinations thereof.

23. The method of claim 16, wherein the magnetic materials are selected from the groups consisting of metal salts, alkali metals, metal carboxylates, metals, metallic alloys, metal oxides, and combinations thereof.

24. The method of claim 16, wherein the magnetic materials are selected from the group consisting of lithium, sodium, potassium, cesium, rubidium, calcium, cobalt, iron, nickel, copper, magnesium, manganese, gadolinium, yttrium, chromium, dysprosium, europium, cobalt, alloys thereof, and combinations thereof.

25. A wellbore fluid, comprising:
an oleaginous continuous phase;
one or more magnetic carbon nanoribbons, wherein the one or more magnetic carbon nanoribbons comprises carbon nanoribbons that are intercalated with one or more selected from a group consisting of magnetic materials, ferromagnetic precursors, and ferrimagnetic precursors; and
at least one weighting agent.

26. The wellbore fluid of claim 25, further comprising: one or more emulsifiers selected from a group consisting of carboxylic acid-based emulsifiers, carboxylic fatty acids, dimer acids, and dimers of fatty acids.

27. The wellbore fluid of claim 25, further comprising at least one aqueous discontinuous phase.

28. The wellbore fluid of claim 25, wherein the magnetic carbon nanoribbons are functionalized with one or more functionalizing agents, wherein the functionalizing agents are selected from the group consisting of alkyl groups, haloalkanes, iodoalkanes, hexadecyl groups, octyl groups, butyl groups, oxides, epoxides, alcohols, halides, aldehydes, ketones, esters, enones, nitriles, silyl chlorides, monomers, vinyl monomers, CO2, CS2, and combinations thereof.

29. The wellbore fluid of claim 25, wherein the magnetic carbon nanoribbons are selected from the group consisting of doped graphene nanoribbons, graphene oxide nanoribbons, functionalized graphene oxide nanoribbons, doped graphene oxide nanoribbons, reduced graphene oxide nanoribbons, stacked grapheme nanoribbons and combinations thereof.

30. The wellbore fluid of claim 25, wherein the magnetic materials are selected from the groups consisting of metal salts, alkali metals, metal carboxylates, metals, metallic alloys, metal oxides, and combinations thereof.

31. The wellbore fluid of claim 25, wherein the magnetic materials are selected from the group consisting of lithium, sodium, potassium, cesium, rubidium, calcium, cobalt, iron, nickel, copper, magnesium, manganese, gadolinium, yttrium, chromium, dysprosium, europium, cobalt, alloys thereof, and combinations thereof.

* * * * *